US012629955B2

(12) United States Patent
Zlotnick et al.

(10) Patent No.: US 12,629,955 B2
(45) Date of Patent: May 19, 2026

(54) SUBSTRATE AND SYSTEM FOR PRINTING SECURITY SYMBOLS ON SUBSTRATE USING MICROPRINTING TECHNIQUES

(71) Applicant: The Government of the United States of America, as represented by the Secretary of Homeland Security, Washington, DC (US)

(72) Inventors: Joel Zlotnick, Arlington, VA (US); Jordan Brough, Leesburg, VA (US); Troy Eberhardt, Centreville, VA (US); Tyra McConnell, Knoxville, MD (US); Elizabeth Gil, Bristow, VA (US); Traci Moran, Rockville, MD (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/827,980

(22) Filed: Sep. 9, 2024

(65) Prior Publication Data

US 2025/0001793 A1 Jan. 2, 2025

Related U.S. Application Data

(60) Division of application No. 18/232,199, filed on Aug. 9, 2023, now Pat. No. 12,083,814, which is a (Continued)

(51) Int. Cl.

*B42D 25/29* (2014.01)
*B41F 1/16* (2006.01)

(Continued)

(52) U.S. Cl.

CPC ................ *B42D 25/29* (2014.10); *B41F 1/16* (2013.01); *B41F 7/025* (2013.01); *B41F 31/008* (2013.01);

(Continued)

(58) Field of Classification Search

CPC .... B42D 25/29; B42D 25/342; B42D 25/351; B42D 25/378; B42D 25/333;

(Continued)

(56) References Cited

U.S. PATENT DOCUMENTS 5,855,989 A 1/1999 Mantegazza
6,089,614 A 7/2000 Howland et al.

(Continued)

FOREIGN PATENT DOCUMENTS

DE 102018122150 A1 3/2020

OTHER PUBLICATIONS

Joel Zlotnick et al., "Security by Design: Colour & Split fountains—Interrupting Traditional Counterfeiting (Part 1)," https://platform.keesingtechnologies.com/security-by-design-colour-split-fountains/, Feb. 1, 2016.

(Continued)

*Primary Examiner* — Stephen D Meier
*Assistant Examiner* — Quang X Nguyen
(74) *Attorney, Agent, or Firm* — Kelly G. Hyndman; Robert W. Busby

(57) ABSTRACT

Examples are directed toward anticounterfeit markings printed on a substrate. The substrate has a front side and a back side and is printed with front side markings on the front side and back side markings on the back side. The front side markings and the back side markings have dimensions in a micrometer range. The front side when viewed with reflected light comprises first portions of a plurality of characters. The back side when viewed with reflected light (Continued)

comprises second portions of the plurality of characters. The first portions and the second portions are printed, when viewed with transmitted light, to show the plurality of characters as whole characters having dimensions in the micrometer range, as a transmitted light security feature.

21 Claims, 39 Drawing Sheets
(33 of 39 Drawing Sheet(s) Filed in Color)

Related U.S. Application Data continuation of application No. 17/961,951, filed on Oct. 7, 2022, now abandoned.

(60) Provisional application No. 63/287,754, filed on Dec. 9, 2021, provisional application No. 63/254,799, filed on Oct. 12, 2021.

(51) Int. Cl.

| | |
|---|---|
| ***B41F 7/02*** | (2006.01) |
| ***B41F 31/00*** | (2006.01) |
| ***B41F 33/00*** | (2006.01) |
| ***B41M 1/10*** | (2006.01) |
| ***B41M 1/14*** | (2006.01) |
| ***B41M 3/14*** | (2006.01) |
| ***B42D 25/333*** | (2014.01) |
| ***B42D 25/342*** | (2014.01) |
| ***B42D 25/351*** | (2014.01) |
| ***B42D 25/378*** | (2014.01) |
| ***B42D 25/405*** | (2014.01) |

(52) U.S. Cl.

CPC ........... *B41F 33/0036* (2013.01); *B41M 1/10* (2013.01); *B41M 1/14* (2013.01); *B41M 3/14* (2013.01); *B41M 3/148* (2013.01); *B42D 25/342* (2014.10); *B42D 25/351* (2014.10); *B42D 25/378* (2014.10); *B42D 25/405* (2014.10); *B41M 2205/34* (2013.01); *B41P 2227/10* (2013.01); *B42D 25/333* (2014.10)

(58) Field of Classification Search

CPC ........ B41F 33/0036; B41F 1/16; B41F 7/025; B41F 7/02; B41F 31/008; B41M 1/10; B41M 1/14; B41M 3/14; B41M 3/148; B41M 2205/34

See application file for complete search history.

(56) References Cited

U.S. PATENT DOCUMENTS

| | | | | |
|---|---|---|---|---|
| 8,226,125 | B2 * | 7/2012 | Williams ............... | B42D 25/29 283/94 |
| 2005/0193909 | A1 | 9/2005 | Mayer et al. | |
| 2005/0276458 | A1 | 12/2005 | Jones et al. | |
| 2008/0141880 | A1 | 6/2008 | Daniel et al. | |
| 2009/0059304 | A1 | 3/2009 | Manfredi et al. | |
| 2010/0164219 | A1 | 7/2010 | Jeacock et al. | |
| 2010/0248151 | A1 * | 9/2010 | Tomita ...................... | G03F 7/24 430/306 |
| 2011/0139024 | A1 | 6/2011 | Schiffmann | |
| 2019/0054734 | A1 * | 2/2019 | Baran .................. | B42D 25/351 |
| 2019/0100046 | A1 | 4/2019 | Zlotnick et al. | |
| 2019/0337749 | A1 * | 11/2019 | Koch .................. | B65H 29/041 |

OTHER PUBLICATIONS

Joel Zlotnick et al., "Security by Design: Monochrome Colour Gamut—Interrupting Traditional Counterfeiting (Part 2)," https://platform.keesingtechnologies.com/security-by-design-monochrome-colour-gamut/, Jun. 7, 2016.

Joel Zlotnick et al., "Security by Design: Security Design & Ink Opacity—Interrupting Traditional Counterfeiting (Part 3)," https://platform.keesingtechnologies.com/security-by-design-security-design-ink-opacity/, Jun. 7, 2017.

Joel Zlotnick et al., "Security by Design: Split Fountains Redux—Interrupting Traditional Counterfeiting (Part 4)," https://platform.keesingtechnologies.com/security-by-design-split-fountains-redux/, Oct. 1, 2017.

Joel Zlotnick et al., "Security by Design: False Split Fountains—Interrupting Traditional Counterfeiting (Part 5)," https://platform.keesingtechnologies.com/security-by-design-false-split-fountains/, Feb. 1, 2018.

Joel Zlotnick et al., "Security by Design: Split Fountain Position—Interrupting Traditional Counterfeiting (Part 6)," https://platform.keesingtechnologies.com/security-by-design-split-fountain-position/, Jun. 7, 2018.

Joel Zlotnick et al., "Security by Design: Split Fountain Width—Interrupting Traditional Counterfeiting (Part 7)," https://platform.keesingtechnologies.com/security-by-design-split-fountain-width/, Mar. 22, 2019.

Joel Zlotnick et al., "Security by Design: Three Inks in a Fountain—Interrupting Traditional Counterfeiting (Part 8)," https://platform.keesingtechnologies.com/security-by-design-three-inks-in-a-fountain/, Jan. 7, 2020.

Joel Zlotnick et al., "3D Printing, Counterfeiting and Risk," https://platform.keesingtechnologies.com/3d-printing-counterfeiting-and-risk/, Jun. 12, 2019.

Joel Zlotnick et al., "Optimising Microprinting: Font and Artwork," https://platform.keesingtechnologies.com/microprinting-1/, Oct. 8, 2020.

Joel Zlotnick et al., "Inks and Colour Gamut in Microprinting," https://platform.keesingtechnologies.com/microprinting-2/, Oct. 13, 2020.

Joel Zlotnick et al., "Microprinting Placement," https://platform.keesingtechnologies.com/microprinting-3/, Oct. 27, 2020.

Joel Zlotnick et al., "Optimizing Microprinting in Lamination Plate Features," https://platform.keesingtechnologies.com/optimizing-microprinting-in-lamination-plate-features/, Jan. 27, 2022.

Joel Zlotnick et al., "Simultaneous Offset: Strategies for Optimization (Part 1),"https://platform.keesingtechnologies.com/simultaneous-offset-strategies-for-optimization-part-1/, Nov. 23, 2021.

Joel Zlotnick et al., "Simultaneous Offset: Strategies for Optimization (Part 2), "https://platform.keesingtechnologies.com/simultaneous-offset-strategies-for-optimization-part-2/, Dec. 8, 2021.

Joel Zlotnick et al., "Simultaneous Offset: Strategies for Optimization (Part 3)," https://platform.keesingtechnologies.com/simultaneous-offset-strategies-for-optimization-part-3/, Dec. 15, 2021.

Joel Zlotnick et al., "Simultaneous Offset: Strategies for Optimization (Part 4), "https://platform.keesingtechnologies.com/simultaneous-offset-strategies-for-optimization-part-4/, Jan. 12, 2022.

Joel Zlotnick et al., "Simultaneous Offset: Strategies for Optimization (Part 5),"https://platform.keesingtechnologies.com/simultaneous-offset-strategies-for-optimization-part-5/, Jan. 19, 2022.

* cited by examiner

Fig. 49
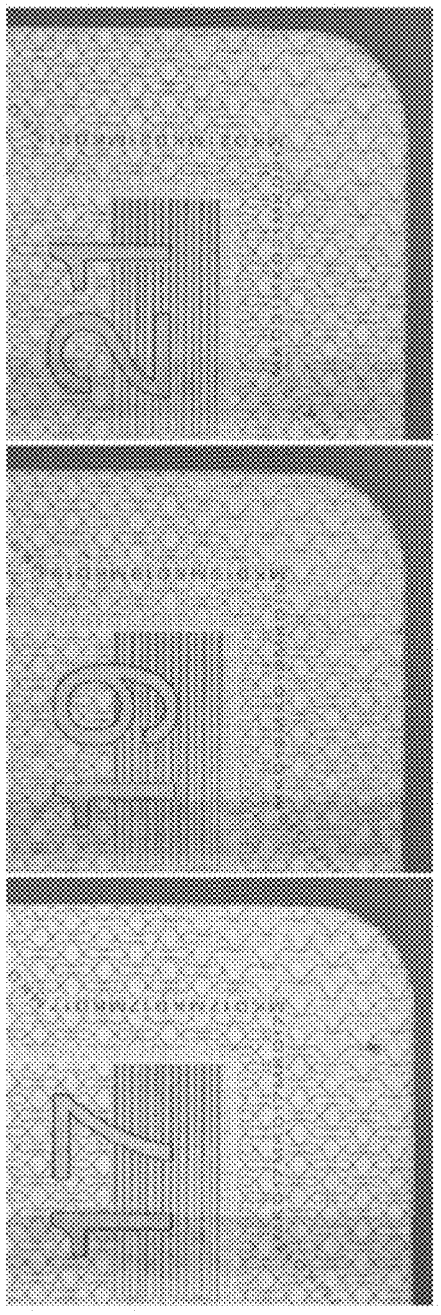
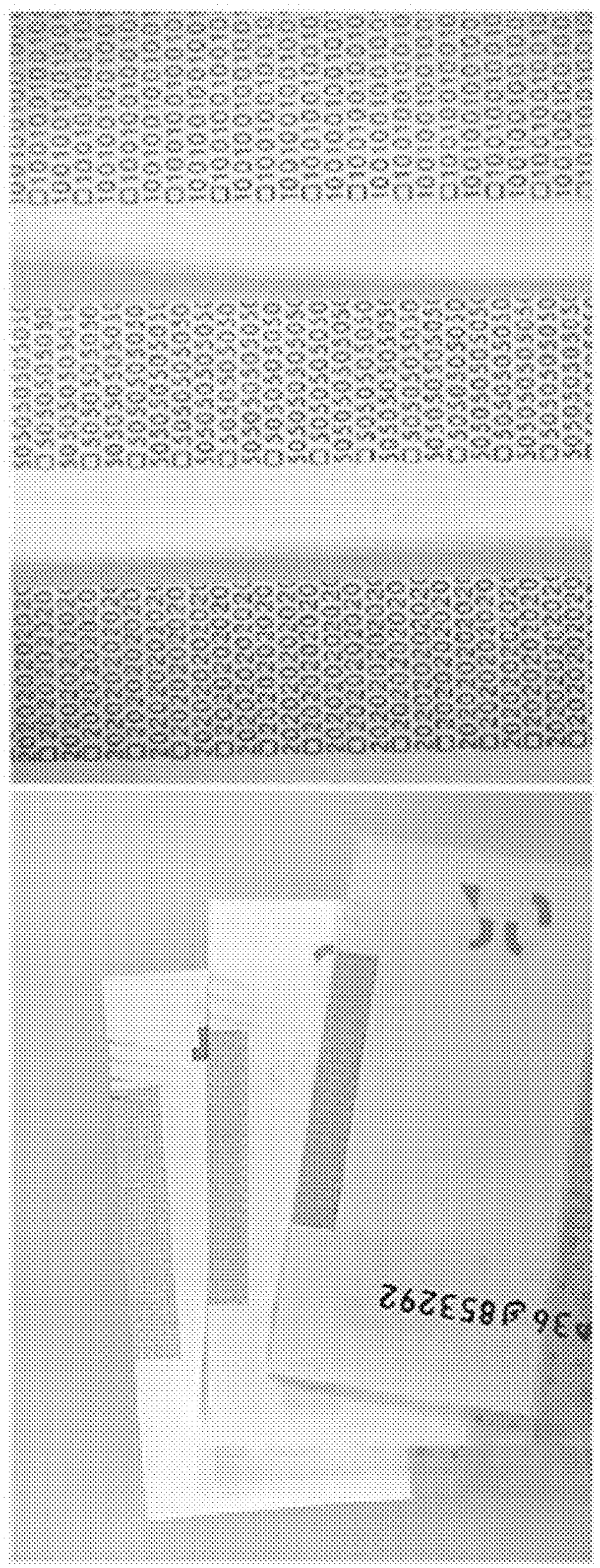
Fig. 50

SUBSTRATE AND SYSTEM FOR PRINTING SECURITY SYMBOLS ON SUBSTRATE USING MICROPRINTING TECHNIQUES

CROSS-REFERENCE TO RELATED APPLICATIONS

This is a divisional of U.S. patent application Ser. No. 18/232,199, entitled "Microprinting Techniques for Printing Security Symbols on a Substrate," filed on Aug. 9, 2023 (now U.S. Pat. No. 12,083,814), which is a continuation of U.S. patent application Ser. No. 17/961,951, entitled "Microprinting Techniques for Printing Security Symbols on a Substrate," filed on Oct. 7, 2022, which is a nonprovisional application that claims the benefit of priority from U.S. Provisional Application No. 63/254,799 entitled "Optimizing Microprinting in Offset, Intaglio and Lamination Plate Features," filed on Oct. 12, 2021, and U.S. Provisional Application No. 63/287,754 entitled "Optimizing Microprinting in Offset, Intaglio and Lamination Plate Features," filed on Dec. 9, 2021. Entire disclosures of these applications are incorporated herein by reference.

STATEMENT OF GOVERNMENT INTEREST

The claimed subject matter was made by one or more employees of the United States Department of Homeland Security in the performance of official duties. The U.S. Government has certain rights in this invention.

FIELD

The present subject matter relates generally to the field of security, and more specifically to the field of microprinting.

BACKGROUND

Microprinting (also known as microtext) is a widely adopted document security feature and can be used in ways that enhance or limit its security functionality. Some advantages of microprinting include its low cost, extreme design flexibility, versatility across printing methods, easy integration with other security features, and its compatibility with a wide variety of security document types. Yet microprinting is also subject to some important limitations, such as a disposition to quality control problems, the necessity of magnification for inspection, the difficulty document users can experience in attempting to locate microprinting in an unfamiliar document, and (in many implementations) limited effectiveness against traditional counterfeiting attacks.

Microprinting was first used in security documents long before inexpensive home or office color printing devices became readily available, but its popularity surged in the 1990s as digital counterfeiting became widespread. Microprinting serves as a security feature, by exploiting differences in technical capabilities between genuine document manufacturers and counterfeiters (having limited graphic arts skills and access to limited digital printing techniques). For example, the offset and intaglio printing processes used by genuine security document manufacturers are capable of printing sharp and clear spot color and line art text, even at font sizes too small for most individuals to read without magnification. Because tiny details are beyond the resolution limits of many inkjet and toner devices (which rely on halftones and process color to simulate line art and spot colors) available to typical digital counterfeiters, many digital counterfeits can be identified by inspecting microprinting or other document artwork with magnification. If the microprinting is blurry and unreadable, or composed of colored dots, the document should be regarded as suspicious.

Assessing microprint readability is subjective and dependent on document user training. Microprinting can be prone to quality control problems that produce blurry microprinting even in genuine documents if production standards are not met. Sophisticated traditional counterfeiters with access to offset or intaglio printing technology have been able to mimic readable microprinting and other subtle art. Further, inkjet printers continue to improve, with higher resolutions and smaller droplets. How small text must be before a consumer printer can no longer produce a readable simulation is a constantly moving target dependent on many factors. Some designers incorporate microprinting of two or more sizes, or microprinting of dynamically changing size, into a single design. Smaller microprinting may be more difficult for counterfeiters to simulate but larger microprinting is easier to inspect, so use of multiple sizes in a single design may capture advantages of each and can be achieved at low cost.

SUMMARY

Various features of microprinting can be used to measure the security value of microprinting against either digital or traditional counterfeiting. Other metrics include microprinting artwork, color, and placement, and how those can be optimized alongside size.

Digital and traditional counterfeiting follow two basic workflows (or hybrid workflows that combine elements of each). Generally, digital counterfeiters can capture most visible document artwork in a single scanning step. This workflow is fast, easy and obviates the need to redraw individual plate images, but counterfeit quality is limited because digital printing technologies like inkjet can only simulate line art and spot colors using halftones and process color. In contrast, sophisticated traditional counterfeiters can use true line art and spot color just as is done in genuine security documents, but this requires many additional prepress steps, including the isolation of individual printing plate images from a target genuine document followed by the tedious and technical process of artwork replication. In short, traditional counterfeiters need to replicate security artwork but digital counterfeiters do not.

From this perspective, resolution is an important factor for microprinting security in the context of digital counterfeiting, but in traditional counterfeiting this necessary process of artwork replication makes font and artwork design relevant to impeding traditional counterfeiting workflows. Replication of microprinting by traditional counterfeiters can be made more difficult if the microprinting font or the macro microprinting design are highly customized. Microprinting cannot be absolutely secured against sophisticated traditional counterfeiters with advanced graphic arts skills, but it can be implemented in genuine documents in ways that increase counterfeiting difficulty.

Artwork origination by genuine designers and artwork replication by traditional counterfeiters are two different processes. Genuine designers build a design from scratch on a blank canvas, but counterfeiters must work backwards from an existing design. Security document artwork that resists traditional counterfeiting does not need to be hard for genuine document designers to originate but should be difficult for a counterfeiter to replicate. Microprinting designs can include use of 1) proprietary instead of public artwork and 2) nonrepeating patterns that cannot be easily counterfeited using step-and-repeat processes.

Regarding the first point above, in the microprinting context "proprietary artwork" could mean design of a distinctive proprietary font instead of a publicly available font. A proprietary font cannot be easily counterfeited just by selecting the exact font from a software dropdown menu and typing vector text. A proprietary font can force traditional counterfeiters to either replicate microprinting artwork by manual redrawing (as would be necessary anyway for non-microprinting line art designs) or substitute a non-proprietary font for the proprietary font and accept a greater risk of detection. Alternatively, even a public font can be customized by making it bold or italicized, changing the kerning between characters or leading between lines, changing the baseline between adjacent characters, or use of other such techniques that can be applied to vector artwork fonts. Some or all these techniques may be used simultaneously in a single microprinting design. For example, one design may incorporate multi-size variable bold and variable italic characters in line with varying leading and kerning.

Microprinting can be based on repeated microprinting artwork, so traditional counterfeiters need only replicate a small portion of the design and then apply step-and-repeat techniques to scale the small area up to a larger pattern. Returning to the second point above, the most effective security designs incorporate continually changing patterns that cannot be counterfeited using step-and-repeat techniques. In the context of microprinting, one way to create a "non-repeating pattern" is by modifying each character in a unique way, such as by changing the shape of characters between lines of different font size so that one line of replicated text cannot simply be copied and enlarged (or reduced) to generate the others. Similarly, changing the position of bold characters within lines of otherwise identical repeating text makes each line a little different from the others, prevents easy step-and-repeat counterfeiting processes, and nominally increases the time and effort required to counterfeit the design. Justification of lines affects the spacing between characters and can be combined with changes to character width, such that character width can be related to the number of characters in the line.

Font-level microprinting customization can prevent traditional counterfeiters from using step-and-repeat techniques. These font-level techniques may be found in certain implementations of microprinting, such as single lines of microprinting in bearer signature lines of identity or travel documents. Strategies that can be applied to an entire multiline microprinting pattern, like baseline curvature or distortion, offer effects that are hard to replicate using font vector artwork techniques on individual characters.

The font-level customization of individual characters described above can be differentiated from customization of larger artwork patterns because the two design methods need traditional counterfeiters to perform different kinds of artwork replication. More specifically, genuine document art that is either designed by hand to be non-repeating or which is converted from repeating artwork into non-repeating line art (for example, a security halftone) can force traditional counterfeiters to work harder. This is also true of microprinting. Microprinting might involve rows of parallel lines, some of which contain repeated artwork that can be simulated at least in part using step-and-repeat processes. In contrast, artwork-level customizations are different, because application of curvature or distortion affects characters differently, depending on their location in a larger multiline microprinting pattern, which further prevents traditional counterfeiters from using step-and-repeat.

Macro artwork patterns of microprinting, such as baseline curvature, can be modified without also applying font-level customization. For example, each microprinted line can be curved in a slightly different way from those of other lines. Apart from being rotated and placed on asymmetrically curved baselines, characters from one part of the design look much like characters from other areas. A traditional counterfeiter might be able to replicate a single instance of each character and then copy and paste into multiple positions, but the rotation of each character or the curve of each different baseline would have to be replicated as well, so step-and-repeat would be difficult for entire lines.

Variable baseline curvature of microprinting can also be combined with font-level customizations, such as bolding of text in certain areas. For improved resistance to step-and-repeat counterfeiting, distortion to the font can be applied as a function of baseline curvature, or a wave pattern, or any of a multitude of other patterns. In each case the distortion affects each character in the microprinting pattern slightly differently depending on its placement, resulting in a diversity of warped character shapes that forces traditional counterfeiters to treat every character as a unique element since characters cannot be repeated from one part of the artwork to another.

The general purpose of this strategy is to convert repeating text to non-repeating line art, but this could be done in many ways. For example, multiple font-level customizations could be combined with artwork-level customizations in ways not illustrated specifically in these examples. Taking a random hypothetical extreme case for purposes of illustration, consider a microprinting design containing various levels of bold and italicized characters in a custom font that is also distorted at a macro level. Such a microprinting design could still be assessed for readability but would be complicated for a traditional counterfeiter to redraw without knowledge of the specific steps the genuine designer followed to originate the design.

Example embodiments of the invention are directed to optimizing microprinting to exploit its advantages and/or mitigate its disadvantages.

In an example embodiment, a substrate has a front side and a back side and is printed with front side markings on the front side and back side markings on the back side. The front side markings and the back side markings have dimensions in a micrometer range. The front side when viewed with reflected light comprises first portions of a plurality of characters. The back side when viewed with reflected light comprises second portions of the plurality of characters. The first portions and the second portions are printed, when viewed with transmitted light, to show the plurality of characters as whole characters having dimensions in the micrometer range.

In another example embodiment, a method of printing anticounterfeit markings on a substrate having front side markings on a front side and back side markings on a back side comprises: receiving a front side image having a first information section and a first security section with a printsetter; generating a first plate having a first microprinting formed in the first plate based on the first security section of the image; receiving a back side image having a second information section and a second security section; generating a second plate having a second microprinting formed in the second plate based on the second security section of the image; printing on a front side of the substrate with an offset printing press; applying ink in a first color to the substrate in a first printing unit of the offset printing press having the first plate; aligning the substrate to print on the back side of the substrate; applying ink in a second color the substrate in a second printing unit of the offset printing press having the second plate; capturing a visual media file with a camera connected to the offset printing press of the front side of the substrate with reflected light, the back side of the substrate with reflected light, the front side of the substrate with transmitted light, and the back side of the substrate with transmitted light; and determining with a microprocessor running computer executable code non-transitorily stored on tangible computer readable media that: the first microprinting appears as front side markings of first portions of a plurality of characters having dimensions in a micrometer range when viewed from the front side with reflected light, the second microprinting appears as back side markings of second portions of the plurality of characters having dimensions in the micrometer range when viewed from the back side with reflected light, and the first microprinting and the second microprinting appear as whole characters of the plurality of characters when viewed with transmitted light.

In yet another example embodiment, a system for printing markings on a substrate comprises a printsetter including non-transitory computer readable instructions stored on a tangible computer read storage medium. The instructions causes a microprocessor connected to the printsetter to: receive a front side image having a first information section and a first security section; generate a first plate having a first microprinting formed in the first plate based on the first security section of the image; receive a back side image having a second information section and a second security section; and generate a second plate having a second microprinting formed in the second plate based on the second security section of the image. The front side image includes front side markings which correspond to the first microprinting and have dimensions in a micrometer range. The back side image includes back side markings which correspond to the second microprinting and have dimensions in the micrometer range. The front side markings include first portions of a plurality of characters. The back side markings include second portions of the plurality of characters. The first portions and the second portions are configured to offset print an image which, when viewed with transmitted light, shows the plurality of characters as whole characters having dimensions in the micrometer range.

Other features and aspects will become apparent from the following detailed description, which taken in conjunction with the accompanying drawings illustrate, by way of example, the features in accordance with embodiments of the claimed subject matter. This summary is not intended to identify key or essential features of the claimed subject matter, nor is it intended to limit the scope of the claimed subject matter, which is defined solely by the claims attached hereto.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

One or more example embodiments of the subject matter are described in detail with reference to the following drawings. These drawings are provided to facilitate understanding of the present subject matter and should not be read as limiting the breadth, scope, or applicability thereof. For purposes of clarity and ease of illustration, these drawings are not necessarily made to scale.

FIG. 49 illustrates an example of an offset microprinting in the corners of pages 17, 19, and 21 of the same passport.

FIG. 50 illustrates an example of an offset microprinting along the edges of three denominations in a banknote series.

Figure 1:
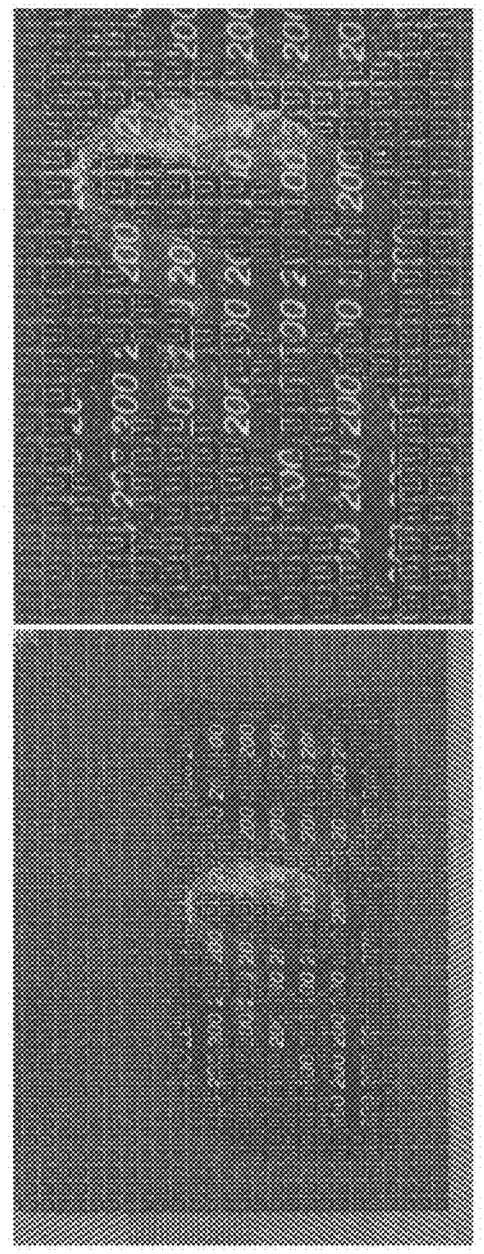
FIG. 1 illustrates an example of microprinting printed in metallic ink.

These drawings are not intended to be exhaustive or to limit the subject matter to the precise form(s) disclosed. It should be understood that the present subject matter can be practiced with modification and alteration, and that the subject matter is limited only by the claims and the equivalents thereof.

DETAILED DESCRIPTION

As a security feature, microprinting plays a specific security role and there are limits to what can be achieved by optimizing it. However, microprinting is also among the most economical of security features and offers security designers considerable flexibility in combating not just digital counterfeiting, but also traditional counterfeiting. The microprinting strategies discussed here are presented as a framework, and many novel combinations of these individual font or microprinting pattern customization techniques can be combined with one another. Additionally, microprinting security can be about much more than artwork. Microprinting design strategies can relate to microprinting ink color (including multiplate offset and multicolor intaglio) and microprinting placement as it relates to user ergonomics and document alteration resistance.

The present disclosure explores how microprinting can be optimized to exploit its advantages and/or mitigate its disadvantages. As is often the case in security printing, the answers are design and press capabilities. Examples include font and artwork options for microprinting, color gamut, and microprinting placement. The strategies described are presented for informational purposes and may or may not be appropriate for specific security document applications or manufacturable by all security printers.

Print resolution and size are not the only appropriate criteria for evaluating microprinting. Fonts and macro microprinting patterns can be designed to combat traditional counterfeiting in addition to digital counterfeiting. Both ink gamut and press capabilities can improve resistance to both digital and traditional counterfeiting. The above describes how security artwork design strategies can help microprinting resist traditional counterfeiting. The following discusses how microprinting placement facilitates document inspection ergonomics and alteration resistance. Microprinting graphics are displayed in pairs. In most cases, the left image was captured at lower magnification (usually 10×) to show context in the document and the right image (usually 18×) to show greater detail.

Microprinting Artwork and Color for Counterfeit Resistance

Ink Gamut and Process Color

For microprinting to combat digital counterfeiting, color gamut can be as important as resolution. Most consumer inkjet devices use only CMYK process color cartridges, though a few have additional spot colors. One may consider the gamut of inks available to offset and intaglio printing technologies that cannot be simulated by CMYK or even a wider gamut of inkjet colors. These may include metallic ink (FIG. 1), white (or opaque pastel) ink (FIG. 2), dry embossing (FIGS. 3 and 4), color shifting ink (FIG. 5), ultraviolet-responsive ink (FIG. 6), or even iridescent, fluorescent, or clear inks. Though certain specialty digital printing technologies can simulate some of these unique inks, most inkjet devices cannot, so that counterfeiters would need specialized printing equipment. This introduces both registration and resolution problems relevant to counterfeiter simulation of microprinting.

FIG. 1 illustrates an example of microprinting printed in metallic ink. Even if a counterfeiter can simulate the metallic specular reflectance, the simulation printing process may not be capable of tiny microprint details.

Figure 2:
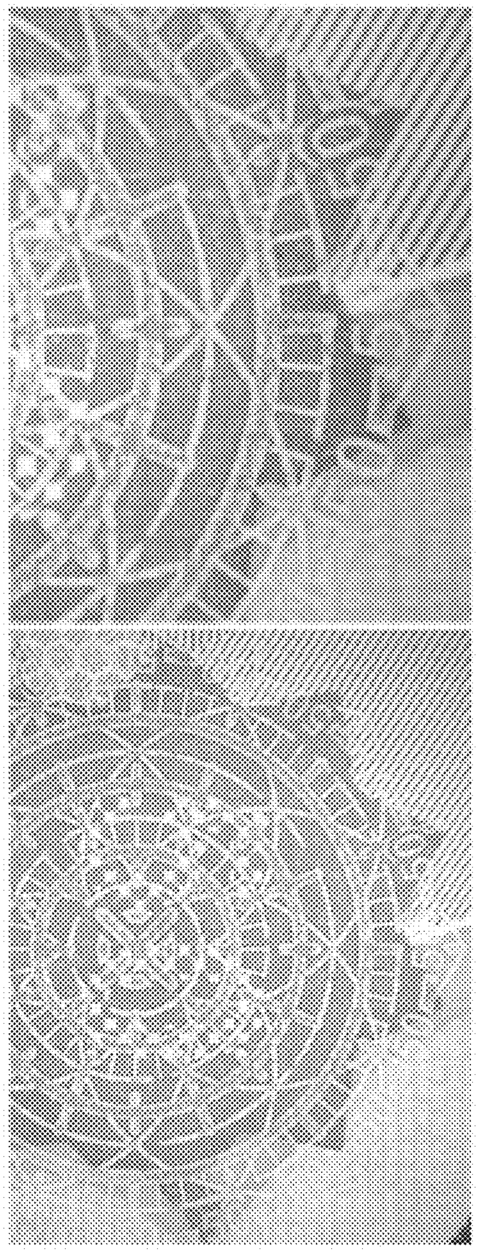
FIG. 2 illustrates an example of white ink intaglio artwork, including some microprinted numerals.

FIG. 2 illustrates an example of white ink intaglio artwork, including some microprinted numerals. Even if a counterfeiter can simulate the white ink art or intaglio texture, the simulation printing process may not be capable of tiny microprinting.

Figure 3:
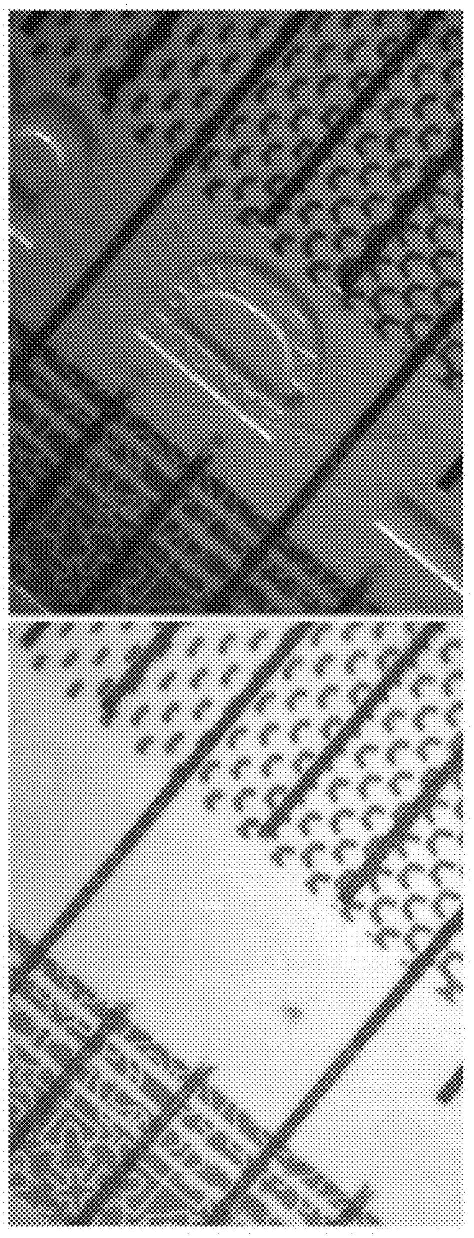
FIG. 3 illustrates an example of an intaglio and dry embossing design containing microprinting, in reflected light on the left and oblique light on the right.

FIG. 3 illustrates an example of an intaglio and dry embossing design containing microprinting, in reflected light on the left and oblique light on the right. Even if a counterfeiter can simulate the dry embossing art or texture, the simulation printing process may not be capable of tiny microprinting.

Figure 4:
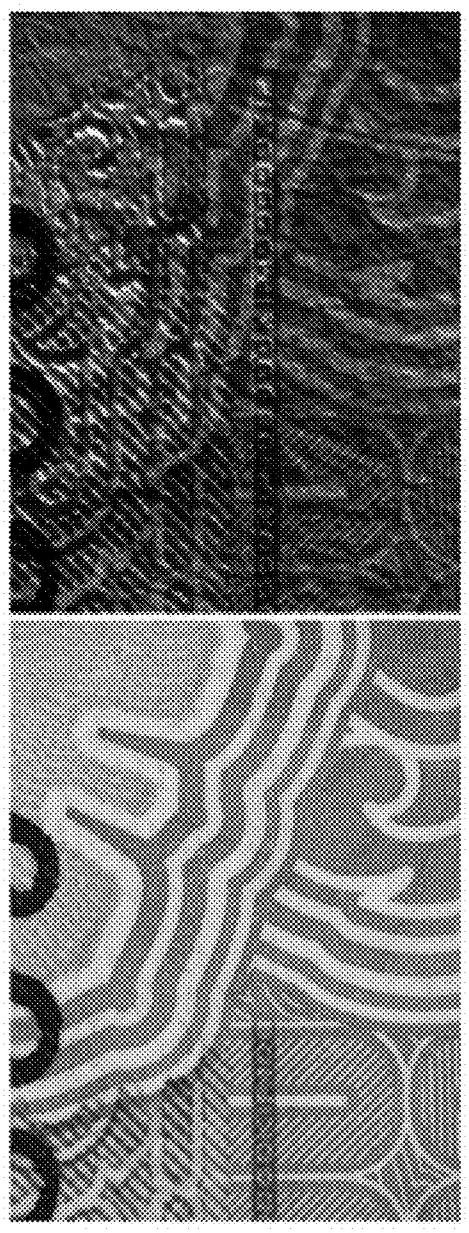
FIG. 4 illustrates another example of an intaglio and dry embossing design containing microprinting, in reflected light on the left and oblique light on the right.

FIG. 4 illustrates another example of an intaglio and dry embossing design containing microprinting, in reflected light on the left and oblique light on the right. Even if a counterfeiter can simulate the dry embossing art or texture, the simulation printing process may not be capable of tiny microprinting.

Figure 5:
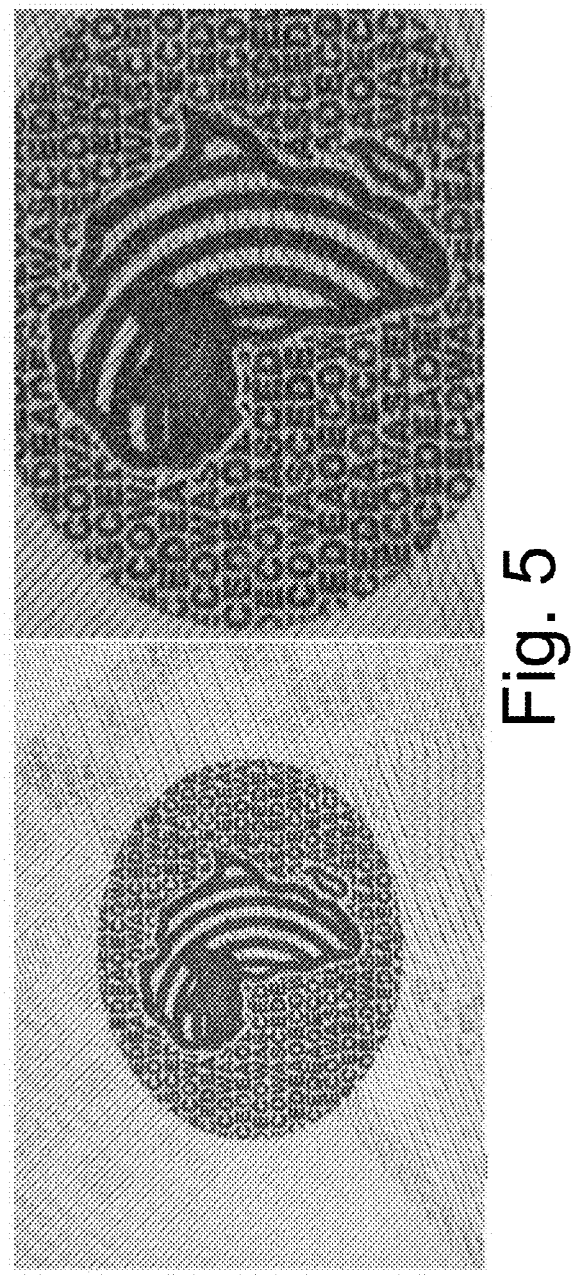
FIG. 5 illustrates an example of an intaglio color shifting ink design containing microprinting.

FIG. 5 illustrates an example of an intaglio color shifting ink design containing microprinting. Even if a counterfeiter can simulate the texture or color shift, the simulation printing process may not be capable of tiny microprinting details.

Figure 6:
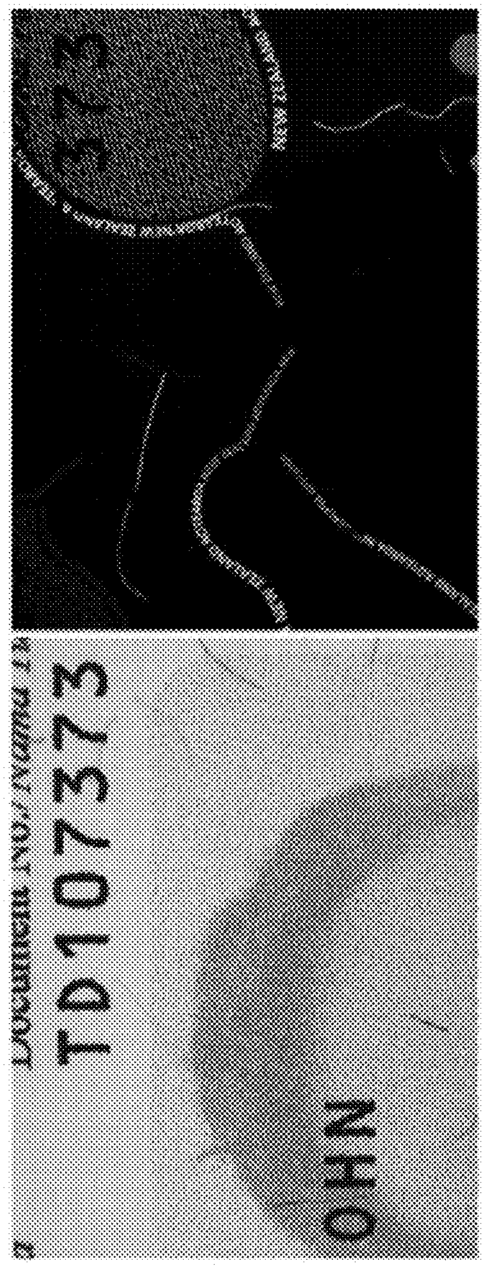
FIG. 6 illustrates an example of an ultraviolet (UV) ink design containing microprinting.

FIG. 6 illustrates an example of an ultraviolet (UV) ink design containing microprinting. Even if a counterfeiter can simulate the UV response, the simulation printing process may not be capable of tiny microprinting details.

Returning to color gamut and using a metallic ink (FIG. 1) to illustrate, its specular reflectance cannot be simulated well by CMYK. This motivates inkjet counterfeiters to adopt an additional, non-inkjet process for simulation of metallic ink features, which does three things. First, it adds expense and labor to the counterfeiting workflow. Second, the counterfeiter must align the inkjet artwork with non-inkjet metallic artwork, which can introduce registration problems. Third, counterfeiters may simulate metallic ink features using processes incapable of the level of resolution required for readable microprinting. This example illustrates how genuine document manufacturers can combine a specialty ink that cannot be simulated well by CMYK (metallic) with a printing process capable of high microprinting detail (offset or intaglio) in response to the question of whether CMYK inkjet printers have enough resolution to simulate spot color microprinting. Counterfeiters attacking metallic ink microprinting must address both gamut and resolution, not just one or the other.

Besides metallics, similar cases can be made for microprinting in other ink types not amenable to simulation by CMYK as shown in FIGS. 1 to 6. In the extreme case, one may consider a security document containing no spot color artwork, designed exclusively with metallic, iridescent, color shifting, white, clear, and UV-reactive inks, and dry embossing. Such a document would photocopy poorly, could not be convincingly counterfeited by CMYK alone, and would prevent purely CMYK counterfeiting workflows.

Split Fountains and Color Saturation

Just as microprinting can be integrated with specialty inks, it can also be integrated with security printing techniques associated with offset printing. Some examples include microprinting combined with see-through register (FIG. 7) or with split fountains (FIGS. 8 and 9).

Figure 7:
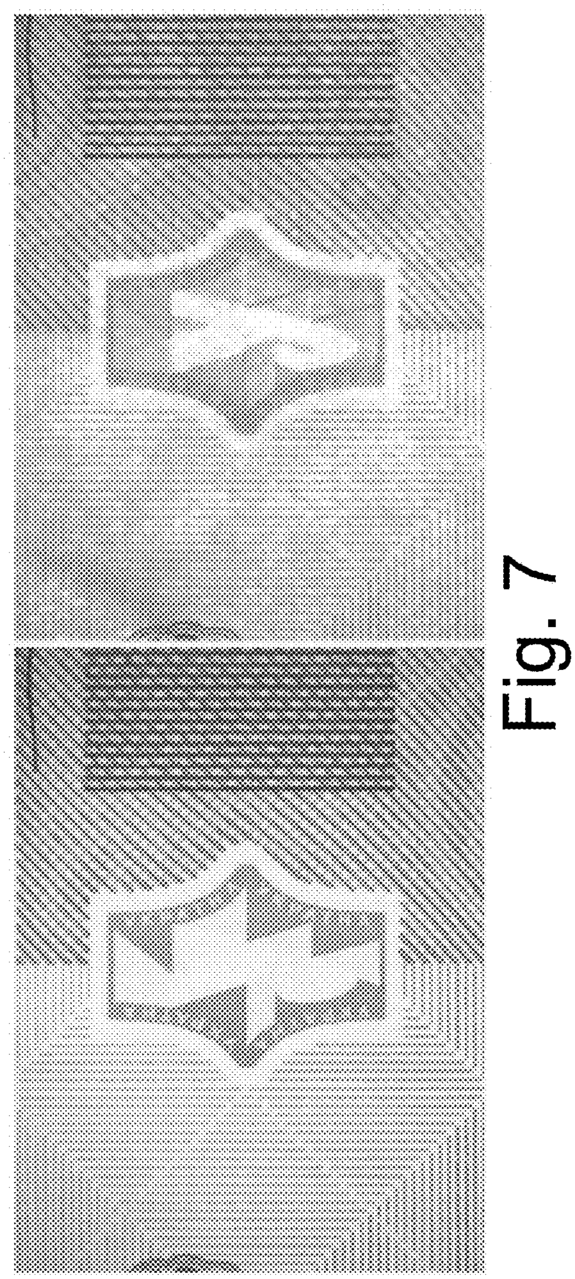
FIG. 7 illustrates an example of offset microprinting incorporated into a see-through register design viewed in reflected light (left) and transmitted light (right).

FIG. 7 illustrates an example of offset microprinting incorporated into a see-through register design viewed in reflected light (left) and transmitted light (right). The microprinting detail is lost in transmitted light, but its presence in the reflected light see-through register image can add value against certain methods of simulation.

Figure 8:
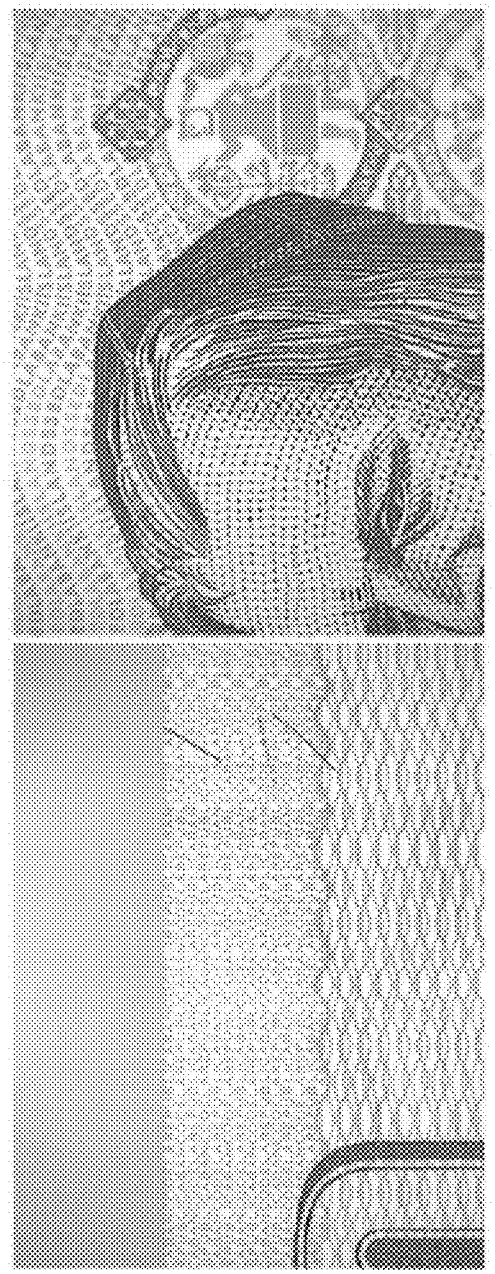
FIG. 8 illustrates an example of offset microprinting incorporated in a one-plate split fountain (left) and in a two-plate split fountain (right).

FIG. 8 illustrates an example of offset microprinting incorporated in a one-plate split fountain (left) and in a two-plate split fountain (right). Good microscopic plate registration is needed for the two-plate image on the right.

Figure 9:
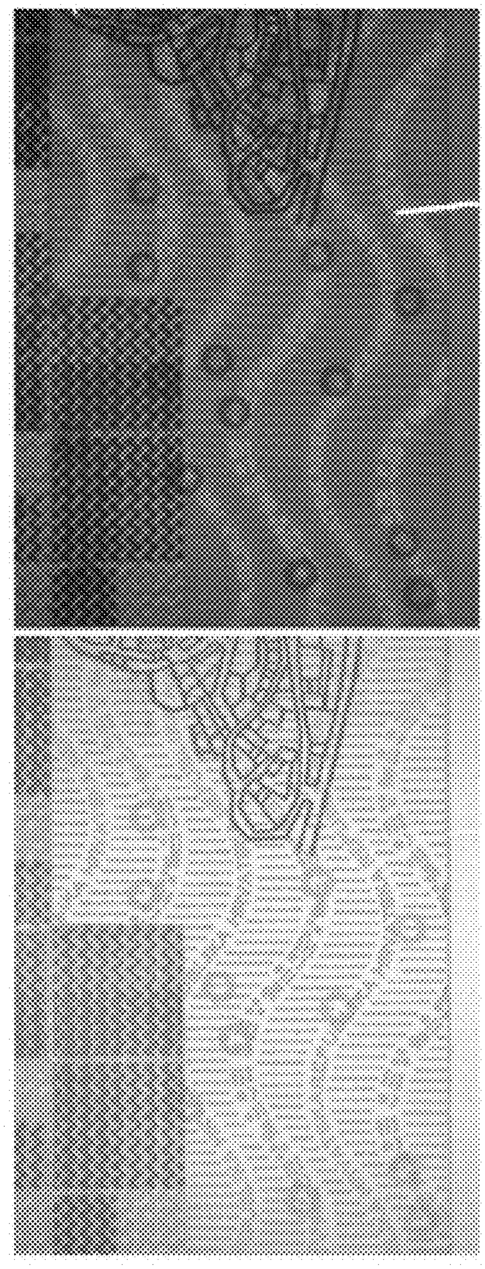
FIG. 9 illustrates an example of offset microprinting incorporated in a split fountain between two inks that have both visible and UV properties, in reflected light (left) and UV light (right).

FIG. 9 illustrates an example of offset microprinting incorporated in a split fountain between two inks that have both visible and UV properties, in reflected light (left) and UV light (right).

The split fountains in FIGS. 8 and 9 show the typical spot-to-spot color transitions for which split fountains are almost universally used, but a split fountain transition may also be between different color saturations. This would create the appearance of a gradual reduction in the spot color saturation without a corresponding change in line thickness.

Figure 10:
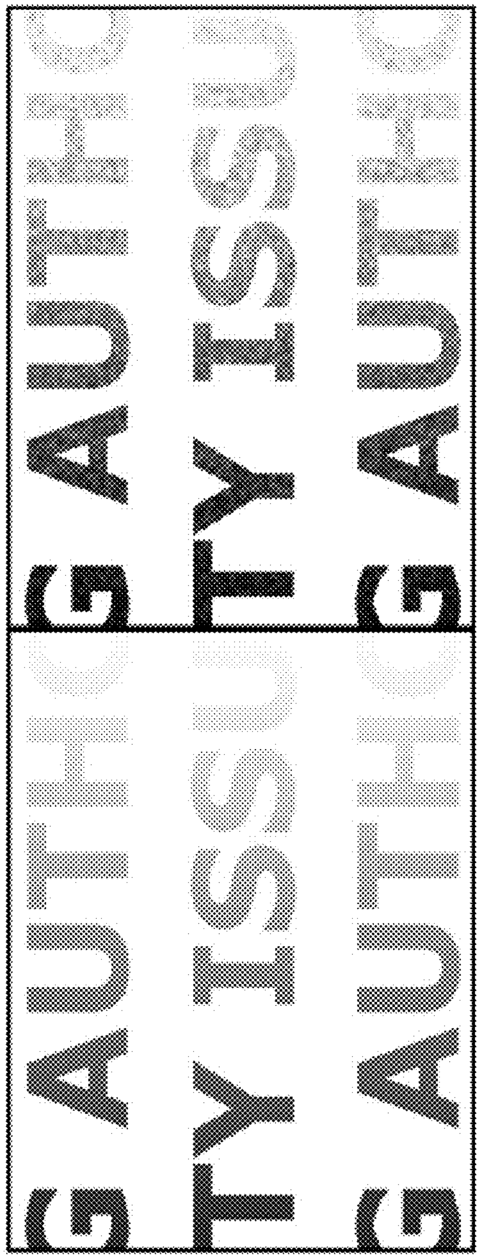
FIG. 10 illustrates an example of an offset split fountain transition as compared to an inkjet simulation of the split.

FIG. 10 illustrates an example of an offset split fountain transition as compared to an inkjet simulation of the split. On the left is a mock-up of an offset split fountain transition between a high-saturation spot color ink and a clear ink, creating a fade across a microprinting design of fixed line width. On the right is a mock-up of an inkjet simulation of the split on the left. In the inkjet simulation, identifying colored dots is easier in areas of low color saturation where fewer inkjet dots are placed over the same surface area, and more difficult where the saturation is higher and the dots overlap one another. The split on the left side transitions the high-saturation blue ink to the clear ink across the mock-up microprinting design without line width modulation, halftones, or process colors. The microscopic appearance of gradually fading characters would be highly specific to the offset split fountain printing technology and is a way to make microprinting harder to simulate using inkjet.

As for the simulation by inkjet of the design on the right side of FIG. 10, an inkjet printer can fully overlap inkjet dots in higher-saturation image areas, preventing individual inkjet dots from standing out and making the microscopic print more closely resemble offset. However, as the saturation falls across the width of the simulated split fountain, the inkjet printer reduces dot quantity and increases dot spacing to make the macro image look lighter, eventually forcing dot separation at the microscopic level. With magnification, this negatively impacts microprinting readability, makes the presence of inkjet dots easier to identify, and reduces confusion with offset. Blue ink and clear ink are used in the example in FIG. 10, but the darker ink could be metallic, the clear ink could be a lighter ink of lower pigment concentration, or many other possible combinations.

Offset, Color, and Plate Registration

Many security documents contain microprinting from several offset plates, but rarely together in a single coherent microprinting design. The advantage of using multiple plates for a single microprinting design is to force traditional counterfeiters to achieve high register or risk unreadable microprinting at the microscopic level. Many genuine security document manufacturers have security presses designed for tight microscopic register, but traditional counterfeiters often make do with lesser equipment.

Figure 16:
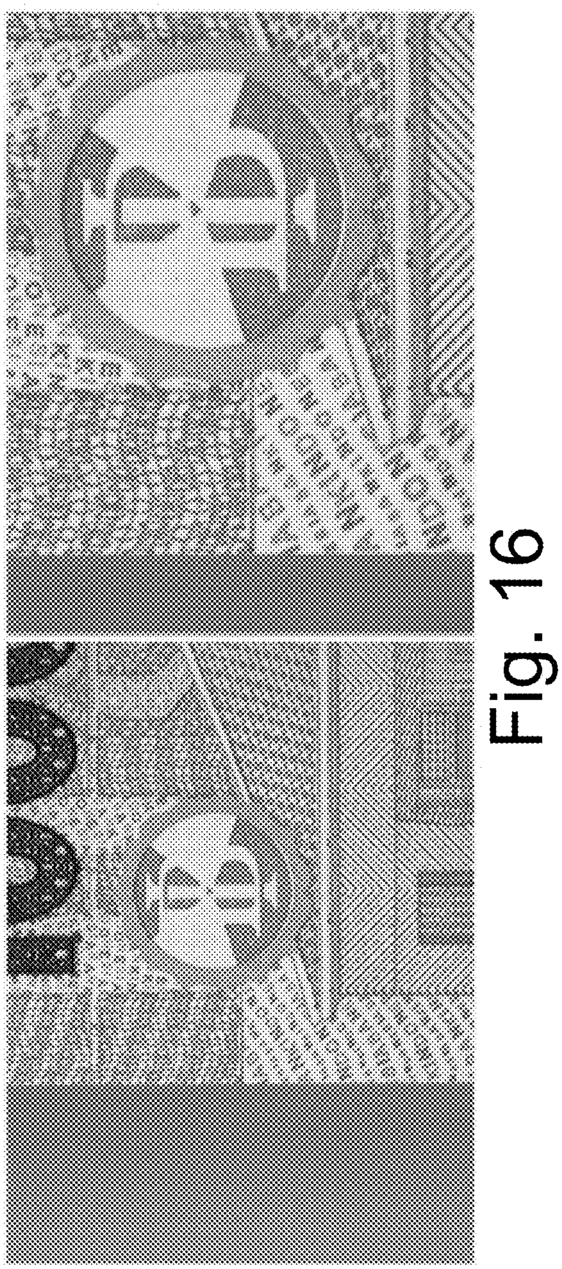
FIG. 16 illustrates an example of a three-plate offset microprinting design with adjacent characters segregated by color.
Figure 17:
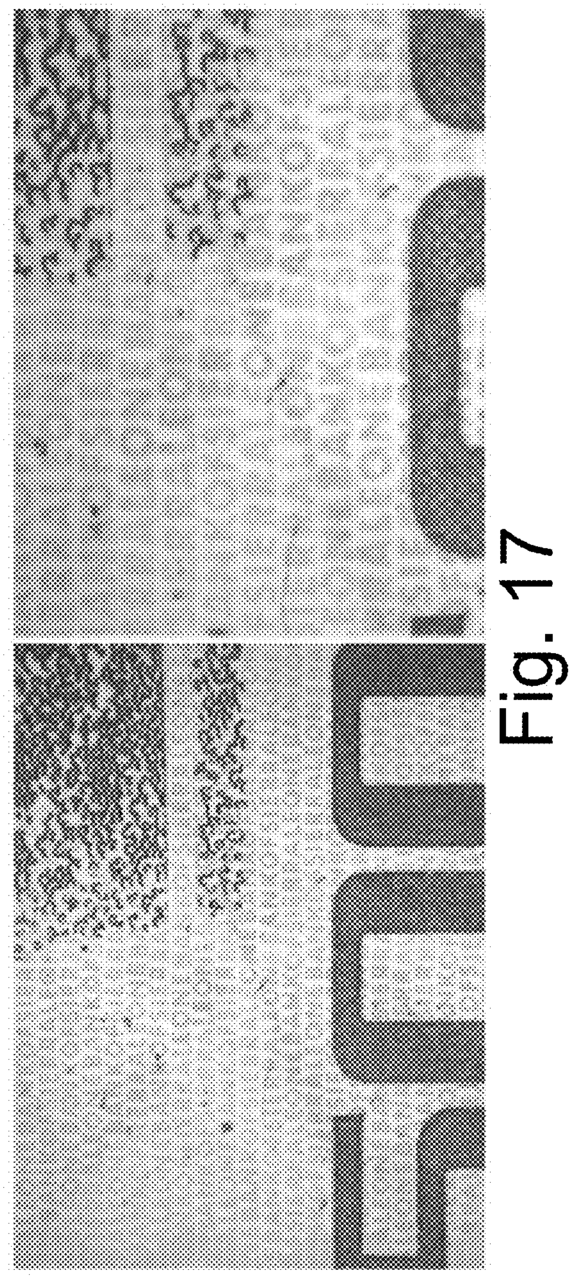
FIG. 17 illustrates an example of a two-plate offset microprinting design with individual characters along the green/purple color boundaries divided between two plate images.
Figure 18:
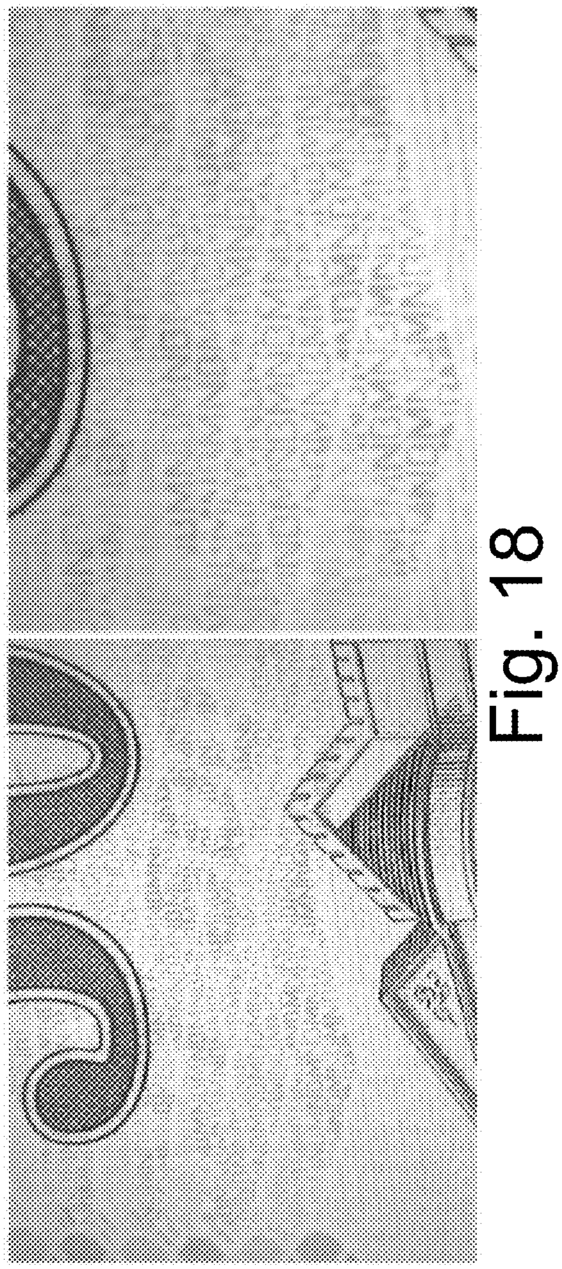
FIG. 18 illustrates an example of a three-plate offset microprinting design with individual characters along the color boundaries divided between two plate images.

Multiplate microprinting formats may include alternating lines (FIGS. 11 and 12), adjacent character strings (FIGS. 13 and 14), adjacent individual characters (FIGS. 15 and 16), or even partitioning of individual characters across multiple plates (FIGS. 17 and 18). For all these examples, one may consider what registration capabilities are required of the genuine document manufacturer, what registration problems a traditional offset counterfeiter might experience, and the impact poor register would have on microprinting readability.

Figure 11:
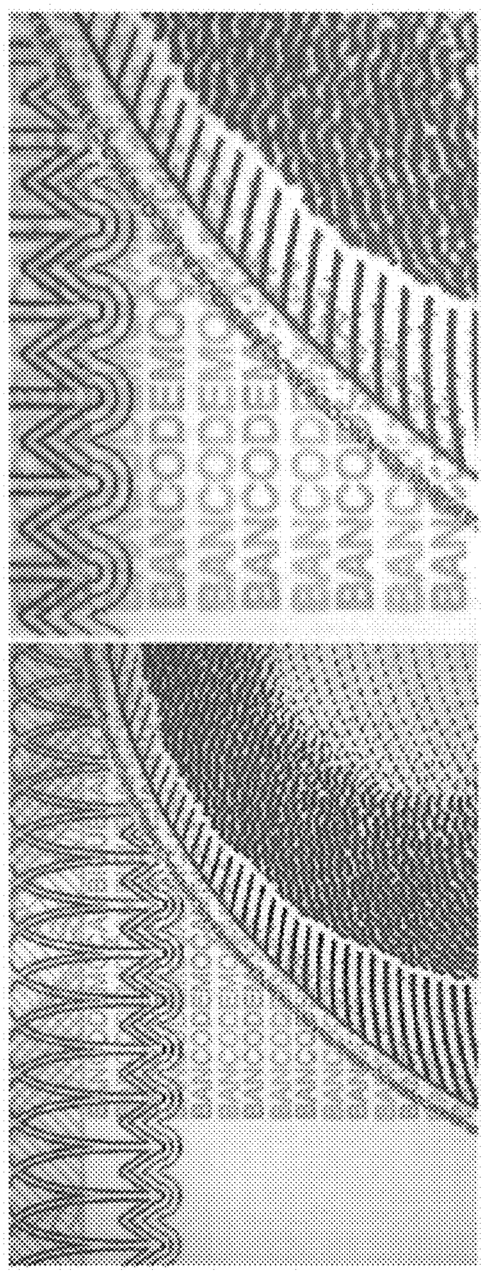
FIG. 11 illustrates an example of a two-plate offset microprinting design with alternating lines segregated into purple and blue colors.

FIG. 11 illustrates an example of a two-plate offset microprinting design with alternating lines segregated into purple and blue colors. A poorly registered traditional counterfeit could show misalignment or overlap between blue text and purple text but might not result in illegibility within each line.

Figure 12:
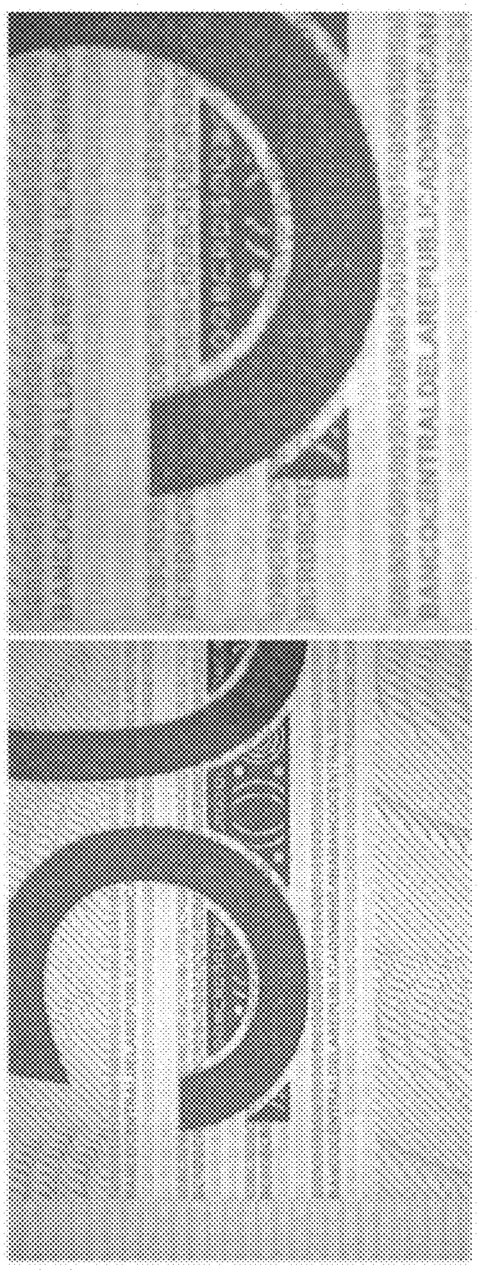
FIG. 12 illustrates an example of a four-plate offset microprinting design with sequential lines segregated into four colors.

FIG. 12 illustrates an example of a four-plate offset microprinting design with sequential lines segregated into four colors. A poorly registered traditional counterfeit could show misalignment or overlap between text of different colors but might not result in illegibility within each line.

Figure 13:
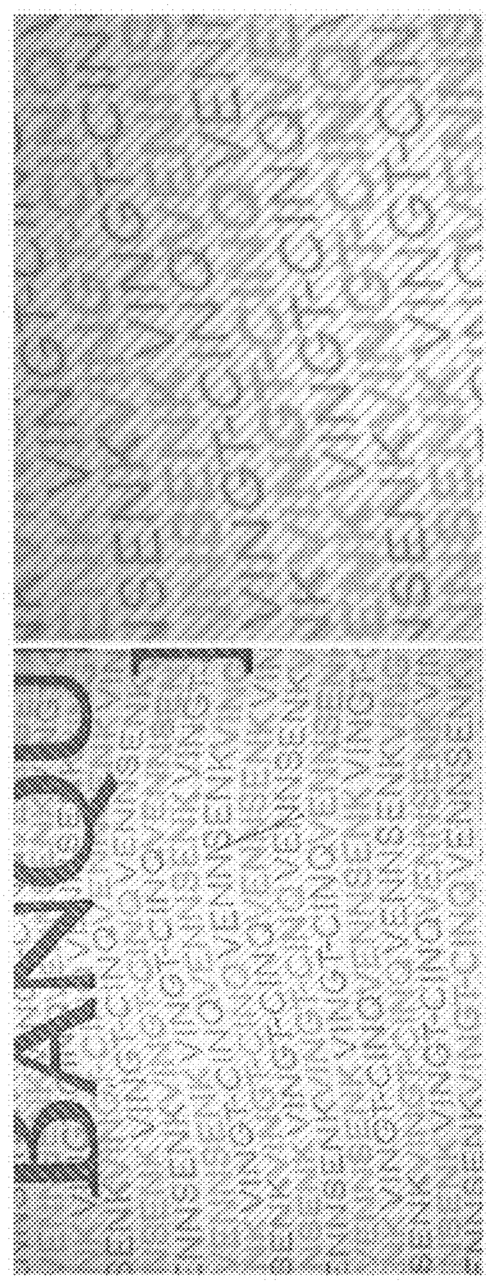
FIG. 13 illustrates an example of a two-plate offset microprinting design with adjacent character strings segregated by color.

FIG. 13 illustrates an example of a two-plate offset microprinting design with adjacent character strings segregated by color. A poorly registered traditional counterfeit could show misalignment or overlap between red text and green text but might not result in illegibility within each character string.

Figure 14:
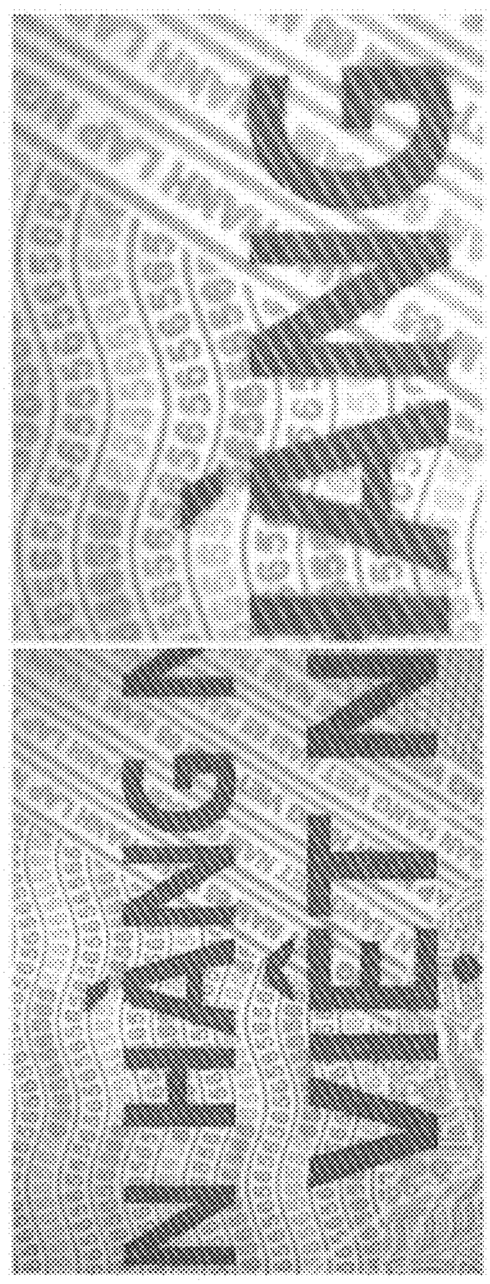
FIG. 14 illustrates an example of a three-plate offset microprinting design with adjacent character strings segregated by color.

FIG. 14 illustrates an example of a three-plate offset microprinting design with adjacent character strings segregated by color. A poorly registered traditional counterfeit could show misalignment or overlap between text of different colors but might not result in illegibility within each character string.

Figure 15:
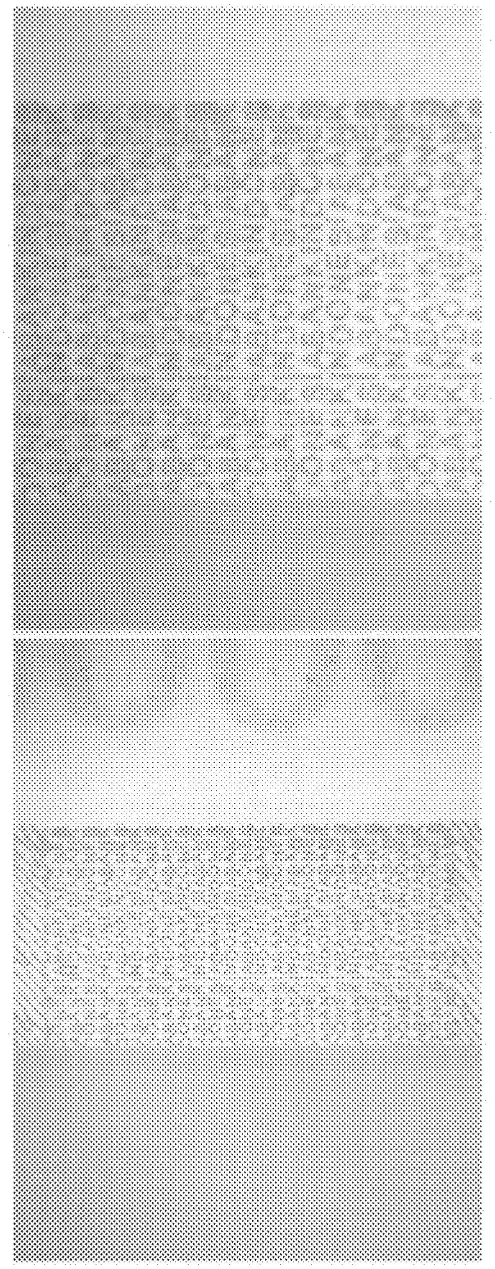
FIG. 15 illustrates an example of a two-plate offset microprinting design with adjacent characters segregated by color.

FIG. 15 illustrates an example of a two-plate offset microprinting design with adjacent characters segregated by color. Poor color registration in a traditional counterfeit of this design could break up complete words and result in microprinting illegibility.

FIG. 16 illustrates an example of a three-plate offset microprinting design with adjacent characters segregated by color. Poor registration in a traditional counterfeit of this design could break up complete words and result in microprinting illegibility.

FIG. 17 illustrates an example of a two-plate offset microprinting design with individual characters along the green/purple color boundaries divided between two plate images. Poor registration in a traditional counterfeit would split the divided characters in half and make only those unreadable. However, legibility for most of the single-color microprinting could be unaffected by registration.

FIG. 18 illustrates an example of a three-plate offset microprinting design with individual characters along the color boundaries divided between two plate images. Poor registration in a traditional counterfeit would split the divided characters in half and make only those unreadable. However, legibility for most of the single-color microprinting could be unaffected by registration.

While poor plate registration could affect legibility in all of FIGS. 11 to 18, it might be most noticeable in FIGS. 15 to 18. In FIGS. 15 and 16, significant misregistration would break up words, though individual characters would always remain intact and legible. In FIGS. 17 and 18, certain individual characters along the color boundaries are divided between two plate images. If the plates were out of register, the readability of the divided characters would be impacted, but only along the limited color boundary where the plate images interface. The approaches in FIGS. 15 to 18 could be joined in a new strategy in which each complete character requires art from at least two plates.

Figure 19:
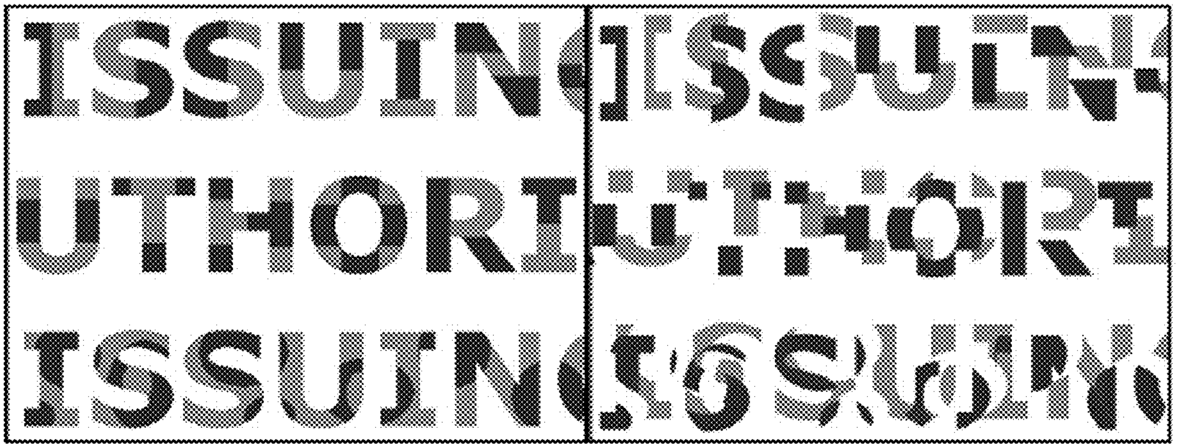
FIG. 19 illustrates an example of two-plate mock-up genuine offset microprinting design on the left and simulation by a traditional counterfeiter on the right, though the concept could include three or more plates.

FIG. 19 illustrates an example of two-plate mock-up genuine offset microprinting design on the left and simulation by a traditional counterfeiter on the right, though the concept could include three or more plates. Each individual character is multicolor, so that microscopic plate misalignment would break up characters and make the text illegible. On the right side, the simulation by a traditional counterfeiter uses a two-color offset process but without good microscopic registration. Just as limited inkjet printer resolution can make microprinting in a digital counterfeit illegible, poor registration in an offset counterfeit of the artwork in FIG. 19 can make it illegible. The microprinting in FIG. 19 could also be designed in negative, with blank substrate in the interior of the characters surrounded by multicolor offset ink coating the substrate.

The left side of FIG. 19 shows the two-plate mock-up offset microprinting design combining aspects of the microprinting designs shown in FIGS. 15 to 18. Every character contains artwork from both plates, in good register. On the right is the mock-up of a poorly registered traditional counterfeit showing how lack of register can destroy legibility, especially in the bottom row. Maintaining quality control for such a two-plate design would require a genuine document manufacturer to demonstrate tight and consistent registration. If the registration capabilities of the genuine document manufacturer are uncertain, this approach should not be used.

Intaglio, Color, and Engraving Depth

The multiplate offset microprinting examples in FIGS. 11 to 19 require exacting microscopic registration. However, multicolor intaglio microprinting (or, alternatively, Orlov printing) allows several ink colors to be printed from one intaglio plate in one step.

Figure 20:
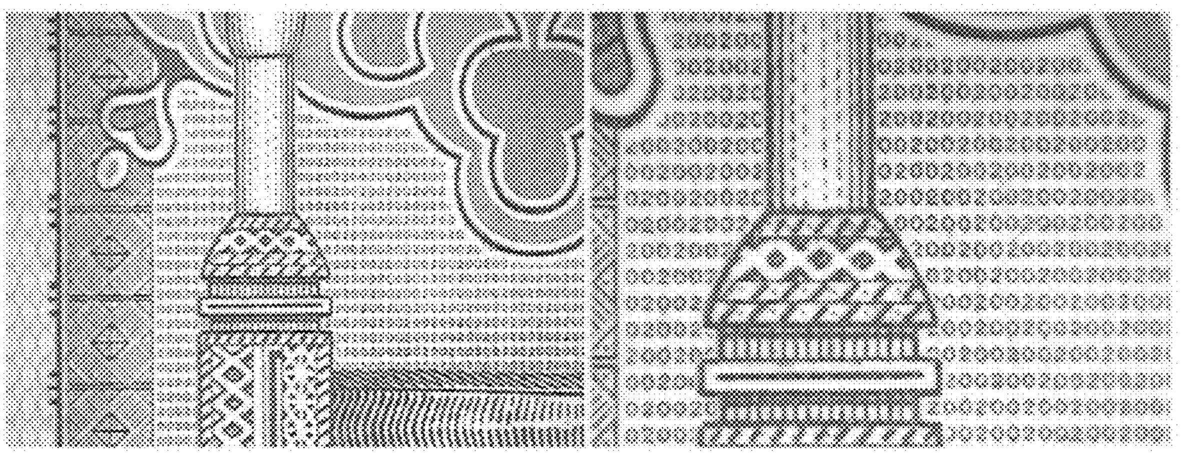
FIG. 20 illustrates an example of an intaglio microprinting positive design from a plate inked with brown, maroon, and green inks, with perfect character alignment across colors.

FIG. 20 illustrates an example of an intaglio microprinting positive design from a plate inked with brown, maroon, and green inks, with perfect character alignment across colors. A traditional counterfeiter simulating this art by offset would likely use three separate plates, introducing registration problems.

Figure 21:
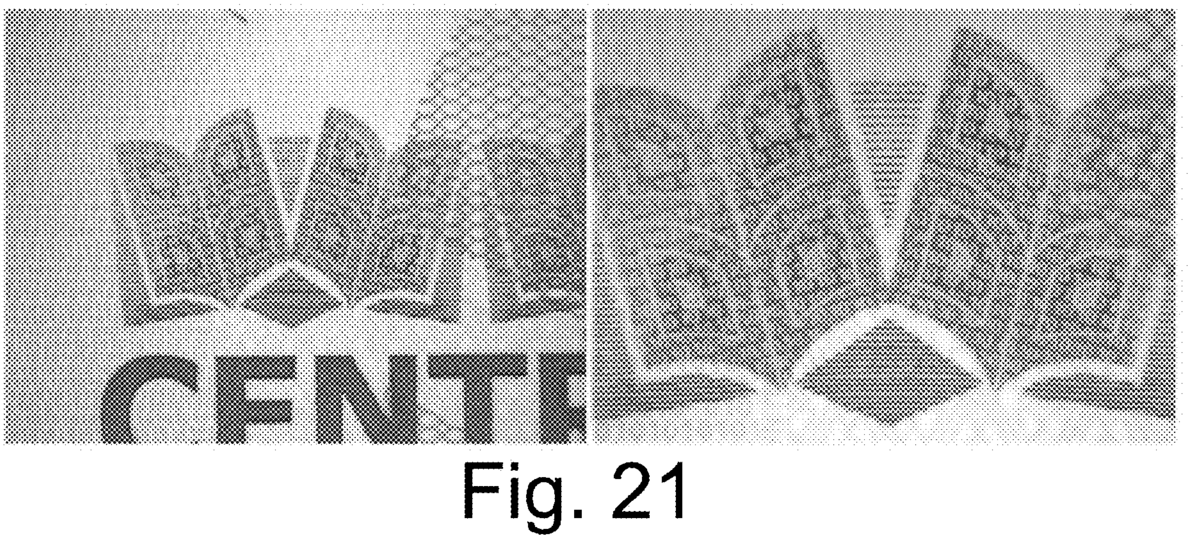
FIG. 21 illustrates an example of an intaglio microprinting design from a plate inked with red and blue inks, with perfect character alignment across colors.

FIG. 21 illustrates an example of an intaglio microprinting design from a plate inked with red and blue inks, with perfect character alignment across colors. A traditional counterfeiter simulating this art by offset would likely use two separate plates, introducing registration problems.

Figure 22:
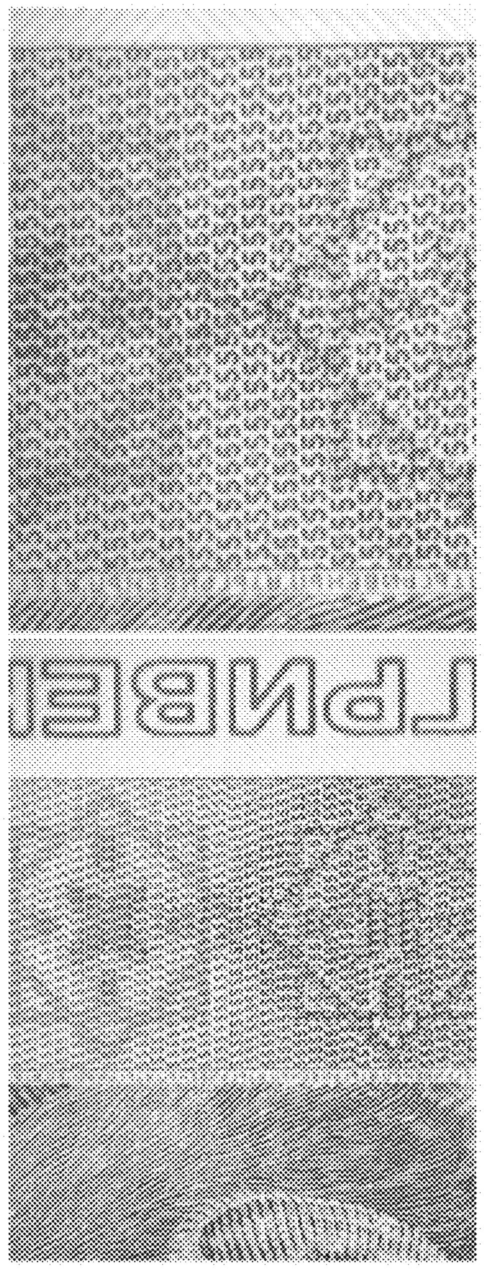
FIG. 22 illustrates an example of an intaglio microprinting design containing artwork from a plate inked with brown and blue inks, with perfect character alignment across colors.

FIG. 22 illustrates an example of an intaglio microprinting design containing artwork from a plate inked with brown and blue inks, with perfect character alignment across colors. A traditional counterfeiter simulating this art by offset would likely use two separate plates, introducing registration problems.

Although precise color placement within the intaglio artwork can vary with plate inking and wiping tolerances, registration between artwork elements within the same plate will not vary. For example, the parallel rows of text in the intaglio microprinting designs shown in FIGS. 20 to 22 contain multiple ink colors, but character alignment does not vary across the color transitions. Many traditional counterfeiters do not have skills or equipment for intaglio, and those that do may not have good control over plate engraving depths, prompting simulation by offset. If simulated by offset, each color in FIGS. 20 to 22 could be applied in a separate printing step, introducing the risk of microscopic misalignment.

Figure 23:
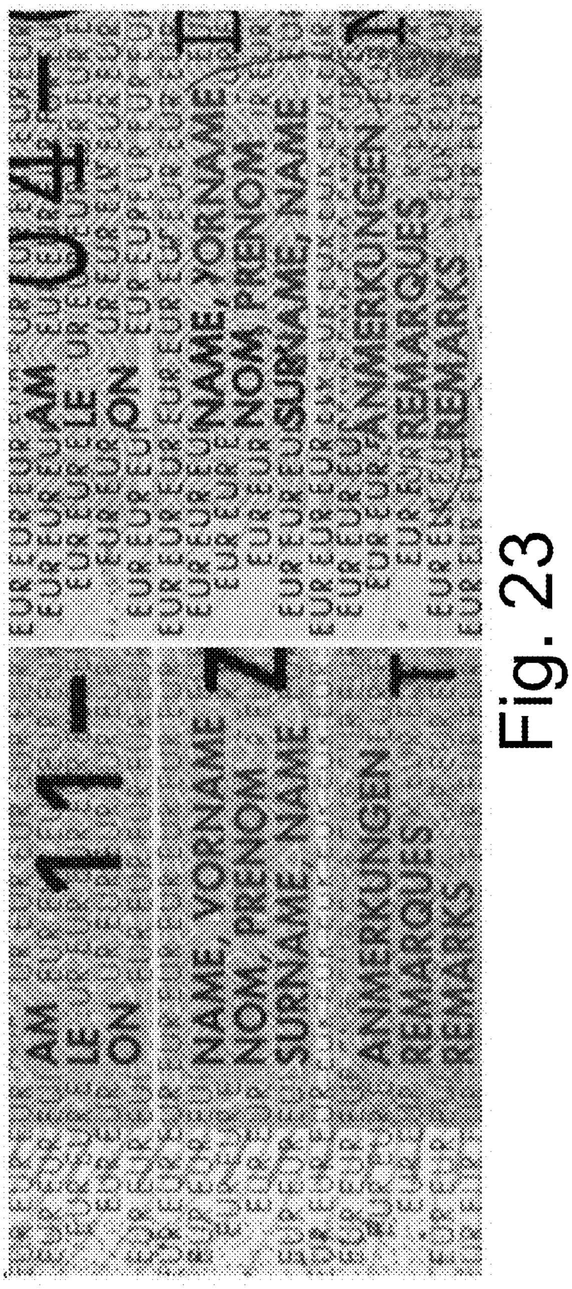
FIG. 23 illustrates an example of genuine multicolor intaglio microprinting and one possible type of offset counterfeit in which the colors are out of register, breaking up characters.

FIG. 23 illustrates an example of genuine multicolor intaglio microprinting and one possible type of offset counterfeit in which the colors are out of register, breaking up characters.

On the left is a genuine multicolor intaglio design, with blue and green microprinting in perfect register because they are printed at the same time from the same printing plate. On the right is an offset counterfeit of the design on the left with the blue and green applied in two printing steps, leading to microscopic misregistration and illegibility of individual characters along the blue/green boundary.

Figure 24:
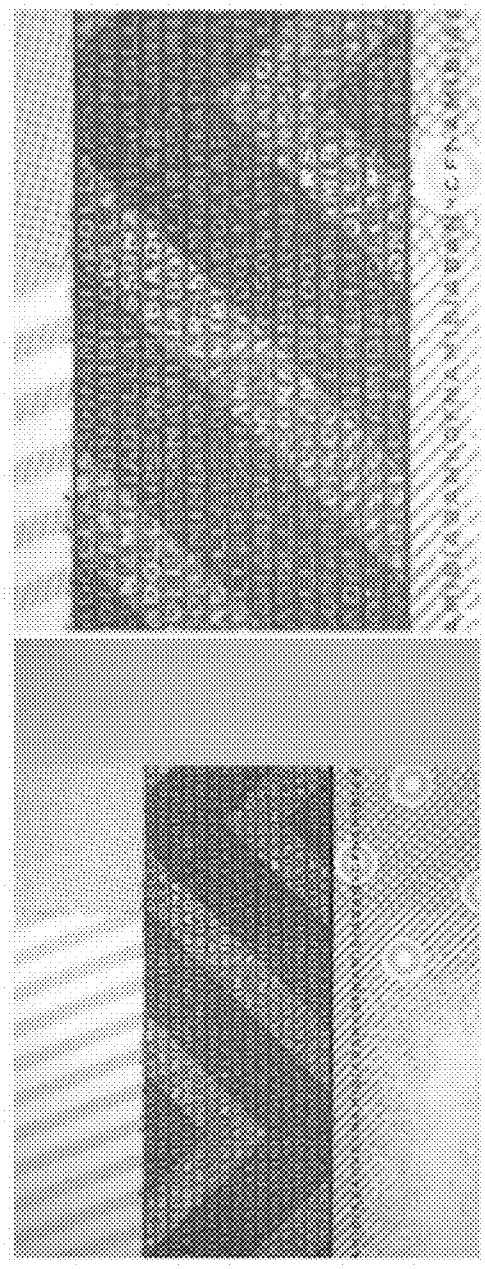
FIG. 24 illustrates an example of intaglio microprinting negative design from a plate inked with one green and one black ink.
Figure 25:
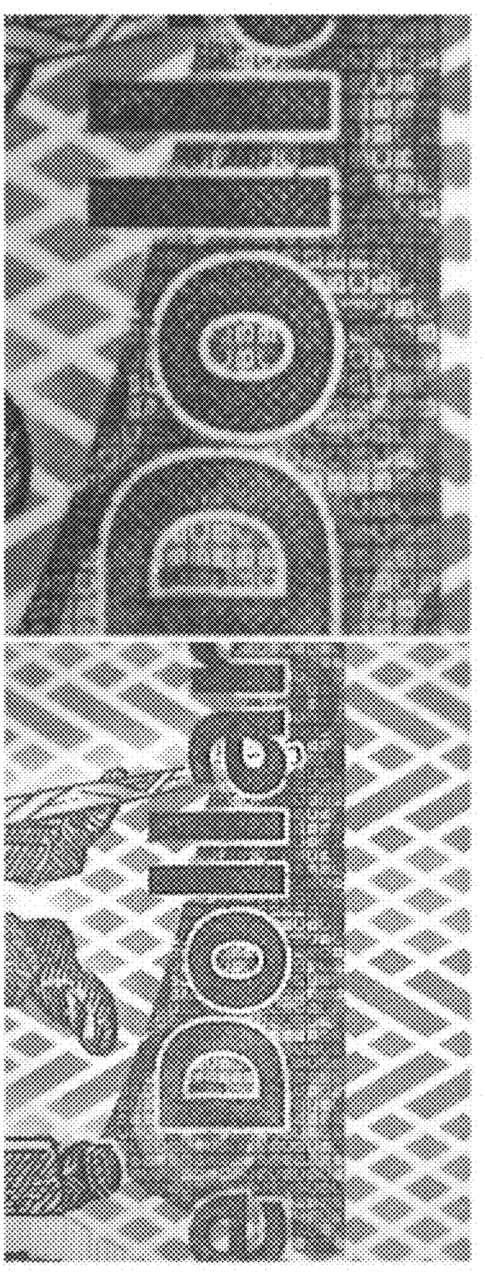
FIG. 25 illustrates an example of intaglio microprinting negative design from a plate inked with light green, dark green, and brown inks.

The engravings in FIGS. 20 to 22 are of similar depth, meaning that the chroma (or saturation) of each printed ink color is generally consistent. However, changing the depth of an intaglio engraving can change the thickness of the ink layer printed from that artwork. A thinner ink layer results in lower saturation and a thicker ink layer produces higher saturation. FIGS. 24 and 25 show how combining two engraving depths with two inks varies in both color and saturation, producing four combinations.

FIG. 24 illustrates an example of intaglio microprinting negative design from a plate inked with one green and one black ink. The plate artwork was engraved at two depths, producing two distinct saturations within each ink color for light/dark green and grey/black appearances.

FIG. 25 illustrates an example of intaglio microprinting negative design from a plate inked with light green, dark green, and brown inks. The circular patterns intersecting the microprinting were engraved at different depths, producing two distinct saturations within each ink color.

FIGS. 11 to 19 demonstrated offset multicolor microprinting designs. An analogous intaglio strategy could use multiple plate engraving depths to produce microprinting of different saturations in adjacent rows or characters, or even within individual characters. Unlike the prior offset examples, this strategy would not require fine multiplate artwork registration because the full intaglio design is printed from one plate. However, intaglio plate inking processes may not be sufficiently granular for fine effects like alternating the color of adjacent microprinted characters as was possible in the offset examples in FIGS. 15 and 16. Some examples of multicolor intaglio microprinting paired with multiple engraving depths are shown in FIGS. 24 and 25.

Most examples throughout this article consist of inked characters surrounded by blank substrate, which could be described as positive microprinting. In contrast, the multicolor and multi-saturation examples in FIGS. 24 and 25 (as well as FIGS. 1, 5, 7, and 21) could be described as negative microprinting, where the microprinted characters are blank substrate surrounded by a continuous inked image. Although FIGS. 24 and 25 are negative microprinting examples, multi-depth intaglio microprinting could also be designed in positive, using either a single ink color (FIG. 26) or multiple colors (FIG. 27).

Figure 26:
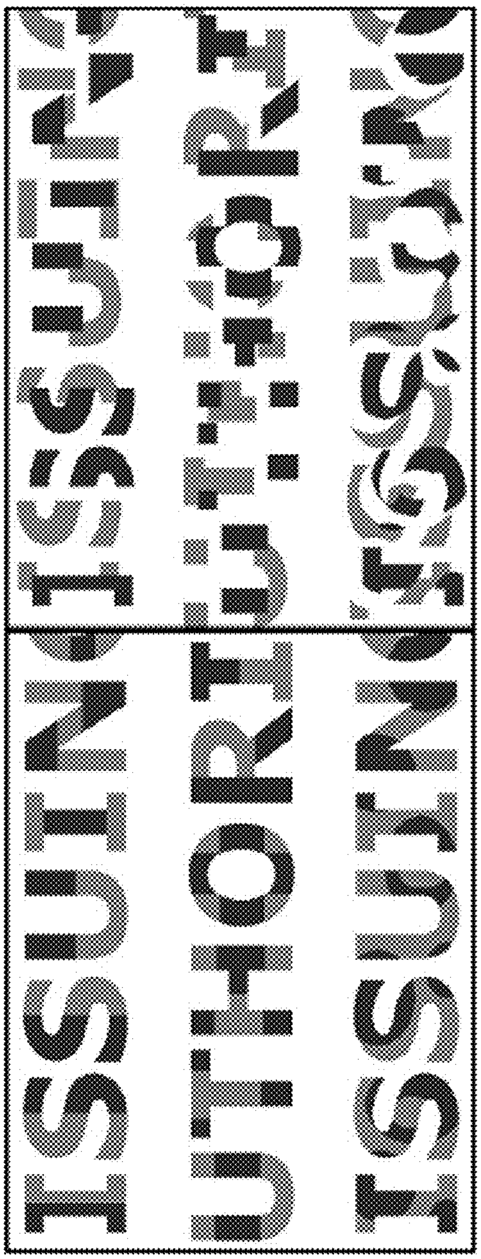
FIG. 26 illustrates, on the left, an example of a mock-up of a monochromatic intaglio microprinting design where each character contains a mix of two engraving depths, producing two saturations from a single blue ink; and, on the right, an example of a mock-up of a poorly registered two-plate offset simulation of the same design using a dark blue ink and a light blue ink.

FIG. 26 illustrates, on the left, an example of a mock-up of a monochromatic intaglio microprinting design where each character contains a mix of two engraving depths, producing two saturations from a single blue ink; and, on the right, an example of a mock-up of a poorly registered two-plate offset simulation of the same design using a dark blue ink and a light blue ink.

Figure 27:
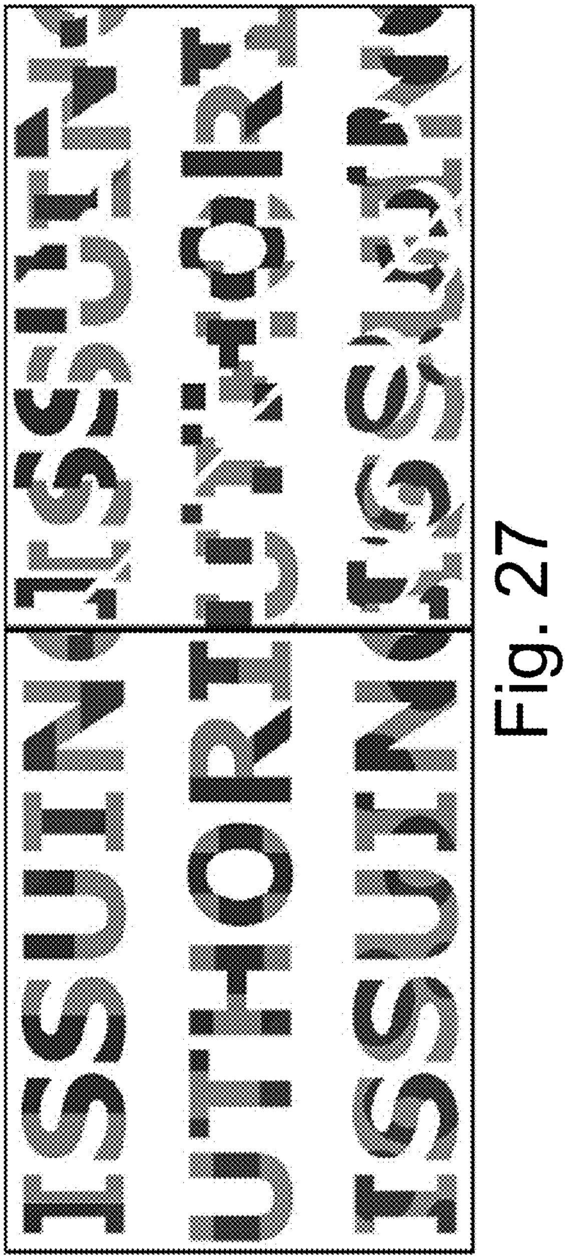
FIG. 27 illustrates, on the left, an example of a mock-up of a multicolor (green/blue) intaglio microprinting design containing two engraving depths and two colors of ink, producing four combinations of color, and saturation; and, on the right, an example of a mock-up of a poorly registered four-plate offset simulation of the same design.

FIG. 27 illustrates, on the left, an example of a mock-up of a multicolor (green/blue) intaglio microprinting design containing two engraving depths and two colors of ink, producing four combinations of color, and saturation; and, on the right, an example of a mock-up of a poorly registered four-plate offset simulation of the same design.

The left of FIG. 26 shows a mock-up monochromatic intaglio microprinting design with plate artwork of two discrete engraving depths, producing two color saturations. Counterfeiting this design by offset could involve either a halftone (less work, but potentially risking the microprinting line art) or two printing steps to apply dark and light inks separately (risking poor registration). The effect of poor plate registration in a two-color offset simulation could be illegible microprinting, as seen on the right of FIG. 26.

Similarly, the mock-up multicolor intaglio design on the left of FIG. 27 features the same two engraving depths, but with two ink colors. It remains possible to simulate this artwork using offset, but the additional colors can exacerbate counterfeiter registration problems, limit simulation quality, and drive counterfeiters to lower-quality halftone simulation processes that could damage microprinting line art. One possible offset simulation is shown on the right of FIG. 27. Although FIG. 27 shows spot blue and spot green inks, specialty inks (silver and gold metallics, for example) would provide even greater resistance to digital CMYK simulation.

An aspect is directed to a substrate offset printed with front side markings on a first side and back side markings on a second side. The front side markings and the back side markings have dimensions in a micrometer range. The front side when viewed with reflected light comprises first portions of a plurality of characters. The back side when viewed with reflected light comprises second portions of the plurality of characters. The first portions and the second portions are printed, when viewed with transmitted light, to show the plurality of characters as whole characters having dimensions in the micrometer range.

In some embodiments, the whole characters are alphanumeric characters. They may have dimensions in a range of about 10 to 1000 micrometers±1 to 100 micrometers. Spacings between the whole characters may have dimensions in a range of about 10 to 500 micrometers, ±1 to 50 micrometers. The first portions may be printed with a first color and the second portions may be printed with a second color different from the first color. When viewed with transmitted light, the first portions may have the first color and the second portions may have the second color (e.g., FIG. 19).

In some embodiments, the first portions are printed with a first saturation of color and the second portions are printed with a second saturation of color different from the first saturation of color. When viewed with transmitted light, the first portions and the second portions of the plurality of characters may have the same color, with the first portions at the first saturation and the second portions at the second saturation of the same color (e.g., FIG. 26).

In some embodiments, the first portions include first sub-portions and second sub-portions of the plurality of characters and the second portions include third sub-portions and fourth sub-portions of the plurality of characters. The first sub-portions are printed with a first saturation of a first color. The second sub-portions are printed with a second saturation of a second color. The third sub-portions are printed with a third saturation of a third color. The fourth sub-portions are printed with a fourth saturation of a fourth color. The first color and the second color may be the same. The third color and the fourth color may be the same. The first saturation and the third saturation may be the same. The second saturation and the fourth saturation may be the same (e.g., FIG. 27).

According to another aspect, a system for printing markings on a substrate comprises a printsetter including non-transitory computer readable instructions stored on a tangible computer read storage medium, the instructions causing a microprocessor connected to the printsetter to: receive a front side image having a first information section and a first security section; generate a first plate having a first microprinting formed in the first plate based on the first security section of the image; receive a back side image having a second information section and a second security section; generate a second plate having a second microprinting formed in the second plate based on the second security section of the image. The front side image includes front side markings corresponding to the first microprinting and having dimensions in a micrometer range. The back side image includes back side markings corresponding to the second microprinting and having dimensions in the micrometer range. The front side markings include first portions of a plurality of characters. The back side markings include second portions of the plurality of characters. The first portions and the second portions are configured to offset print an image which, when viewed with transmitted light, shows the plurality of characters as whole characters having dimensions in the micrometer range.

In some embodiment, the system comprises an offset press which includes a substrate tray, a feeder, a substrate registration unit, a first print unit, and a second printing unit. The substrate tray is configured to hold multiple substrates. The feeder is configured to feed substrate into the offset press one by one. The substrate registration unit is configured to orient each substrate so that each substrate is positioned within a threshold before a substrate mover pulls the substrate into a printing unit, the substrate mover which may have grippers. The first printing unit includes the first plate, a first ink reservoir having the first microprinting, and a first ink roller configured to apply the first microprinting to each substrate. The second printing unit includes the second plate, a second ink reservoir having the second microprinting, and a second ink roller configured to apply the second microprinting to each substrate. The front side of the security section of the substrate shows with reflected light, the first microprinting in a first color. The back side of the security section of the substrate shows with reflected light, the second microprinting in a second color. The first microprinting and the second microprinting form a transmitted light microprinting which combines the first microprinting in the first color and the second microprinting in the second color to show the plurality of characters as the whole characters. The first color may be same as the second color (e.g., FIG. 26) or may be different from the second color (e.g., FIG. 19).

In some embodiments, the instructions further cause the microprocessor connected to the printsetter to generate a third plate having a first information printing formed in the third plate based on the first information section of the image and generate a fourth plate having a second information printing formed in the fourth plate based on the second information section of the image. The front side image includes additional front side markings corresponding to the first information printing and having dimensions at least one order of magnitude larger than the micrometer range. The back side image includes additional back side markings corresponding to the second information printing and having dimensions at least one order of magnitude larger than the micrometer range.

In specific embodiments, the system further comprises a third printing unit and a fourth printing unit. The third print unit includes the third plate, a third ink reservoir having the first information printing, and a third ink roller configured to apply the first information printing to each substrate. The fourth printing unit includes the fourth plate, a fourth ink reservoir having the second information printing, and a fourth ink roller configured to apply the second information printing to each substrate. The front side of the information section of the substrate shows with reflected light, the first information printing. The back side of the security section of the substrate shows with reflected light, the second information printing. The first information printing and the second information printing form a transmitted light information printing which combines the first information printing and the second information printing.

In some embodiments, the first microprinting formed in the first plate has a first engraving depth. The second microprinting formed in the second plate has a second engraving depth different from the first engraving depth (e.g., FIG. 26). A larger engraving depth produces a higher saturation of color when printed on the substrate.

In some embodiments, the first plate of the first printing unit has a first engraving depth for printing first sub-portions of the first portions of the plurality of characters corresponding to the first microprinting and has a second engraving depth for printing second sub-portions of the first portions of the plurality of characters corresponding to the first microprinting. The second plate of the second printing unit has a third engraving depth for printing third sub-portions of the second portions of the plurality of characters corresponding to the second microprinting and has a fourth engraving depth for printing fourth sub-portions of the second portions of the plurality of characters corresponding to the second microprinting. A larger engraving depth produces a higher saturation of color when printed on the substrate. The first engraving depth is different from the third engraving depth. The second engraving depth is different from the fourth engraving depth. The first engraving depth may be the same as the second engraving depth. The third engraving depth may be the same as the fourth engraving depth (e.g., FIG. 27).

Another aspect is directed to a method for producing a substrate bearing anticounterfeit markings. The method comprises receiving a front side image having a first information section and a first security section with a printsetter; generating a first plate having a first microprinting formed in the first plate based on the first security section of the image; receiving a back side image having a second information section and a second security section; generating a second plate having a second microprinting formed in the second plate based on the second security section of the image; printing on a front side of the substrate with an offset printing press; applying ink in a first color to the substrate in a first printing unit of the offset printing press having the first plate; aligning the substrate to print on the back side of the substrate; applying ink in a second color the substrate in a second printing unit of the offset printing press having the second plate; capturing a visual media file with a camera connected to the offset printing press of the front side of the substrate with reflected light, the back side of the substrate with reflected light, the front side of the substrate with transmitted light, and the back side of the substrate with transmitted light; and determining with a microprocessor running computer executable code non-transitorily stored on tangible computer readable media that: the first microprinting appears as front side markings of first portions of a plurality of characters having dimensions in a micrometer range when viewed from the front side with reflected light, the second microprinting appears as back side markings of second portions of the plurality of characters having dimensions in the micrometer range when viewed from the back side with reflected light, and the first microprinting and the second microprinting appear as whole characters of the plurality of characters when viewed with transmitted light.

In specific embodiments, the method applies ink in a first color to the substrate in the first printing unit and applies ink in a second color to the substrate in the second printing unit. The first color may be same as the second color (e.g., FIG. 26) or may be different from the second color (e.g., FIG. 19). The whole characters when viewed with transmitted light may show the first portions in the first color and the second portions in the second color.

In some embodiments, the method further comprises: generating a third plate having a first information printing formed in the third plate based on the first information section of the image; generating a fourth plate having a second information printing formed in the fourth plate based on the second information section of the image; applying ink to the front side of the substrate in a third printing unit of the offset printing press having the third plate; aligning the substrate to print on the back side of the substrate; and applying ink to the back side of the substrate in a fourth printing unit of the offset printing press having the fourth plate. The front side image includes additional front side markings corresponding to the first information printing and having dimensions at least one order of magnitude larger than the micrometer range. The back side image includes additional back side markings corresponding to the second information printing and having dimensions at least one order of magnitude larger than the micrometer range.

In some embodiments, the method comprises printing on the front side of the substrate with the offset printing press; applying ink in the first color at a first saturation to the substrate in the first printing unit of the offset printing press having the first plate; aligning the substrate to print on the back side of the substrate; applying ink in the second color at a second saturation to the substrate in the second printing unit of the offset printing press having the second plate (e.g., FIG. 26). The first microprinting formed in the first plate has a first engraving depth. The second microprinting formed in the second plate has a second engraving depth different from the first engraving depth (e.g., FIG. 26).

In some embodiments, the method comprises printing on the front side of the substrate with the offset printing press; applying ink in the first color to the substrate in the first printing unit of the offset printing press having the first plate, at a first saturation over first sub-portions of the first portions of the plurality of characters corresponding to the first microprinting and over second sub-portions of the first portions of the plurality of characters corresponding to the first microprinting; aligning the substrate to print on the back side of the substrate; applying ink in the second color to the substrate in the second printing unit of the offset printing press having the second plate, at a second saturation over third sub-portions of the second portions of the plurality of characters corresponding to the second microprinting and over fourth sub-portions of the second portions of the plurality of characters corresponding to the second microprinting (e.g., FIG. 27).

In specific embodiments, the first plate of the first printing unit has a first engraving depth for printing first sub-portions of the first portions of the plurality of characters corresponding to the first microprinting and has a second engraving depth for printing second sub-portions of the first portions of the plurality of characters corresponding to the first microprinting. The second plate of the second printing unit has a third engraving depth for printing third sub-portions of the second portions of the plurality of characters corresponding to the second microprinting and has a fourth engraving depth for printing fourth sub-portions of the second portions of the plurality of characters corresponding to the second microprinting. The first engraving depth is different from the third engraving depth. The second engraving depth is different from the fourth engraving depth. The first engraving depth may be the same as the second engraving depth. The third engraving depth may be the same as the fourth engraving depth (e.g., FIG. 27).

In sum, the color gamut and registration within a microprinting design can be as important as resolution and size. To combat digital counterfeiting, genuine microprinting can be printed using inks not amenable to CMYK simulation or with a split fountain that transitions between saturations instead of between colors. These strategies force counterfeiters to address both ink type and fine microprinting detail simultaneously, which can prevent easy simulation by CMYK and facilitates easier detection of inkjet counterfeits. To combat traditional counterfeiting, strategies for multi-color offset and multi-saturation intaglio microprinting have been described. If individual microprinted characters are composed of offset artwork containing different colors or intaglio artwork containing multiple engraving depths, offset counterfeits of these microprinting designs may be rendered illegible if traditional counterfeiters cannot hold good microscopic registration.

Microprinting Placement for User Ergonomics and Alteration Resistance

The above describes the optimization of microprinting artwork and color, including ways that microprinting can combat sophisticated traditional counterfeiting while continuing to fulfill its conventional role against digital counterfeiting. The following shifts focus from counterfeit resistance to user ergonomics and alteration resistance. Although ergonomics and alteration resistance are different topics, both relate to where microprinting is placed within a complete security document.

In the case of user ergonomics, a significant limitation of microprinting is that it can be hard to locate and inspect. To mitigate this disadvantage, predictable microprinting placement and the inclusion of cues to alert document users to the presence and location of microprinting can make it more accessible.

For alteration resistance, offset or intaglio microprinting can be intersected with security features, bearer portraits, personalization data, or even letterpress serial numbers to provide evidence of tampering if these features are eradicated or changed.

Single Microprinting Lines

Figure 28:
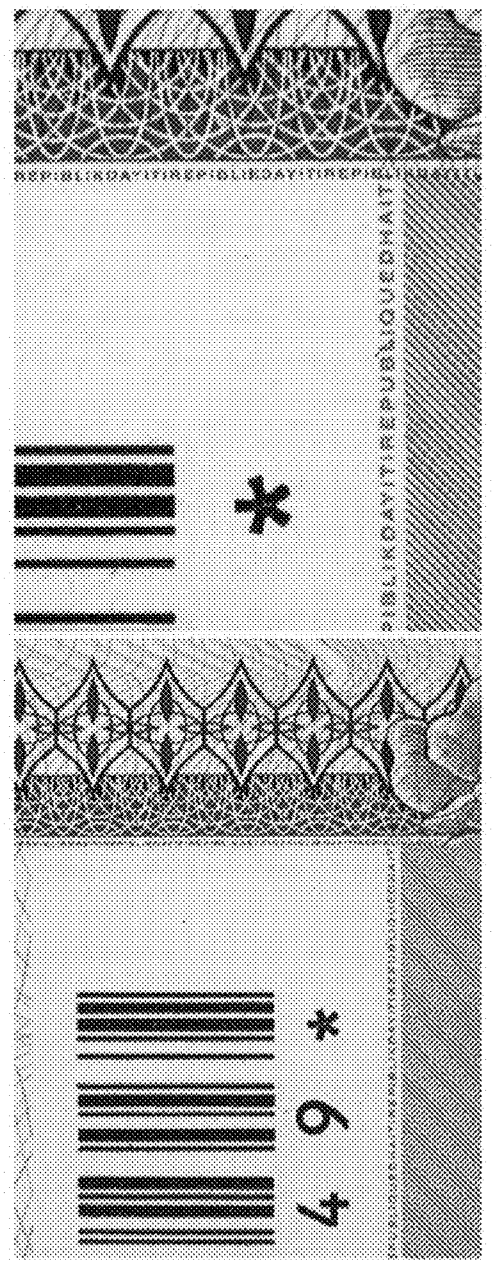
FIG. 28 illustrates an example of a blue offset and red intaglio microprinting design placed at the edges of border artwork.
Figure 29:
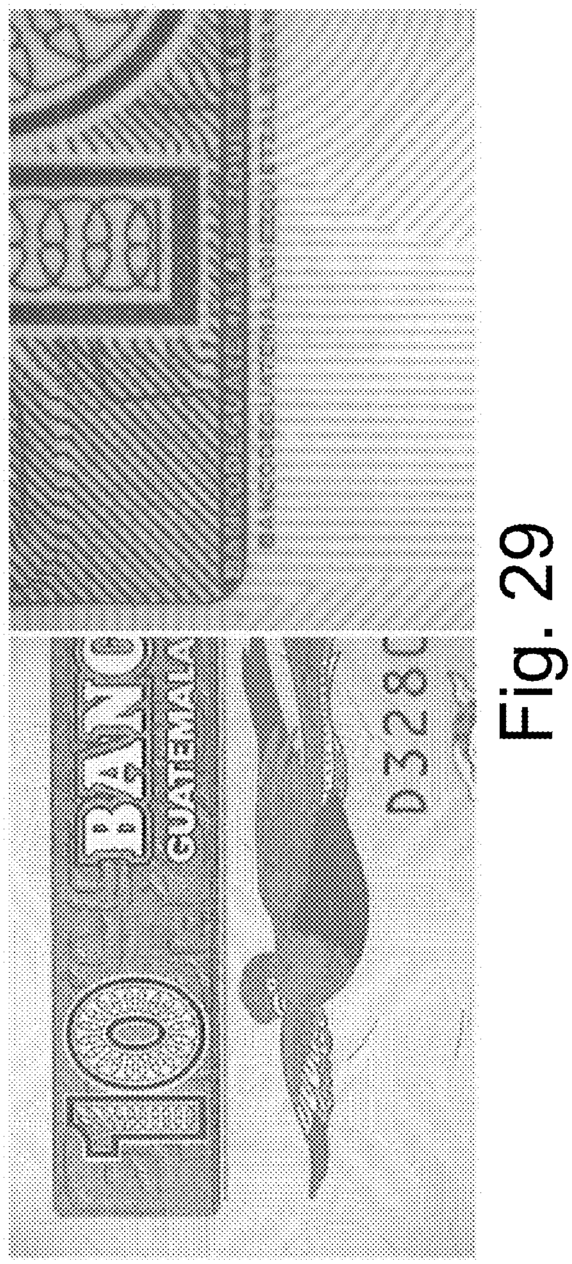
FIG. 29 illustrates an example of a positive and negative intaglio microprinting design placed at the edge of an intaglio border design.
Figure 30:
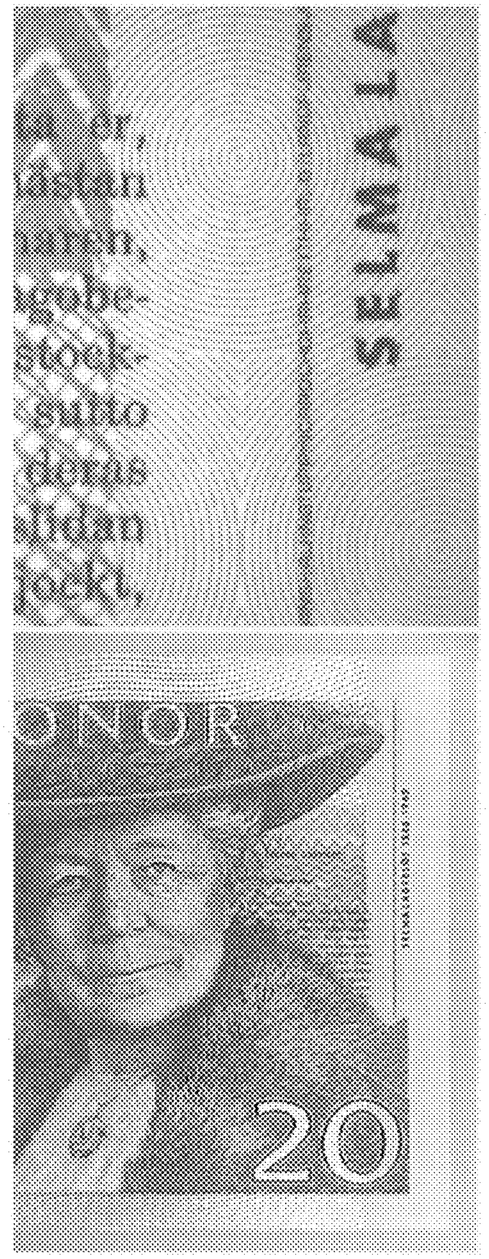
FIG. 30 illustrates an example of a single line of intaglio microprinting at the edge of a banknote, isolated from competing artwork to make it easier to locate before magnification is used.
Figure 31:
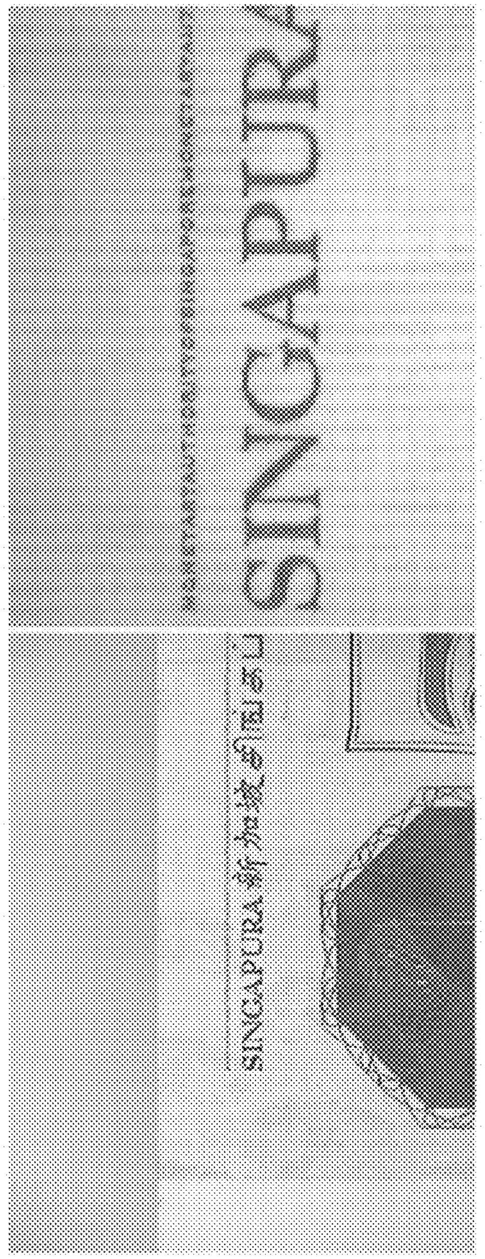
FIG. 31 illustrates an example of a single line of intaglio microprinting at the edge of a banknote, isolated from competing artwork to make it easier to locate before magnification is used.

Many of the microprinting artwork customization techniques described above are most flexible when applied to larger microprinting patterns, but single lines of microprinting are often used where space is limited. One of the most typical placements for single lines of microprinting is at the edges of border designs (FIGS. 28 and 29). To make the microprinting further stand out, it can also be isolated from other artwork (FIGS. 30 and 31). Although the microprinting still cannot be read without magnification, the single thin line might be seen more easily and may alert (or remind) document users where the microprinting is located prior to magnification.

FIG. 28 illustrates an example of a blue offset and red intaglio microprinting placed at the edges of border artwork. Many documents follow this placement convention to make it easier for users to locate microprinting.

FIG. 29 illustrates an example of a positive and negative intaglio microprinting placed at the edge of an intaglio border design. Many documents follow this placement convention to make it easier for users to locate microprinting.

FIG. 30 illustrates an example of a single line of intaglio microprinting at the edge of a banknote, isolated from competing artwork to make it easier to locate before magnification is used.

FIG. 31 illustrates an example of a single line of intaglio microprinting at the edge of a banknote, isolated from competing artwork to make it easier to locate before magnification is used.

Figure 32:
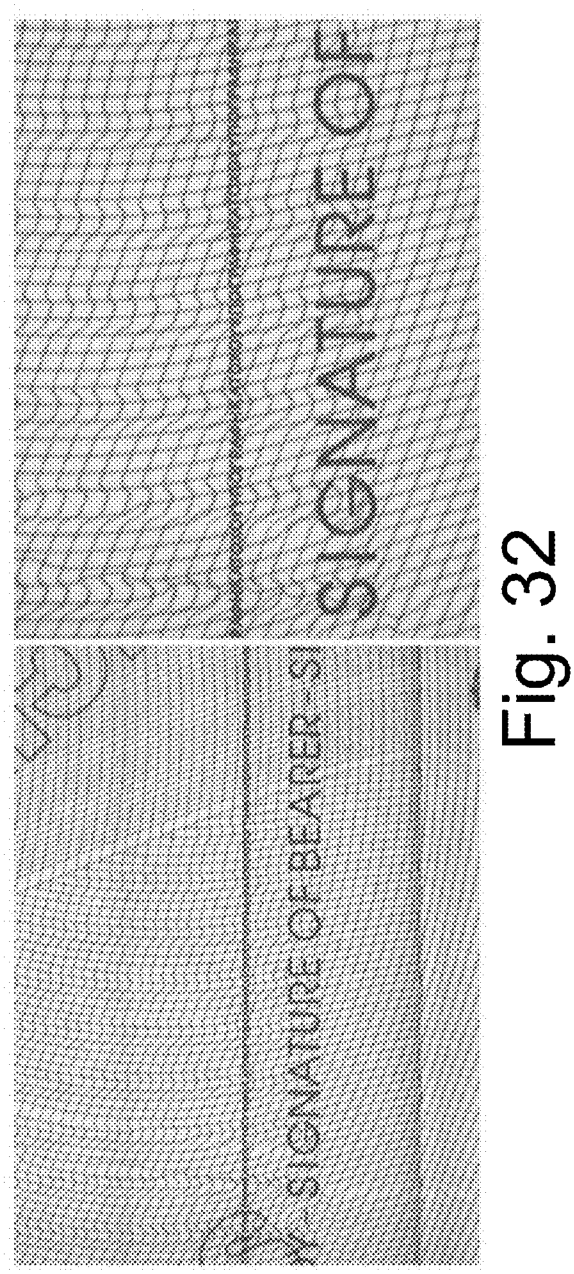
FIG. 32 illustrates an example of microprinting in the signature line of a passport.
Figure 33:
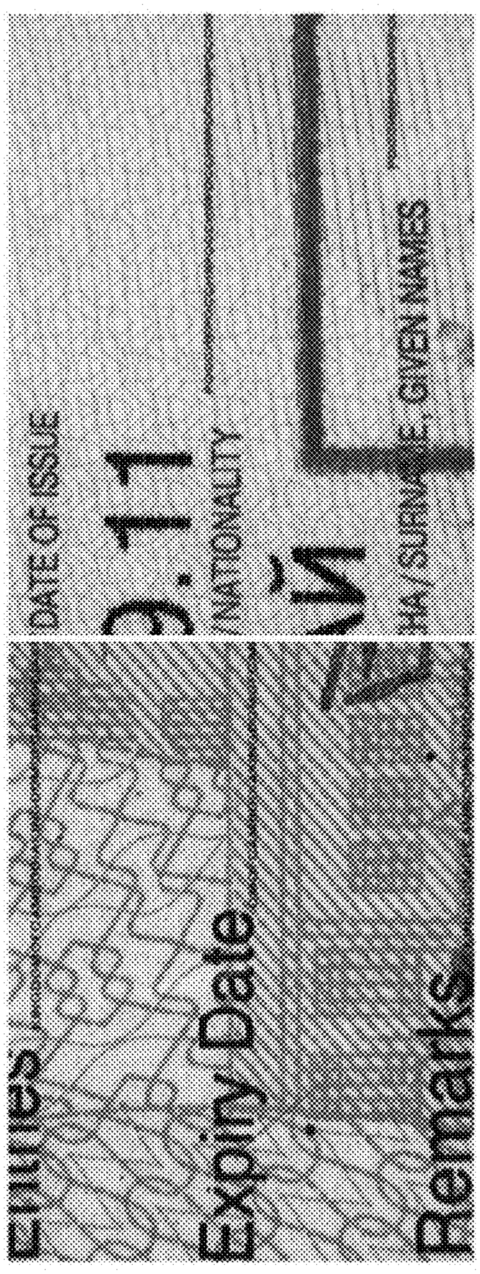
FIG. 33 illustrates an example of microprinting in the format lines of a visa.

The documents in FIGS. 30 and 31 are banknotes that do not contain personalization data, but microprinting is often included in one or more format or signature lines in birth certificates, passports, and visas adjacent to locations that contain handwritten or printed bearer personalization data. For example, FIG. 32 illustrates an example of microprinting in the signature line of a passport and FIG. 33 illustrates an example of microprinting in the format lines of a visa. These not only guide document users to locations where microprinting can be inspected but can also help expose alterations, which will be discussed in greater detail later. The single straight lines shown in FIGS. 28 to 33 provide limited opportunities for customization of the microprinting pattern, but font customization, multi-plate offset, or multi-depth intaglio techniques as described above could still be applied.

In FIG. 32, the passport signature line appears solid without magnification but is composed of microprinting. This placement makes it easier for document users to locate the microprinting but can also help reveal signature alterations. This example shows a single line, while FIG. 33 shows multiple lines and FIGS. 41 to 43 below show larger multi-line patterns that also resist alteration.

FIG. 33 shows single lines of intaglio microprinting underlining fillable text fields in two visas. This practice makes it easier for document users to locate microprinting, but in some cases can also help reveal alterations.

Multi-Line Microprinting Patterns

Prior examples described some placements that make single microprinting lines easier for document users to locate, but multi-line microprinting patterns may be easier to see because they are larger and also offer more opportunities for customization. Just like single lines of microprinting, multi-line microprinting patterns can be isolated from competing artwork and placed at edges or borders to make them easier to find, as in FIGS. 34 and 35.

Figure 34:
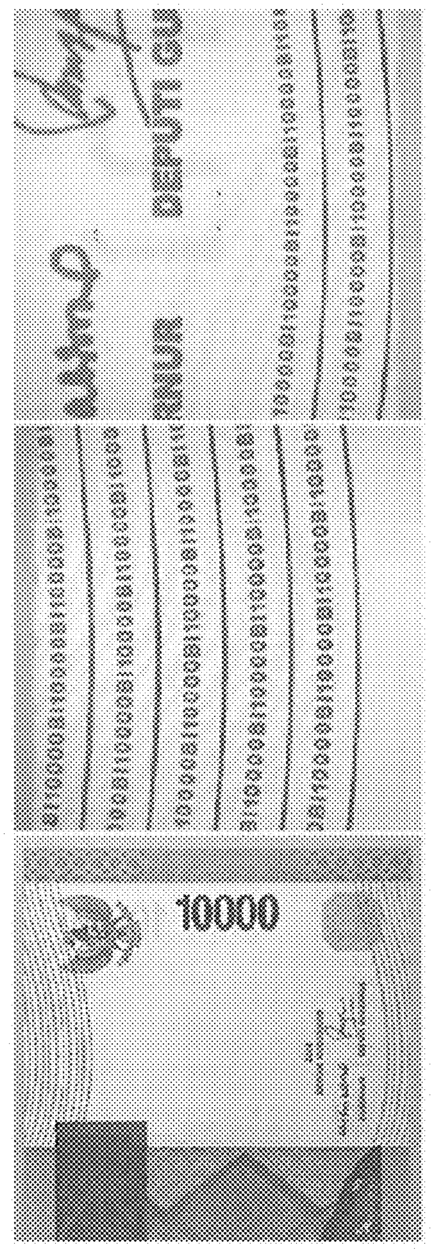
FIG. 34 illustrates an example of multi-line offset microprinting patterns standing apart from competing artwork at the upper and lower edges of the same banknote.

FIG. 34 illustrates an example of multi-line offset microprinting patterns standing apart from competing artwork at the upper and lower edges of the same banknote. The size of larger microprinting patterns, along with their placements and environment, can help make it easier for document users to locate them.

Figure 35:
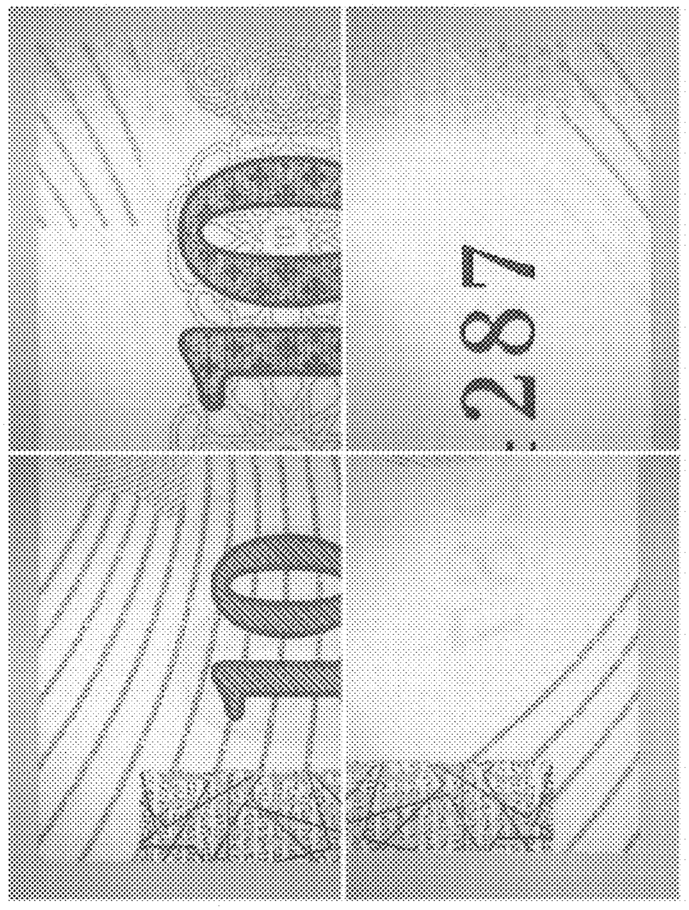
FIG. 35 illustrates, in two front and two back corners of the same banknote, an example of multi-line offset microprinting patterns standing apart from competing artwork.

FIG. 35 illustrates, in two front and two back corners of the same banknote, an example of multi-line offset microprinting patterns standing apart from competing artwork. These larger microprinting patterns, along with their placements and environment, can help make it easier for document users to locate them.

Macro document artwork can also be used to alert document users to the presence and location of microprinting. Books, scrolls, plaques, and monuments are thematic elements that document users may naturally associate with text. For example, the macro artwork of FIG. 36 includes a book, with the text on its pages integrated as microprinting. Similarly, the text on the side of the monument in FIG. 37 is actually microprinting.

Figure 36:
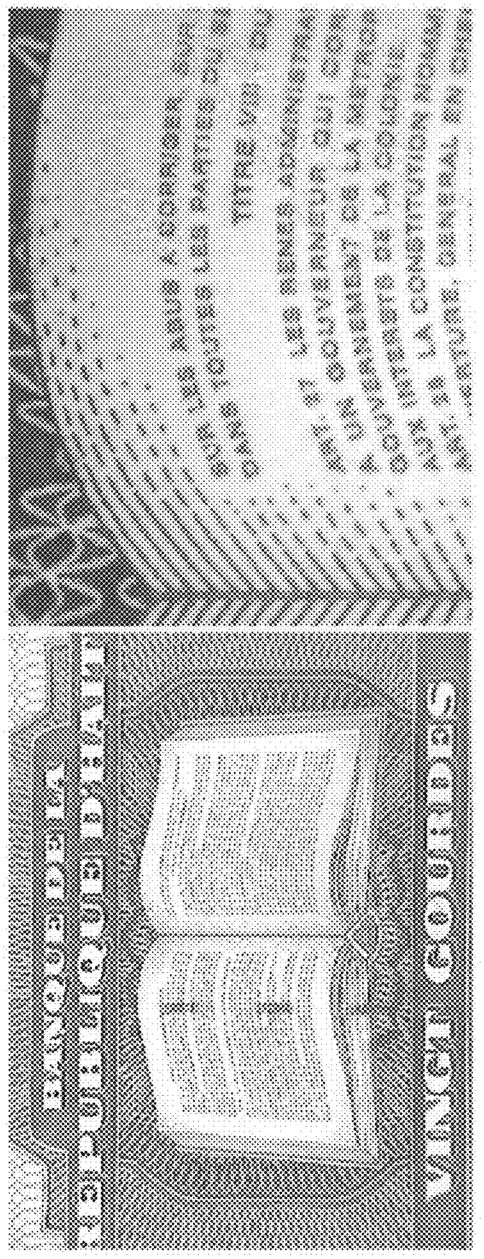
FIG. 36 illustrates an example of intaglio security document artwork featuring a book, with text on the pages of the book incorporated as microprinting.

FIG. 36 illustrates an example of an intaglio security document artwork featuring a book, with text on the pages of the book incorporated as microprinting. Use of the book in the macro artwork may be a cue to inform or remind document users where to find the microprinting.

Figure 37:
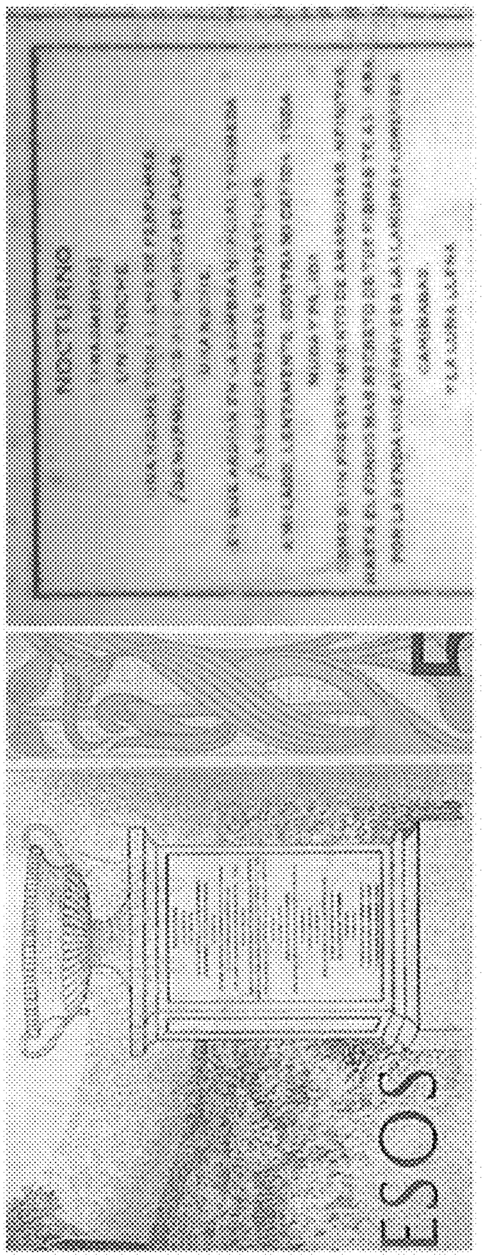
FIG. 37 illustrates an example of intaglio security document artwork featuring a monument, with text on its front incorporated as microprinting.

FIG. 37 illustrates an example of an intaglio security document artwork featuring a monument, with text on its front incorporated as microprinting. Use of the monument in the macro artwork may be a cue to inform or remind document users where to find the microprinting.

Figure 38:
FIG. 38 illustrates an example of intaglio microprinting of varying sizes in a single cohesive design.

In FIGS. 36 and 37, the non-text macro artwork helps document users anticipate the placement of microprinting, but design of text patterns alone might achieve the same thing without assistance from the macro artwork. As an example, FIG. 38 shows six rows of text of different sizes. The upper rows contain larger text and can be read without magnification. Further, even without magnification document users can easily see that each lower row contains text of progressively smaller size. The readable top rows can draw attention and alert users to the presence of smaller microprinting in the lower rows.

FIG. 38 illustrates an example of an intaglio microprinting of varying sizes in a single cohesive design. The larger text may be less secure against counterfeiter simulation, but it can be seen more easily to guide document users to the smaller microprinting. The smaller microprinting could be harder to simulate but might be more difficult for document users to locate if it were isolated from the larger text.

Figure 39:
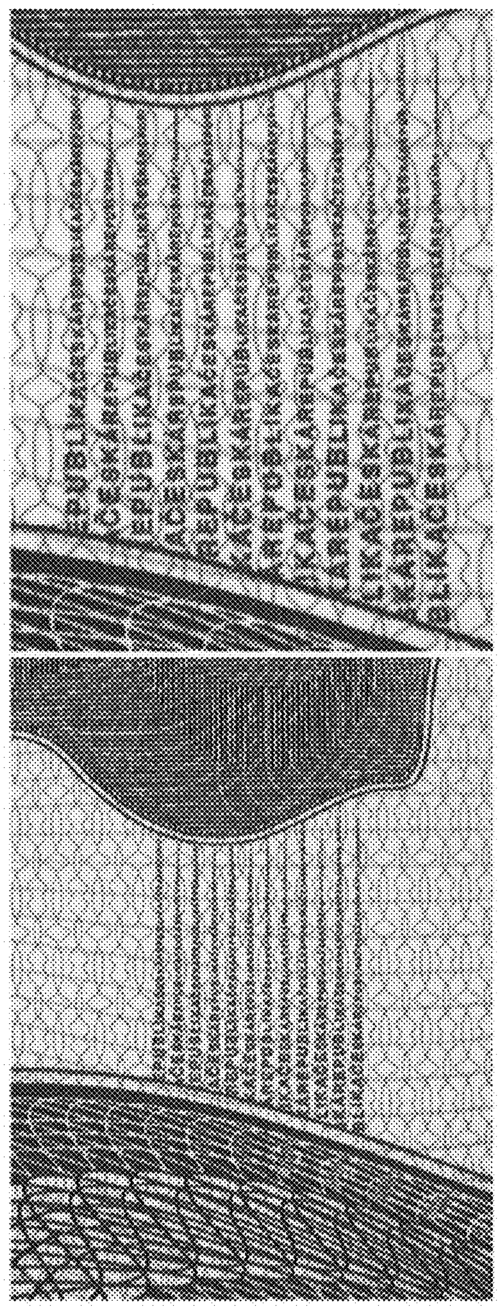
FIG. 39 illustrates an example of multi-color intaglio microprinting that changes size across the width of the design.
Figure 40:
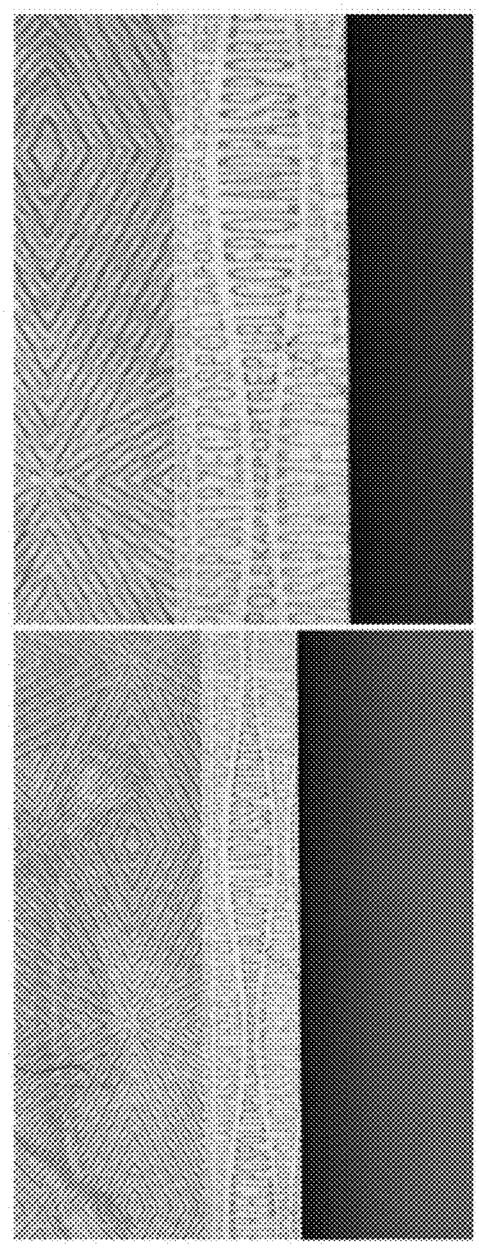
FIG. 40 illustrates an example of a three-plate offset microprinting pattern that changes size across the width of the design.

FIGS. 39 and 40 show similar implementations of multi-size text with the same result. The strategies shown in FIGS. 38 to 40 are one reason this disclosure has made no effort to objectively define how small text must be before it becomes microprinting; these examples show that there can be advantages to microprinting patterns that include text of multiple sizes.

FIG. 39 illustrates an example of a multi-color intaglio microprinting that changes size across the width of the design. The larger text may be less secure against counterfeiter simulation, but it can be seen more easily to guide document users to the smaller microprinting. The smaller microprinting could be harder to simulate but might be more difficult for document users to locate if it were isolated from the larger text.

FIG. 40 illustrates an example of a three-plate offset microprinting pattern that changes size across the width of the design. The larger text may be less secure against counterfeiter simulation, but it can be seen more easily to guide document users to the smaller microprinting. The smaller microprinting could be harder to simulate but might be more difficult for document users to locate if it were isolated from the larger text.

The examples in FIGS. 34 to 40 pertain to drawing user attention to discrete regions of microprinting, but another placement strategy is to incorporate microprinting throughout the entire background artwork. This occupies more surface real estate but makes it easy for document users to locate microprinting since it can be found anywhere. Examples of full-page microprinting designs are shown in a passport in FIG. 41 and a stock certificate in FIG. 42.

Figure 41:
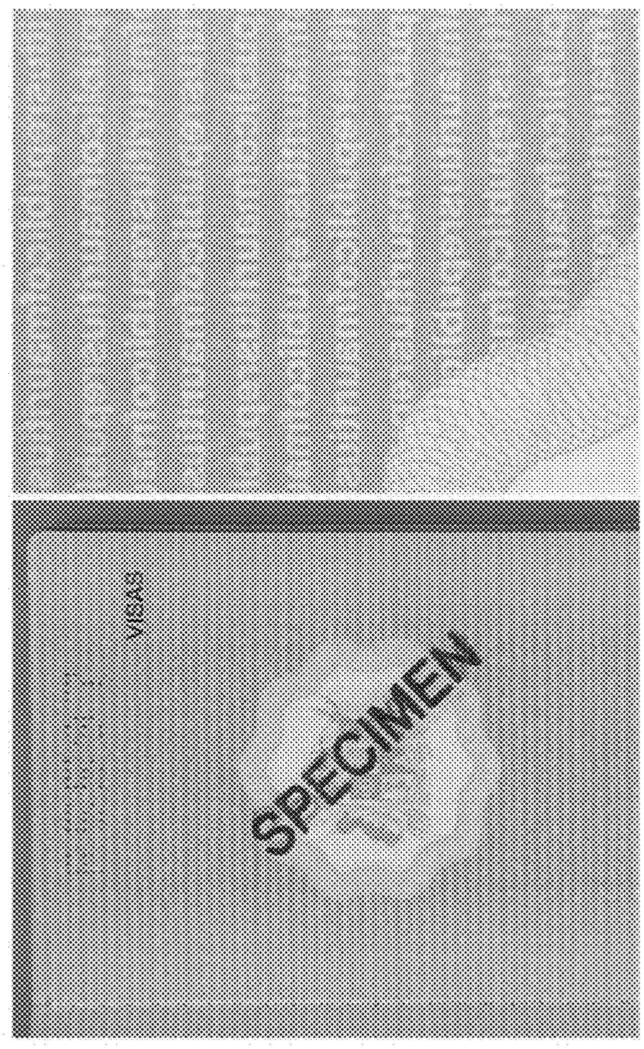
FIG. 41 illustrates a method of according to an example embodiment.

A document user could look for microprinting anywhere in FIG. 41 and find it without difficulty. The wrong-reading text is a part of the design.

Figure 42:
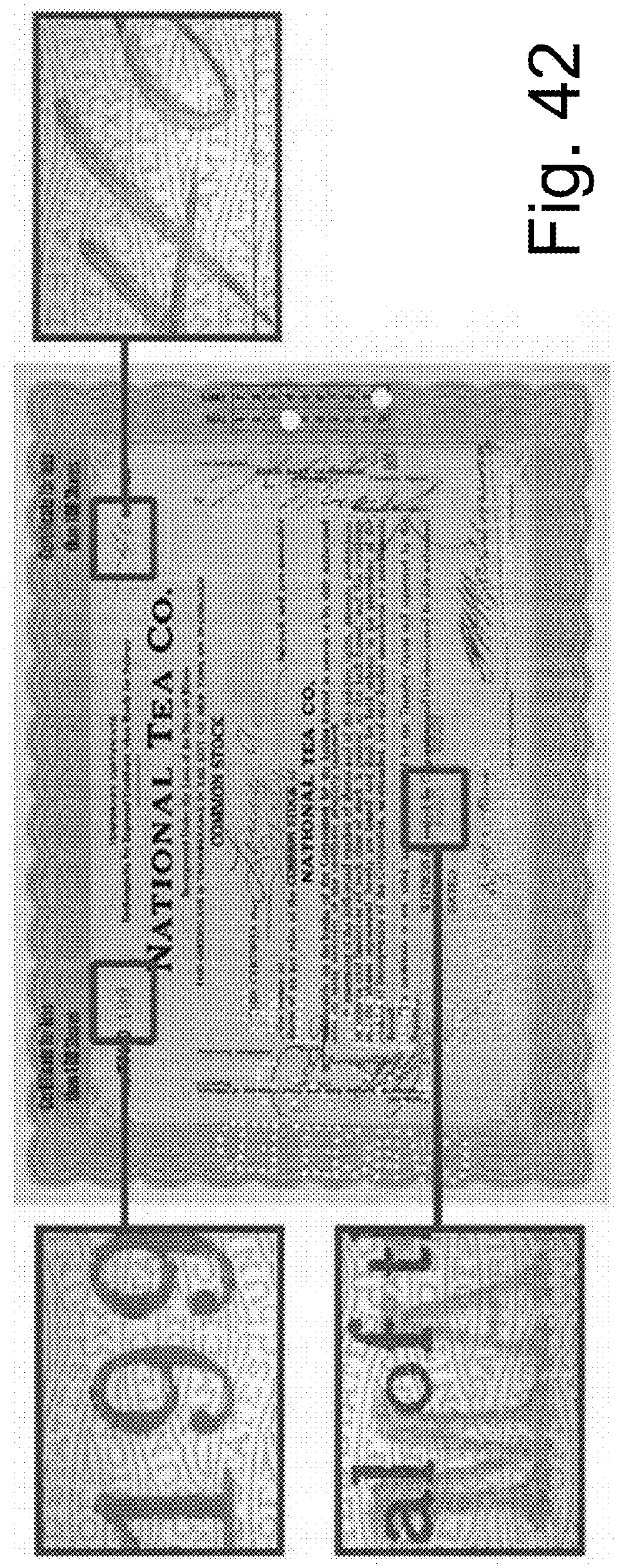
FIG. 42 illustrates an example of a stock certificate having borders that contain a guilloche pattern, but the background artwork throughout the interior is entirely microprinting.

FIG. 42 illustrates an example of a stock certificate having borders that contain a guilloche pattern, but the background artwork throughout the interior is entirely microprinting. A document user could look for microprinting anywhere in this background and find it without difficulty. Some locations are highlighted to show microprinting behind a letterpress serial number, rubber stamp, and handwritten numerals.

Microprinting and Security Halftones

Large microprinting patterns that contain repeating artwork can be at risk for step-and-repeat traditional counterfeiting. One way to make large microprinting designs more resistant to step-and-repeat counterfeiting is to incorporate microprinting in a security halftone. Halftones simulate a wide gamut of densities in a macro image by dynamically changing line width across a microscopic line art design, producing two distinct images with and without magnification. While typical halftones used in commercial printing are usually dot patterns, halftones in security artwork can be based on semi-randomized microscopic line art, such as geometric elements as in FIG. 43, microprinting alone as in FIG. 44 or a combination of shapes and microprinting text as in FIG. 45. Security halftones were described in prior work and will not be examined in detail here, except to note that such halftones can be a vehicle for introducing microprinting into large areas of artwork.

Figure 43:
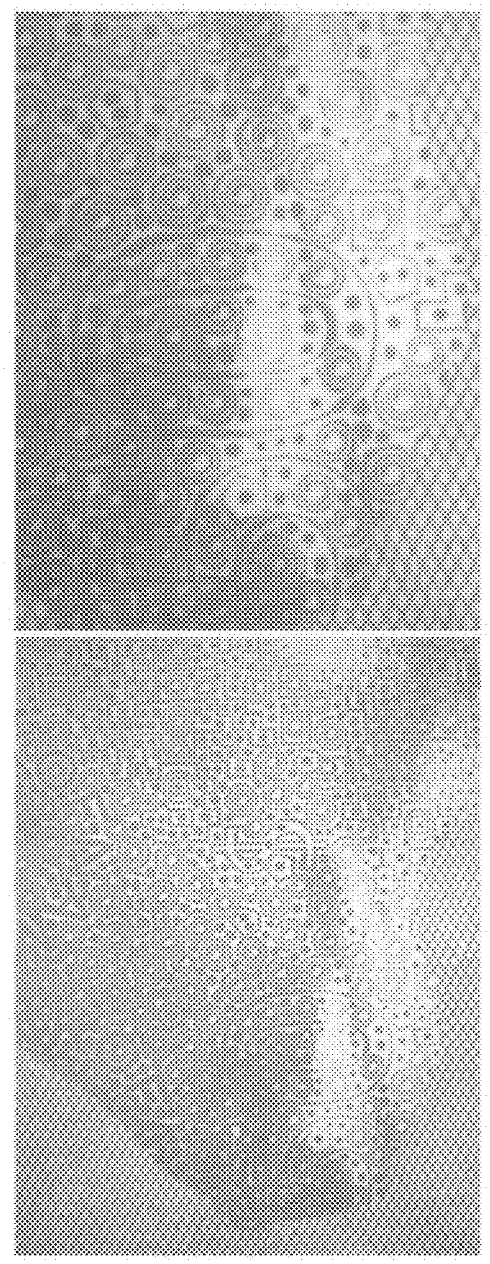
FIG. 43 illustrates an example of an offset security halftone based on various geometric elements but containing little microprinting text.

FIG. 43 illustrates an example of an offset security halftone based on various geometric elements but containing little microprinting text. Like microprinting, details in this artwork can be inspected with magnification but cannot be assessed as readable or unreadable in the same way.

Figure 44:
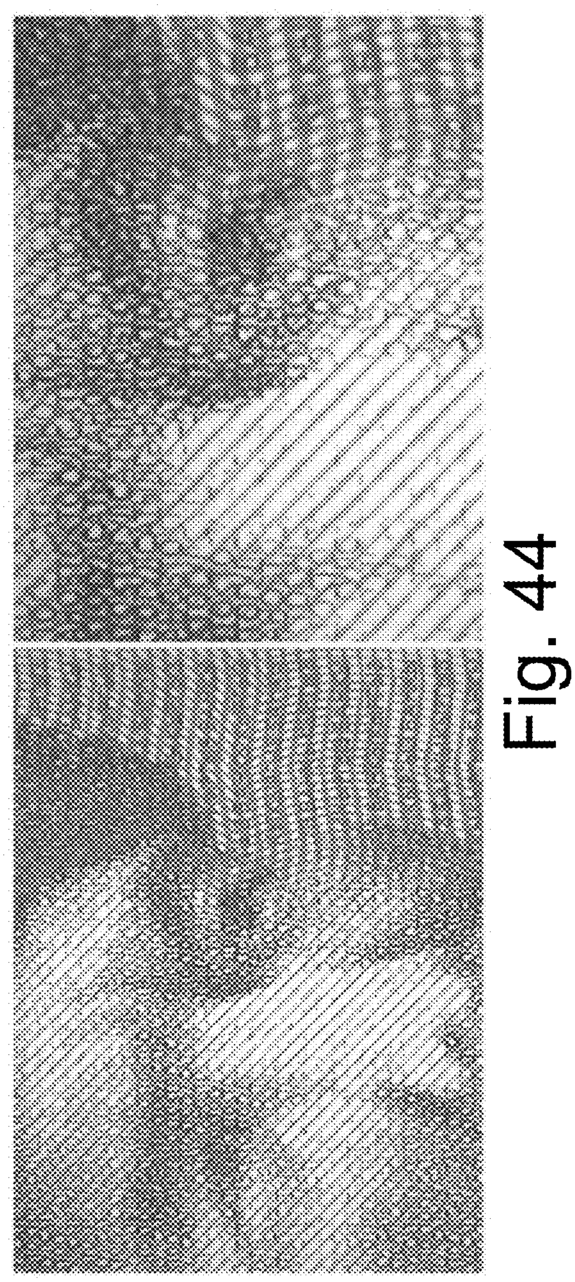
FIG. 44 illustrates an example of an intaglio security halftone based entirely on microprinting and containing no geometric shapes.

FIG. 44 illustrates an example of an intaglio security halftone based entirely on microprinting and containing no geometric shapes. Microprinting throughout large areas of art makes it easier for document users to find and read. Although the font repeats between rows, the line thicknesses are different in each character to prevent step-and-repeat counterfeiting.

Figure 45:
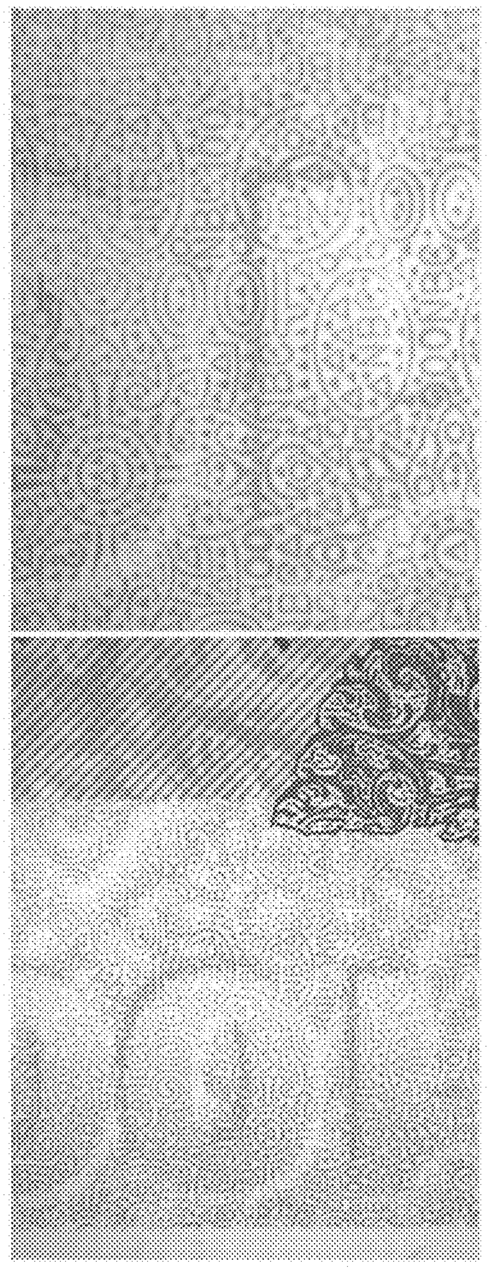
FIG. 45 illustrates an example of an offset security halftone based on a mix of geometric elements and microprinted text, with the microscopic image containing attributes of both FIGS. 16 and 17.

FIG. 45 illustrates an example of an offset security halftone based on a mix of geometric elements and micro-printed text, with the microscopic image containing attributes of both FIGS. 16 and 17.

Whether a security halftone should contain graphics, text, or both might be decided based on document user training considerations and other factors. Any artwork in FIGS. 43 to 45 would be tedious and time-consuming for a traditional counterfeiter to replicate since step-and-repeat processes are difficult if every individual shape or character features its own unique set of line widths. However, microprinting may be different from other types of security document artwork in that lay document users might more easily determine whether pure text is readable but may not be as comfortable assessing a security halftone composed only of shapes. If this is true, security halftones containing or based entirely on microprinting might have advantages. On the other hand, security halftones are complex and microprinting might be more understandable to lay document users in a simpler all-microprinting line or pattern that does not also contain non-text shapes that compete for user attention. As with other embodiments in this disclosure, whether microprinting belongs in a security halftone, or in other artwork elements, or both, is a matter for issuer discretion.

Multi-Plate and Multi-Process Microprinting

Figure 46:
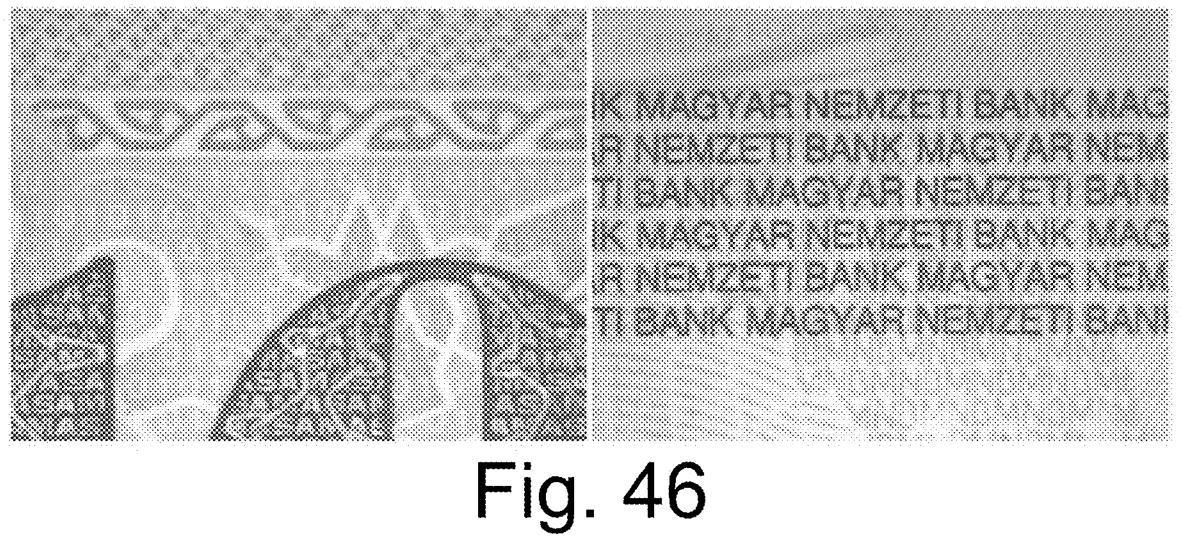
FIG. 46 illustrates an example of two different security documents, each containing microprinting in three offset colors and one intaglio color.

Since each printing plate and/or manufacturing process used in a genuine document contains its own unique artwork, each plate design represents a fresh opportunity to incorporate microprinting. It is common for every printing plate in a security document to contain microprinting, but in most cases the microprinting is in different locations and users must search for it. For improved ergonomics, some of the microprinting from multiple plate images can be clustered in the same microscopic area to facilitate simultaneous inspection. Some examples featuring four colors of microprinting in the same location are shown in FIG. 46. In FIG. 46 the microprinting is offset and intaglio print, but microprinting can also be included in other processes and features such as the plastic substrate lamination plates as in FIG. 47, optically variable devices as in FIG. 48, and the like.

FIG. 46 illustrates an example of two different security documents, each containing microprinting in three offset colors and one intaglio color. It is common for security documents to contain microprinting in various locations in every printing plate image, but in these examples microprinting from multiple printing steps was also placed in the same microscopic area so all can be inspected at the same time.

Figure 47:
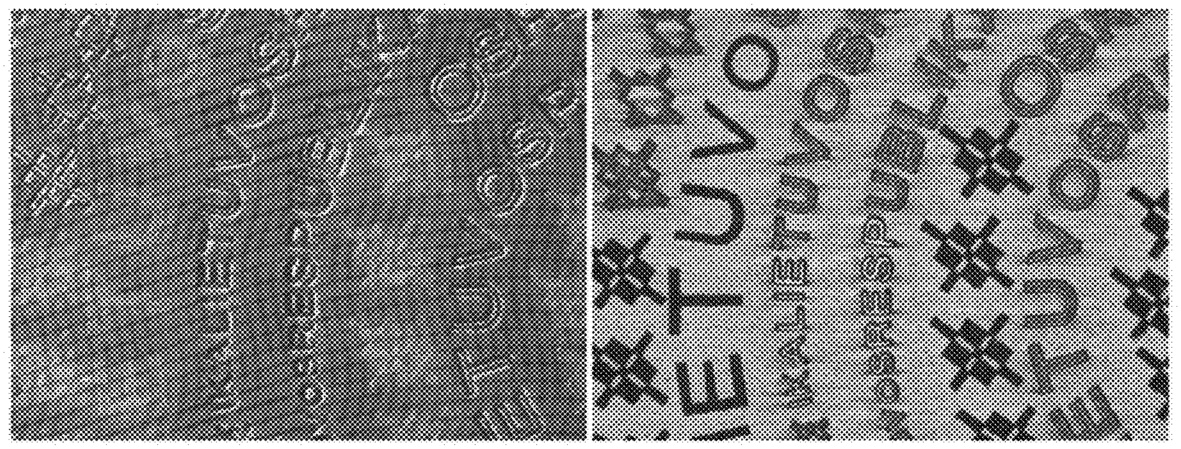
FIG. 47 illustrates an example of a clear tactile microprinting embossed into the surface of a polycarbonate passport data page substrate, shown on the left in oblique light and on the right in retroreflective light.

FIG. 47 illustrates an example of a clear tactile microprinting embossed into the surface of a polycarbonate passport data page substrate, shown on the left in oblique light and on the right in retroreflective light. Though composed only of clear plastic, the retroreflective light view shows at least three different microscopic textures that make this microprinting design distinctive.

Figure 48:
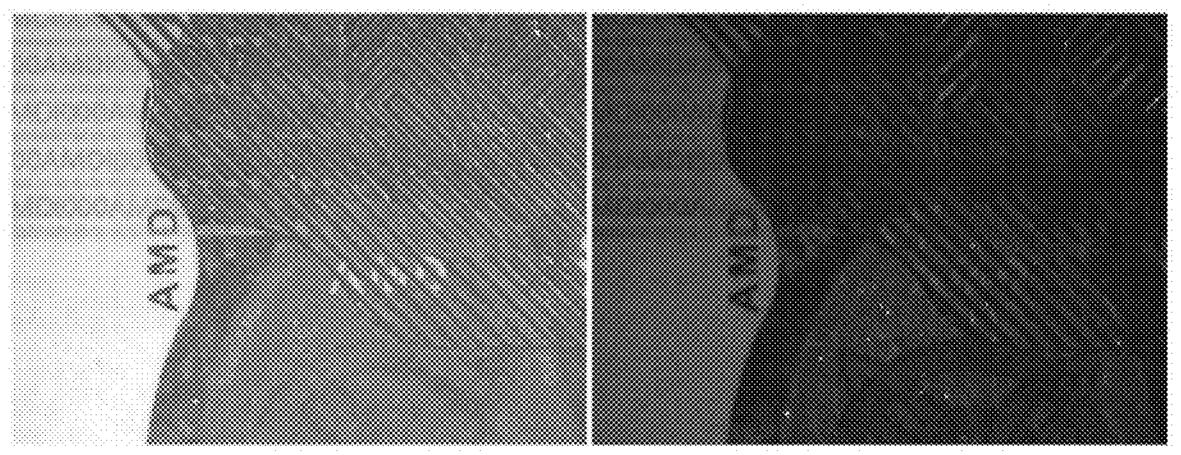
FIG. 48 illustrates an example of a microprinting incorporated into an OVD (Optically Variable Device) design in multiple locations.

FIG. 48 illustrates an example of a microprinting incorporated into an OVD (Optical Variable Device) design in multiple locations. The OVD is also intersected by offset microprinting in the background artwork. Microprinting can be included not only in offset and intaglio line artwork and OVD features, but also in security threads, planchettes, laminates, and other document components.

Placement in Similar Documents

Some conventions exist for microprinting placement in similar documents. Similar documents could be all the visa pages in the same passport book, multiple denominations in a banknote series or another example of two or more documents from the same issuer that might be expected to look alike. In these examples, microprinting placement is usually related to better user ergonomics but can also contribute to alteration resistance in some circumstances.

FIG. 49 illustrates an example of an offset microprinting in the corners of pages 17, 19, and 21 of the same passport. Consistency of design and location across pages makes this microprinting easier for users to locate and inspect. On each page the microprinting is customized with the page number to help prevent alterations.

FIG. 50 illustrates an example of an offset microprinting along the edges of three denominations in a banknote series. For better public accessibility and easier training of cash handlers, the microprinting is segregated from other artwork and is in the same location in each denomination. To prevent alterations, microprinting in each denomination is customized with the note value.

For the three passport pages in FIG. 49, in each page the location of the microprinting is consistent, making it easier for document users to inspect it throughout the book. Likewise, the placement of microprinting at the same edge in each of the three banknote denominations in FIG. 50 makes it easier for banknote users to find it.

Microprinting and Alteration Resistance

Protecting against alterations is a complex topic because chemical and mechanical alterations require different defenses. Various document types are subject to different alteration attacks and multiple classes of anti-alteration security features are involved. As with ergonomics, deliberate placement of microprinting can facilitate better document alteration resistance.

In many cases, the element to be protected from alteration is applied over continuous offset or intaglio artwork. In truth other kinds of security line art can be used for the background, but these examples focus on microprinting. Examples include serial numbers as in FIG. 51, bearer signatures as in FIG. 52, and inkjet or other digital personalization text data as in FIG. 53. Portraits are also commonly protected by application over a microprinting pattern, which can be printed in visible ink as in FIG. 54 or with invisible UV-reactive ink as in FIG. 55. In all of these examples, tampering with the protected feature risks damaging the continuity of the underlying microprinting (or other artwork) pattern, which contains details sufficiently small that counterfeiters could have difficulty restoring them if interrupted.

Figure 51:
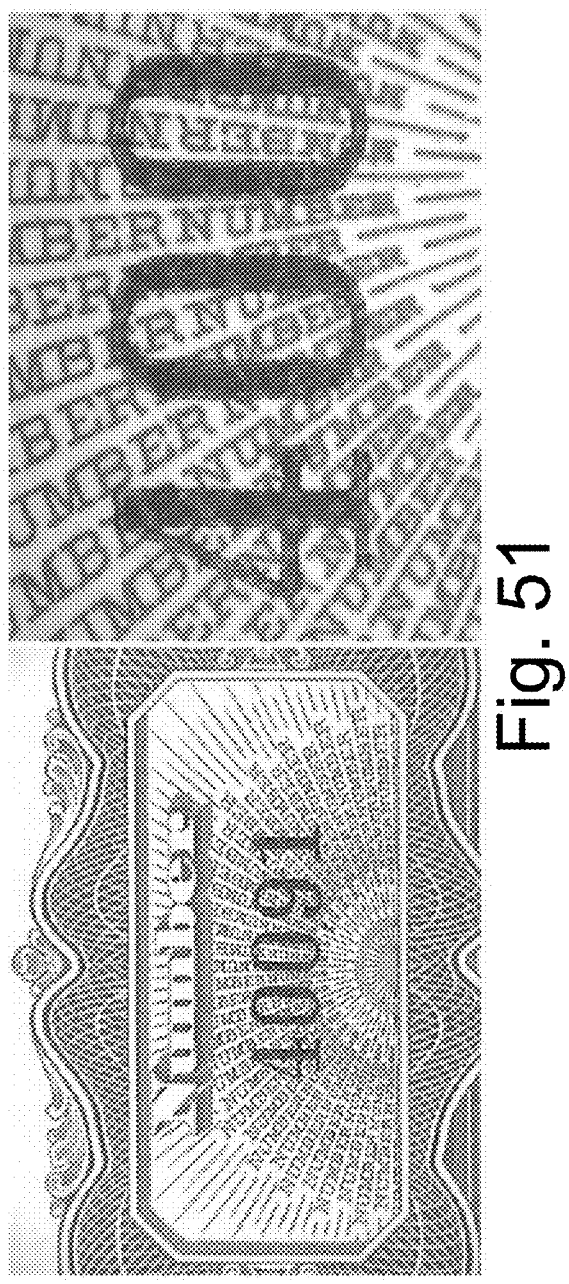
FIG. 51 illustrates an example of a letterpress serial number applied over offset microprinting.

FIG. 51 illustrates an example of a letterpress serial number applied over offset microprinting. Alterations to the serial number risk damaging the underlying microprinting pattern and revealing the alteration, particularly because the serial number print is translucent so that the microprinting can be seen through it. Other kinds of security artwork can also be used for this function.

Figure 52:
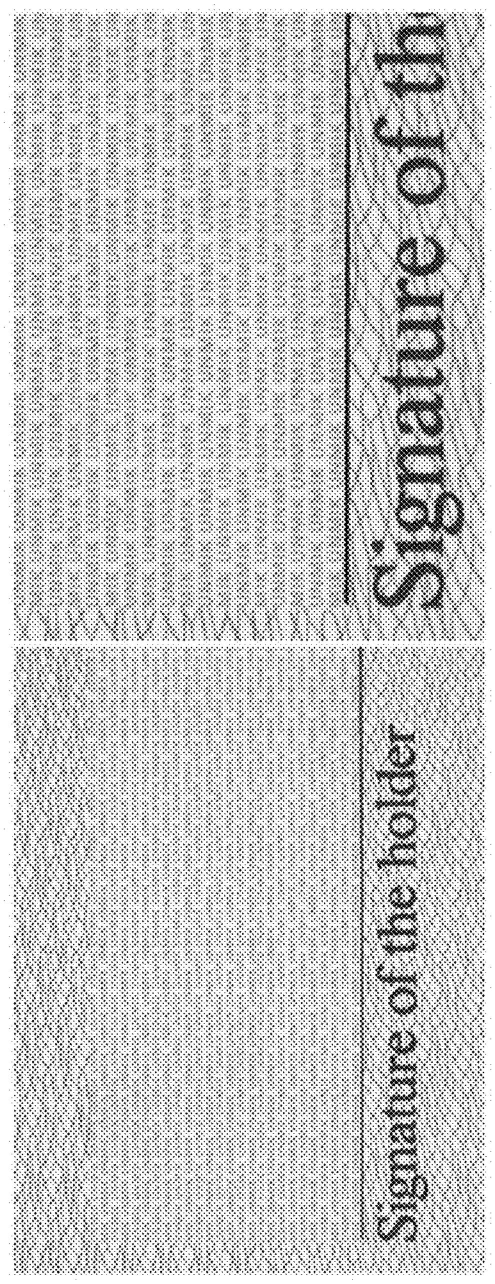
FIG. 52 illustrates an example of a microprinting in the signature panel of a passport page.

FIG. 52 illustrates an example of a microprinting in the signature panel of a passport page. Alterations to the bearer's signature risk damaging the continuity of the microprinting pattern. Compare to the single line microprinting shown in FIGS. 5 and 6 and the full document microprinting shown in FIGS. 14 and 15. Other kinds of security artwork can also be used for this function.

Figure 53:
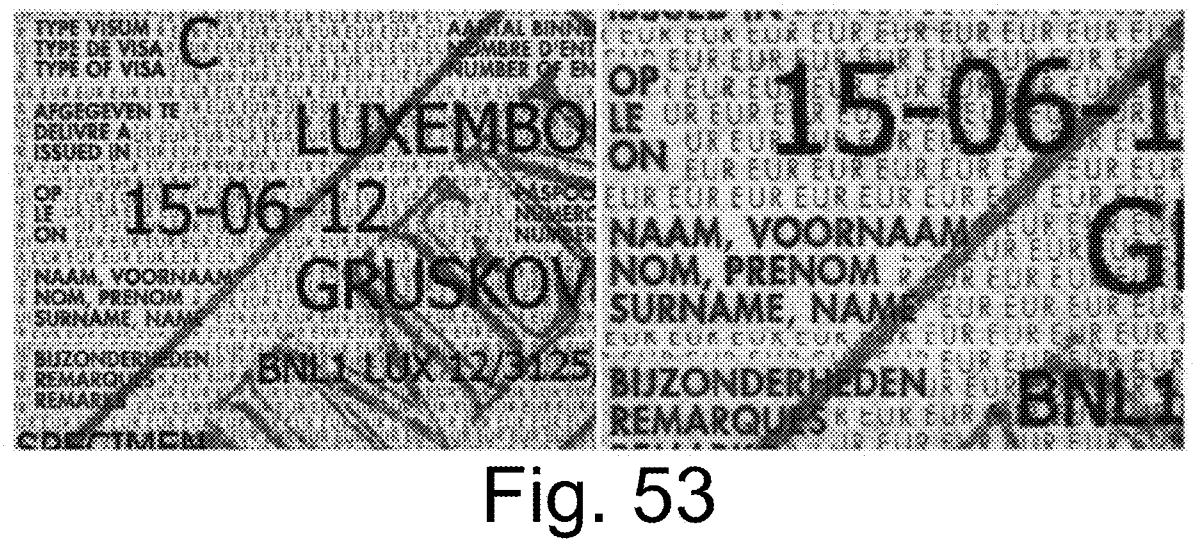
FIG. 53 illustrates an example of black inkjet personalization applied over blue and green multi-color intaglio microprinting background artwork in a visa.

FIG. 53 illustrates an example of a black inkjet personalization applied over blue and green multi-color intaglio microprinting background artwork in a visa. Alterations to the personal data risk damaging the continuity of the underlying microprinting pattern and revealing the alteration. Other kinds of security artwork can also be used for this function.

Figure 54:
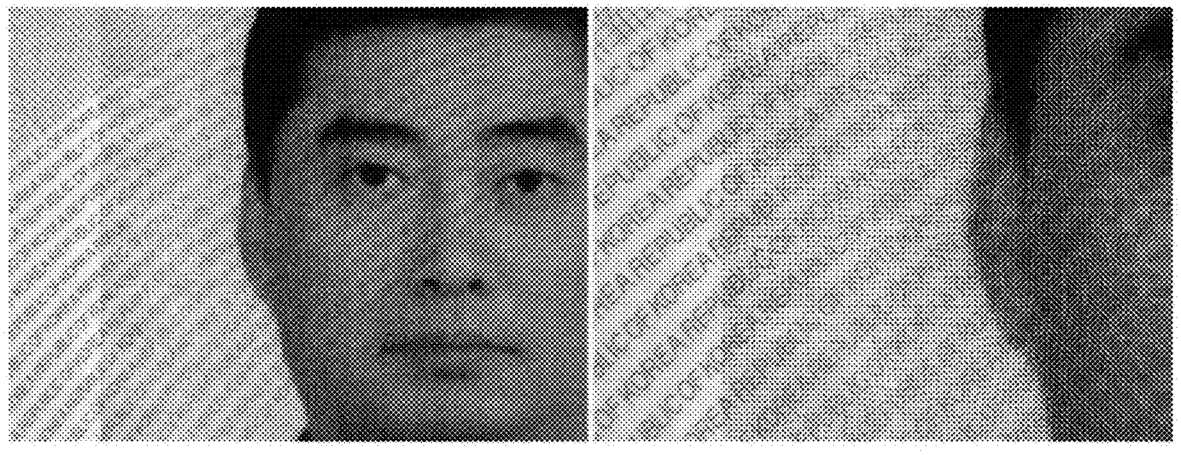
FIG. 54 illustrates an example of offset microprinting artwork printed in visible ink, intersecting the portrait area of a passport.

FIG. 54 illustrates an example of an offset microprinting artwork printed in visible ink, intersecting the portrait area of a passport. The portrait is translucent, allowing the microprinting to be read through the bearer image. Alteration of the portrait risks damage to the integrity of the microprinting. Other kinds of security artwork can also be used for this function.

Figure 55:
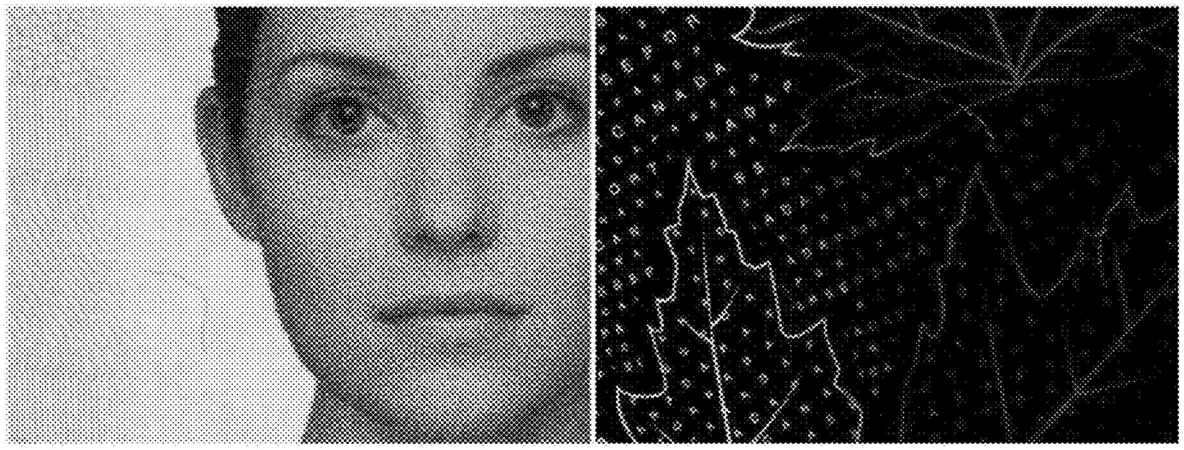
FIG. 55 illustrates an example of offset microprinting artwork printed in UV-reactive invisible ink, intersecting a passport secondary portrait in visible light (left) and UV light (right).

FIG. 55 illustrates an example of an offset microprinting artwork printed in UV-reactive invisible ink, intersecting a passport secondary portrait in visible light (left) and UV light (right). Alteration of the portrait risks damage to the integrity of the continuous UV microprinting pattern. Invisible UV-reactive ink does not compete with the portrait details in visible light, but this microprinting requires UV light to examine.

Figure 56:
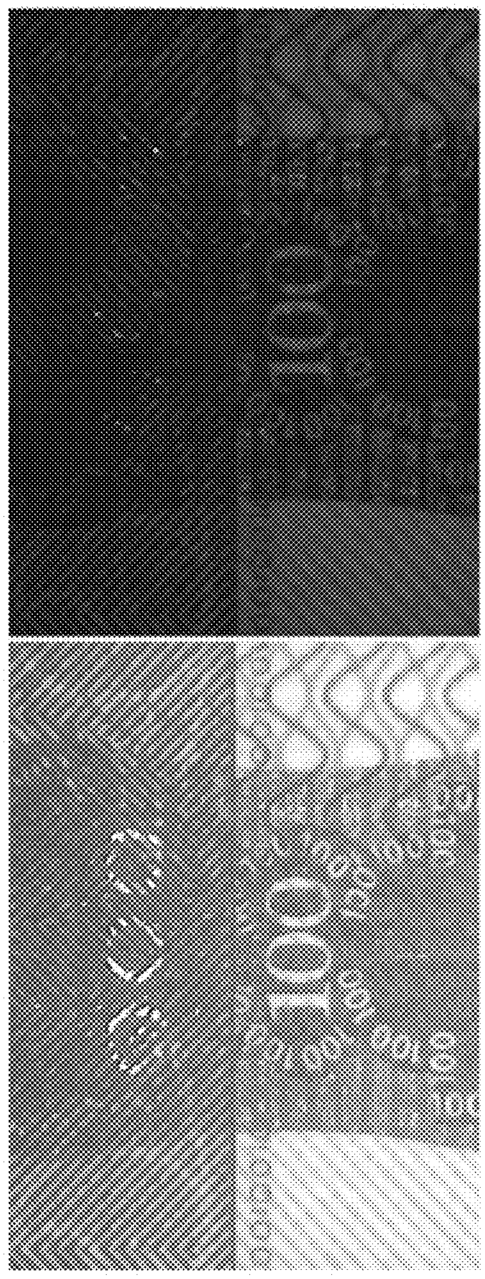
FIG. 56 illustrates an example of intaglio microprinting and latent image artwork printed across the surface of an OVD to help bind the OVD to this specific document.
Figure 57:
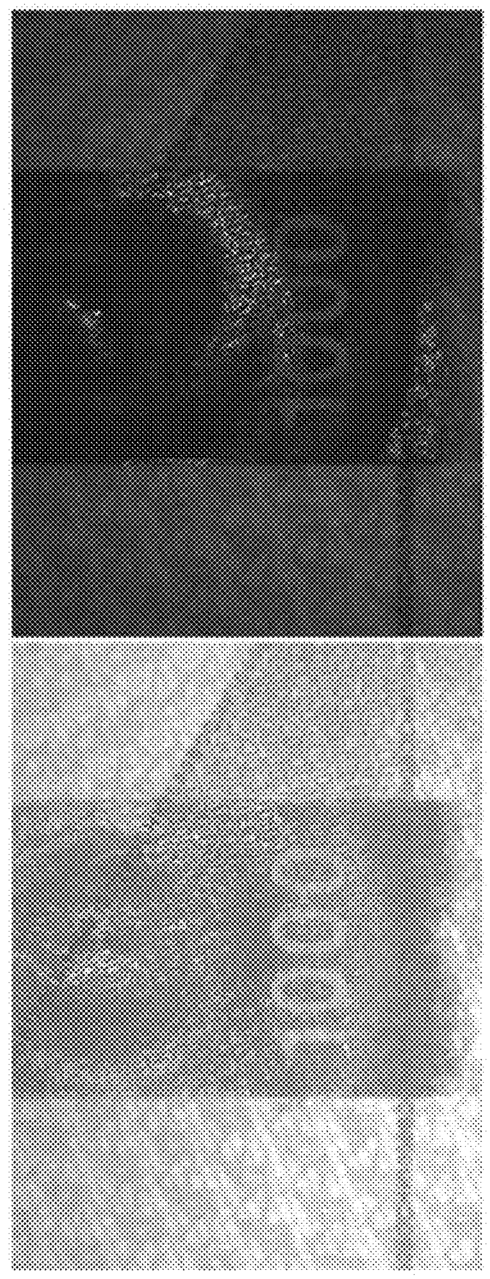
FIG. 57 illustrates an example of intaglio microprinting printed across the surface of a windowed security thread to help bind the security thread to this specific document.

In other examples, static microprinting is applied over certain document components to help bind them more closely to a specific host document. These include offset or intaglio microprinting applied over the edges of optically variable devices (OVDs, a holographic security feature) as in FIG. 56 or a windowed security thread as in FIG. 57. The microprinting patterns in FIGS. 56 and 57 are smooth and continuous across the edges of the features, and discontinuity or interruption could indicate an alteration. Similar overlap strategies can be applied to a variety of other document components.

FIG. 56 illustrates an example of an intaglio microprinting and latent image artwork printed across the surface of an OVD to help bind the OVD to this specific document. The microprinting should be perfectly continuous across the edges of the OVD. Misalignment or discontinuity in the microprinting could provide evidence of alteration to the OVD. As in FIG. 48, the OVD design itself also contains microprinting.

FIG. 57 illustrates an example of an intaglio microprinting printed across the surface of a windowed security thread to help bind the security thread to this specific document. The microprinting should be perfectly continuous across the edges of the security thread. Misalignment or discontinuity in the microprinting could provide evidence of an alteration to the windowed thread.

One way that changeable data can be secured against alteration is redundancy, and microprinting is one way to introduce redundancy. The passports shown in FIGS. 58 and 59 contain laser engraved microprinting that includes the bearer's personal data. Most static line art microprinting in security documents is intended to combat counterfeiting. In contrast, this personalized microprinting plays roles both in anticounterfeiting (because its small size is a product of the laser engraving process that may be hard for counterfeiters to mimic) and anti-alteration (because it can be compared to larger duplicate text data printed elsewhere in the document).

Figure 58:
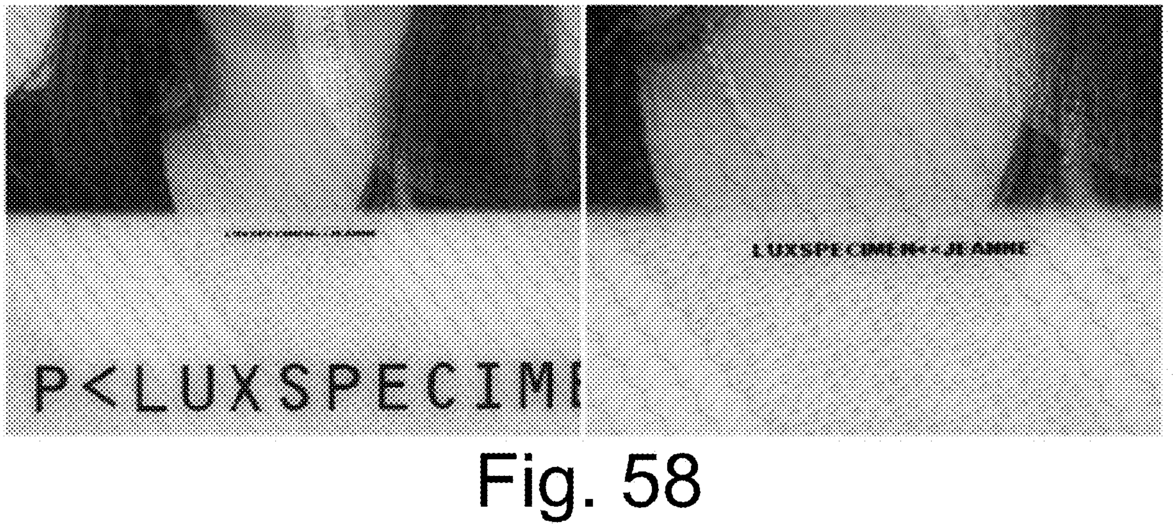
FIG. 58 illustrates an example of laser engraved personalized microprinting of the bearer's name in a polycarbonate passport data page, over offset line artwork that also contains microprinting.

FIG. 58 illustrates an example of a laser engraved personalized microprinting of the bearer's name in a polycarbonate passport data page, over offset line artwork that also contains microprinting. The use of laser engraving and personal data for this microprinting helps the document resist alteration, and placement of personalized microprinting over static microprinting can increase alteration resistance even further.

Figure 59:
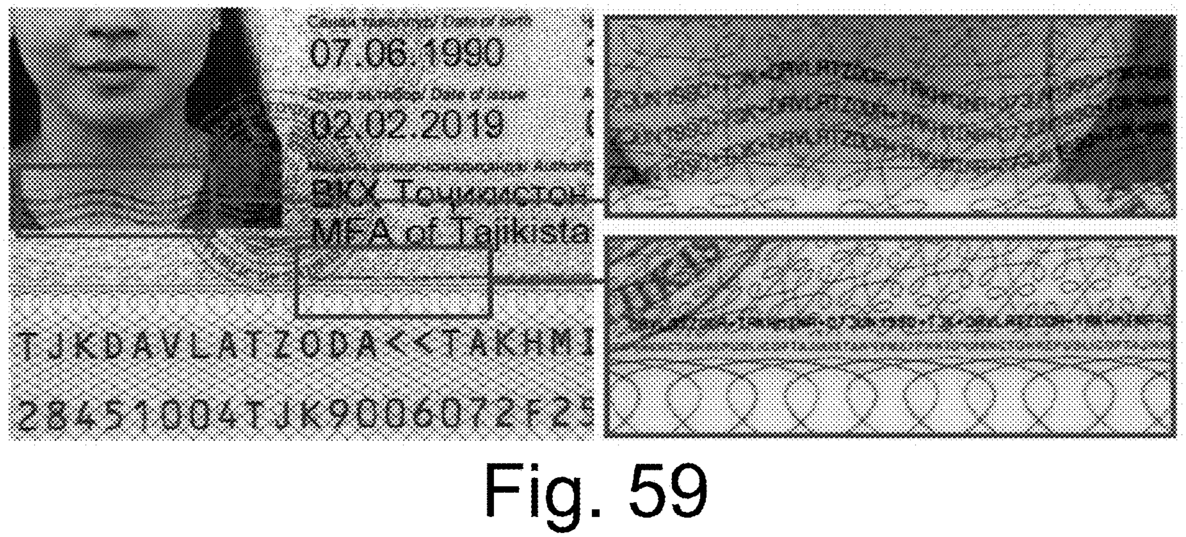
FIG. 59 illustrates an example of laser engraved personalized microprinting on a passport data page (left).

FIG. 59 illustrates an example of a laser engraved personalized microprinting on a passport data page (left). Multiple lines of laser engraved personalized microprinting across the portrait may make it easier for users to find (upper right). The long string of personalized laser engraved microprinting next to the long string of green static microprinting makes it easy to inspect both microprinting types at the same time (lower right).

Figure 60:
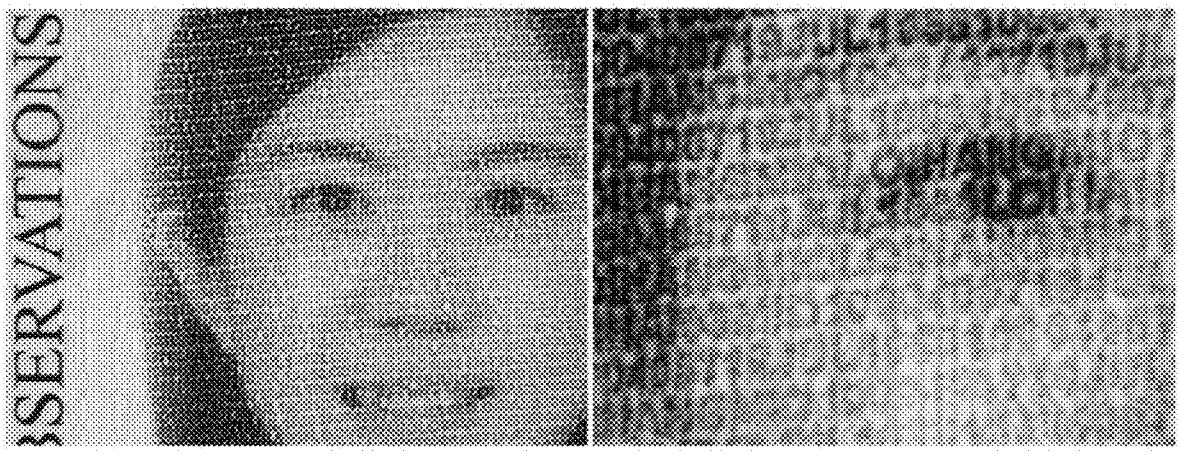
FIG. 60 illustrates an example of an inkjet secondary portrait in a passport, featuring a microscopic pattern of text that includes bearer personalization data.

Similarly, microprinting can be incorporated in secondary portraits, such as the inkjet secondary portrait in FIG. 60 that incorporates the bearer's unique personal data. Inkjet microprinting in a genuine document may be surprising since inkjet is often regarded as a tool for counterfeiting. However, in this application the anticounterfeiting value is defined less by the resolution of the inkjet printer than by the software that generates the hybrid secondary portrait based on both the bearer's face (macro image) and bearer's personal data (micro image). As with all secondary portraits the example in FIG. 60 can be compared with the primary portrait, so that a counterfeiter would have to change both to produce a convincing alteration.

FIG. 60 illustrates an example of an inkjet secondary portrait in a passport, featuring a microscopic pattern of text that includes bearer personalization data. Unlike static offset or intaglio microprinting, the anticounterfeiting value is less about inkjet printing process resolution than the software process for creating the microscopic pattern, which could be challenging for counterfeiters to reverse engineer.

Although microprinting is not the solution to every document fraud problem, it remains a tremendously flexible design feature that can be optimized at relatively low cost to fill both primary and ancillary security roles. This disclosure has explored how microprinting placement can impact both user ergonomics and alteration resistance. The above has explored microprinting in terms of font and pattern design, ink selection and color gamut, genuine issuer press capabilities, and the importance of both resolution and registration in combating both digital and traditional counterfeiting. Issuers are encouraged to consider all of these facets of microprinting together, since combining all of the techniques presented throughout this disclosure—artwork, color, and placement—may provide a pathway towards maximizing the value of a microprinting design to improve document security without driving up costs.

Optimizing Microprinting in Lamination Plate Features

The above describes optimizing microprinting described 2D font design and artwork customization for better resistance to artwork re-origination. The above further describes novel color, registration, and plate engraving depth strategies that can provide offset and intaglio microprinting with improved resistance to traditional offset counterfeiting to supplement the conventional role microprinting plays against digital simulation. The above further discloses how microprinting inspection ergonomics can be facilitated through advantageous placement and design strategies.

The following considers optimization of microprinting in tactile and matte lamination plate artwork in plastic substrates, including translation of the novel color strategies to use cases in colorless and inkless lamination plate applications. Bonding of multiple thin polymer layers is necessary for manufacturing plastic security card substrates. This process is done by application of heat and pressure between two metal lamination plates. It produces clear embossed tactile and/or matte security designs on the substrate surface (without consumables) if engraved or textured artwork is added to the lamination plates. Many conventional security design strategies typically associated with 2D printed artwork can be adapted for use in lamination plate feature graphics, including but not limited to the focus of this disclosure, namely, microprinting. Some examples include dynamic font size and placement of multiple microprinting types in the same location (FIG. 61), partial or bisected characters (FIG. 62), pattern-level customizations that complicate step-and-repeat counterfeiting processes (FIG. 63) and intersection of microprinting with personalization data, such as bearer portrait images (FIG. 64). However, inkless lamination plate features differ from printed artwork in some important ways, such as an absence of color and the addition of tactile feature height and matte surface roughness as potential new design variables.

Figure 61:
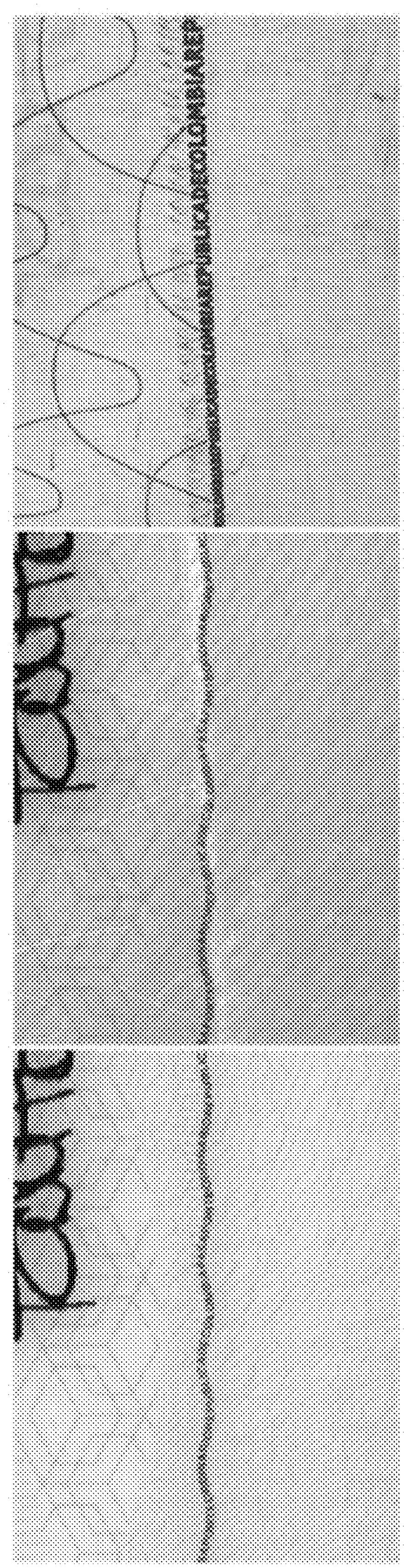
FIG. 61 illustrates an example of a lamination plate feature containing microprinting text of variable size.

FIG. 61 illustrates an example of a lamination plate feature containing microprinting text of variable size. The wavy offset microprinting line visible in the reflected and oblique light images is located directly under the plate feature microprinting and may be intended to facilitate simultaneous inspection. The gradual font size increase that can be seen in the coaxial light image raises the difficulty of copy/paste artwork replication. Additional steps to customize the font in different parts of the line are also options.

Figure 62:
FIG. 62 illustrates an example of a lamination plate design containing incomplete tactile microtext characters.

FIG. 62 illustrates an example of a lamination plate design containing incomplete tactile microtext characters. Individual characters are bisected at the edges of the microprinting that comprises the large clear tactile "MARYLAND" text in the coaxial image. This transforms the pattern from a purely text microprinting design into nonrepeating line art, increasing the complexity and labor needed to replicate it. Further customizations of the font or 2D microprinting pattern by warping or distortion are also possible.

Figure 63:
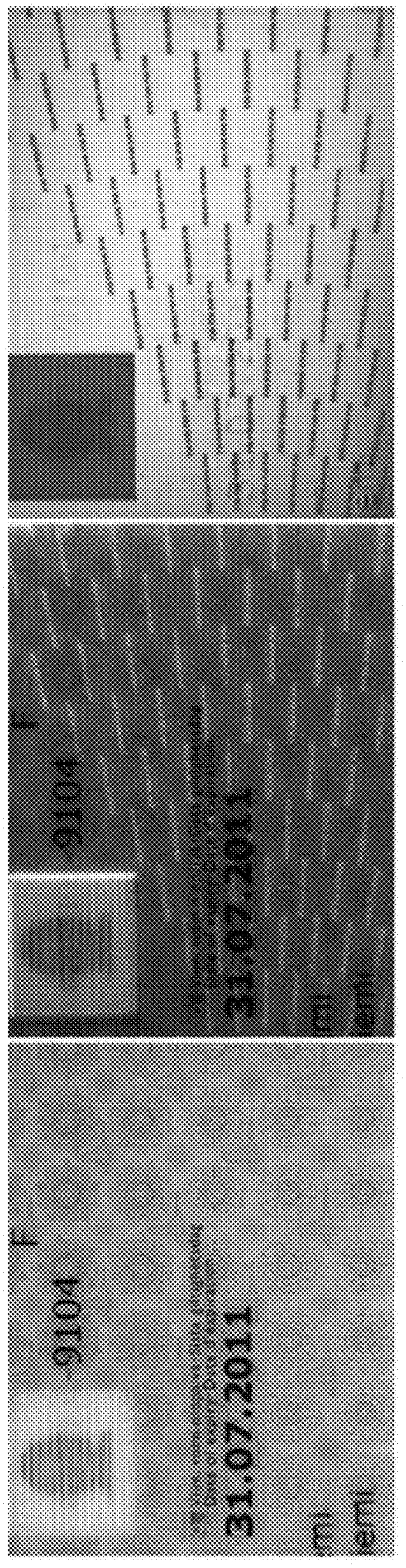
FIG. 63 illustrates an example of a lamination plate feature containing a nonrepeating microprinting pattern.
Figure 64:
FIG. 64 illustrates an example of a lamination plate microprinting feature intersecting a laser engraved portrait image.

FIG. 63 illustrates an example of a lamination plate feature containing a nonrepeating microprinting pattern. The baseline tilt differs depending on where a particular microprinting string is placed within the larger pattern, adding work to step-and-repeat counterfeiting processes. Additional 2D microprinting customizations can also include font-level customizations or pattern-level warps/distortions. The laser engraved expiration date resides underneath the tactile microprinting within the card body, contributing resistance to alteration.

FIG. 64 illustrates an example of a lamination plate microprinting feature intersecting a laser engraved portrait image. As with the personal data text in FIG. 63, laser engraved portrait images can be applied through lamination plate features to mark interior layers of a card body. Attempts to remove or alter the portrait risk damage to the plate feature, while inclusion of microprinting makes the plate feature both difficult to restore once damaged and hard to counterfeit using low-resolution simulation processes.

Tactile and Matte Features

Plate features can be generally divided into two groups: tactile and matte. Tactile plate features are embossed areas of the substrate surface produced from artwork engraved into a lamination plate. Matte features consist of light-scattering art produced from roughened areas of the lamination plate that contrast with the glossy specular reflectance of the substrate surface. Although both tactile and matte plate features can be checked in a limited way by touch, the subtle details that make a plate design hard to counterfeit can be inspected visually with the document tilted against a light, or with magnification, particularly in the case of lamination plate microprinting. A tactile plate feature is shown in FIG. 65 and a matte plate feature is shown in FIG. 66.

Figure 65:
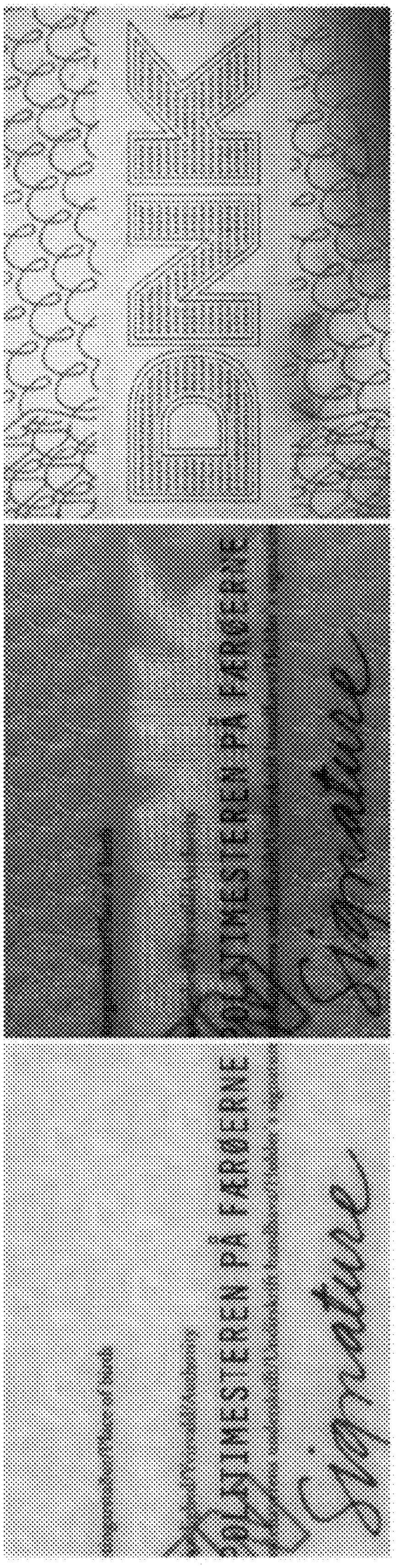
FIG. 65 illustrates an example of a lamination plate feature containing only tactile areas, with no matte art.

FIG. 65 illustrates an example of a lamination plate feature containing only tactile areas, with no matte art. As with many tactile features, this design is composed entirely of thin lines (including microprinting) without large block shapes. It is visible in either oblique or coaxial light in the figure graphics, though document users would typically inspect it by tilting against a light source, or with magnification.

Figure 66:
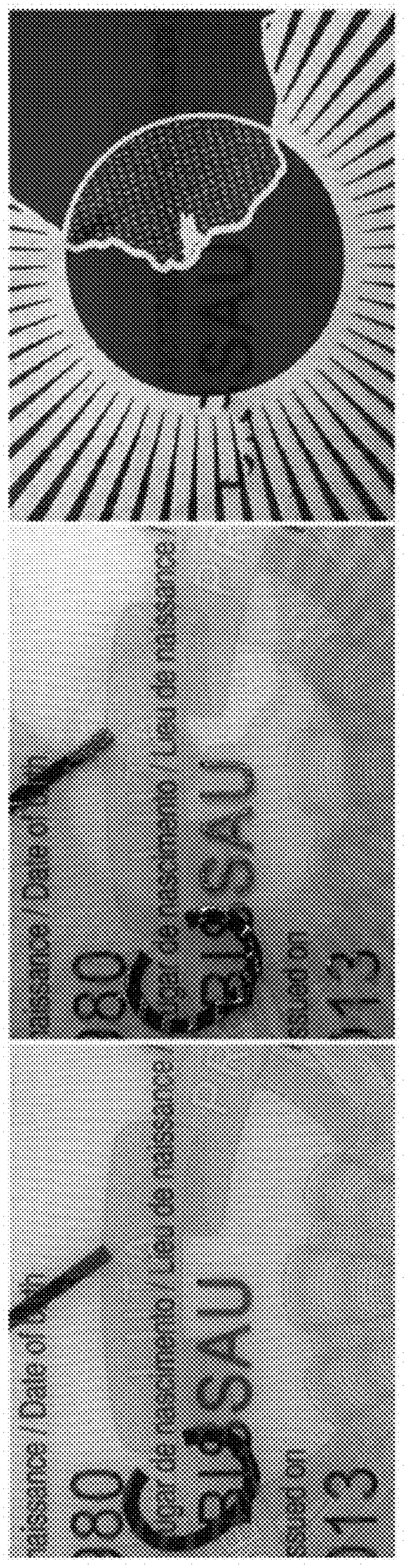
FIG. 66 illustrates an example of a lamination plate feature containing only matte areas, with no tactile art.

FIG. 66 illustrates an example of a lamination plate feature containing only matte areas, with no tactile art. Unlike the tactile design in FIG. 65, this matte design contains large bold shapes (including negative microprinting). It is more visible in coaxial light than oblique light in the figure graphics, though document users can inspect this feature easily by tilting against a light source, or with magnification.

Figure 67:
FIG. 67 illustrates an example of a lamination plate feature containing a mix of tactile and matte areas.

Contemporary security documents often include plate features of both types adjacent to one another. FIG. 67 illustrates an example of a lamination plate feature containing a mix of tactile and matte areas. Because both tactile and matte features are applied in a single lamination step from one plate, there is little possibility of misregistration between tactile and matte graphics on the surface of a genuine document. However, counterfeiters attempting to simulate tactile and matte elements with two separate steps/processes must overcome difficult microscopic registration and resolution problems.

Because simulating a tactile feature can rely on different methods than simulating a matte feature, and security designs of higher graphical complexity can be made far more difficult to counterfeit than simple art, lamination plate microprinting optimization can benefit from more than just including both plate feature types. The following proposes that intentional integration of tactile and matte artwork into comprehensive microprinting designs, where the two types cannot be attacked as independent elements, is the path to microprinting plate features that are more resistant to counterfeiting and simulation. Some design strategies for plate feature microprinting are presented below. Issuers may determine which, if any, such strategies are of potential utility given the capabilities of their own plate manufacturing and/or substrate lamination workflows.

Grayscale Analogy

Plate feature artwork elements are often regarded as either tactile or matte, as though tactile features were limited to only a single height and matte features to just a single surface texture. However, both types are more analogous to image grayscales and could be included to a greater or lesser extent in different areas of a lamination plate design. Just as different areas of a grayscale image encompass a range of values between white and black, tactile features could include a range of heights to be "more" or "less" tactile and matte features could include a range of surface textures to be "more" or "less" matte (or glossy).

Viewed this way, the height of tactile features and the reflectivity of matte features are additional variables for designers to customize alongside two-dimensional artwork. Some examples in issued documents include FIG. 68, in which the oblique light image shows what appear to be different tactile heights in different areas of the design (even though on this card the tactile heights are uniform) and the coaxial image shows matte finishes placed on top of some tactile surfaces.

Figure 68:
FIG. 68 illustrates an example of a lamination plate feature containing a mix of tactile and matte elements.

FIG. 68 illustrates an example of a lamination plate feature containing a mix of tactile and matte elements. Although the tactile elements are of similar height throughout, in oblique light the shadows make some tactile areas appear higher than others. If intentionally designed, tactile elements of multiple heights could be included to create different real textures. Additionally, comparing the oblique and coaxial images shows the matte shapes surrounding the center of the flower are on top of a raised tactile surface.

Figure 69:
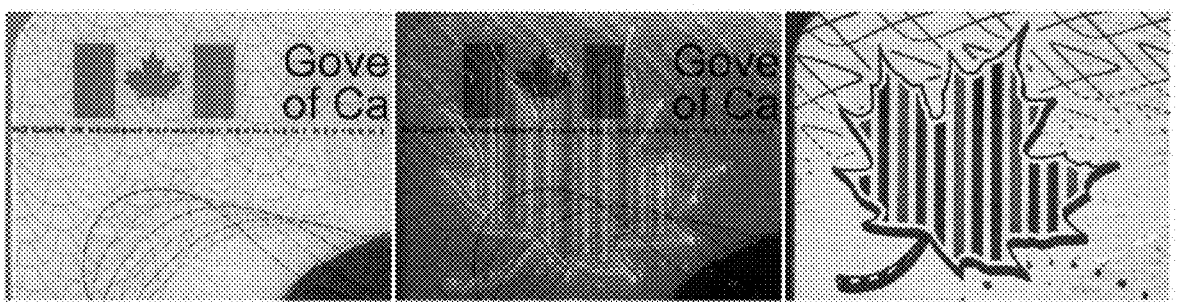
FIG. 69 shows matte effects with different surface roughness levels that appear as different gray levels in the coaxial image and are also placed on top of tactile surfaces, as in FIG. 68.

Similarly, FIG. 69 shows matte effects with different surface roughness levels that appear as different gray levels in the coaxial image and are also placed on top of tactile surfaces, as in FIG. 68. FIG. 69 illustrates an example of a lamination plate design containing multiple matte intensities, which appear as different gray levels in the vertical stripes in the coaxial light image. As in FIG. 68, one may compare the oblique and coaxial images to see that the matte features are on top of raised tactile surfaces.

Importantly, the examples in FIGS. 68 and 69 contain no microprinting, but the mockups shown in FIGS. 70 to 75 illustrate how microprinting design can benefit by extension of these concepts.

Figure 70:
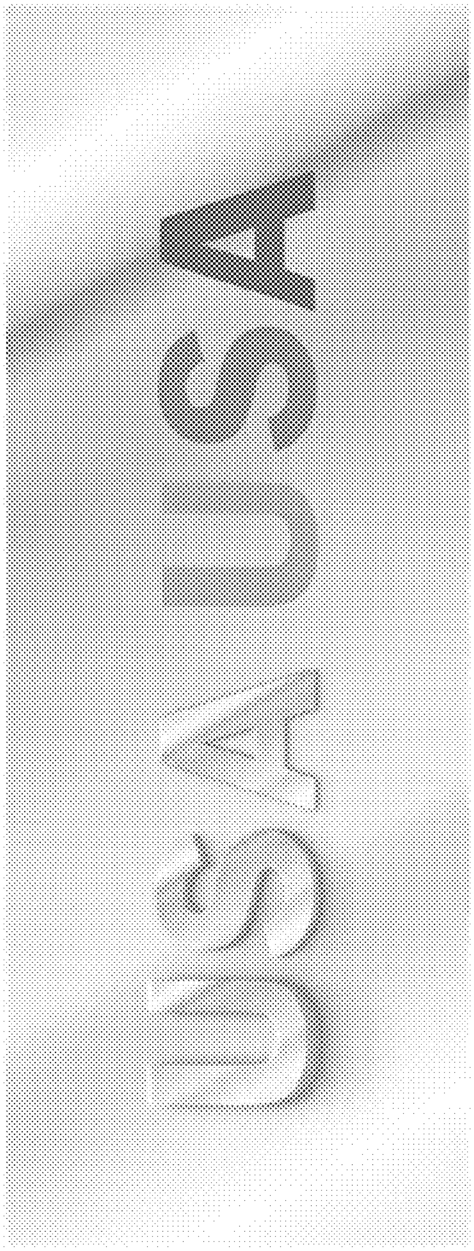
FIG. 70 illustrates an example of a mockup of lamination plate microprinting text containing tactile structures of varying height and matte surfaces of varying intensity.

FIG. 70 illustrates an example of a mockup of lamination plate microprinting text containing tactile structures of varying height and matte surfaces of varying intensity. On the left, three discrete tactile heights are shown, and the right contains three discrete matte surfaces. More or fewer discrete levels might be possible, depending on an issuer's lamination plate manufacturing capabilities and the degree of detail achievable through the lamination process itself.

Figure 71:
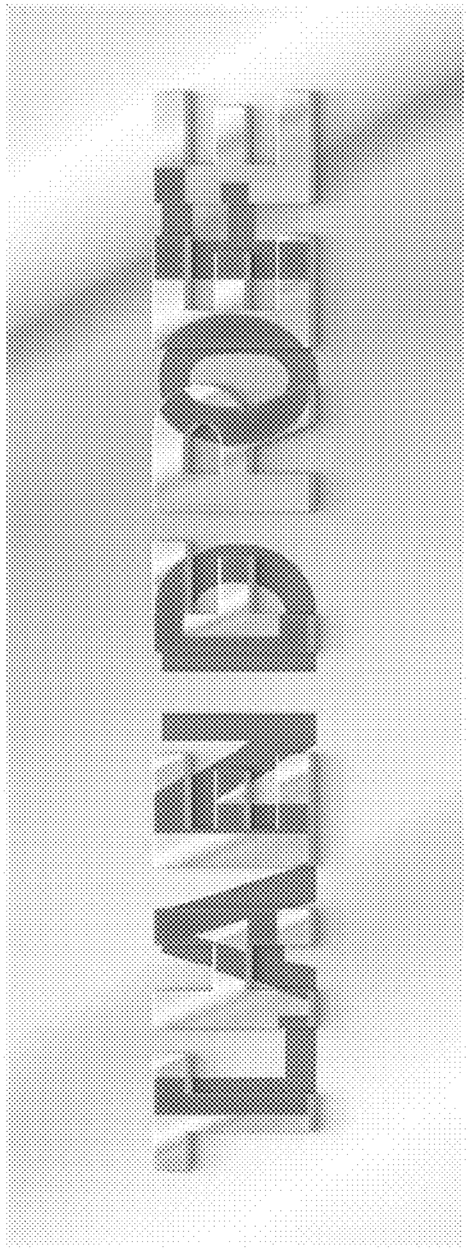
FIG. 71 illustrates an example of a mockup illustrating a lamination plate microtext design in which placement of tactile and matte effects are incongruent, adding complexity and offering the potential for unconventional tilt visual effects.

FIG. 71 illustrates an example of a mockup illustrating a lamination plate microtext design in which placement of tactile and matte effects are incongruent, adding complexity and offering the potential for unconventional tilt visual effects. As with all prior mockups, issuers may assess manufacturability of such a design based on their own lamination plate production and lamination workflows.

A basic microprinting mockup with characters of three discrete tactile heights and three discrete matte surfaces is illustrated in FIG. 70 (though more than three would add greater complexity) and a mockup illustrating an alternate design strategy that extends a matte effect across both tactile and nontactile areas is shown in FIG. 71. Building further on this foundation, customization of microprinting at the subcharacter level can provide more advantages.

Figure 72:
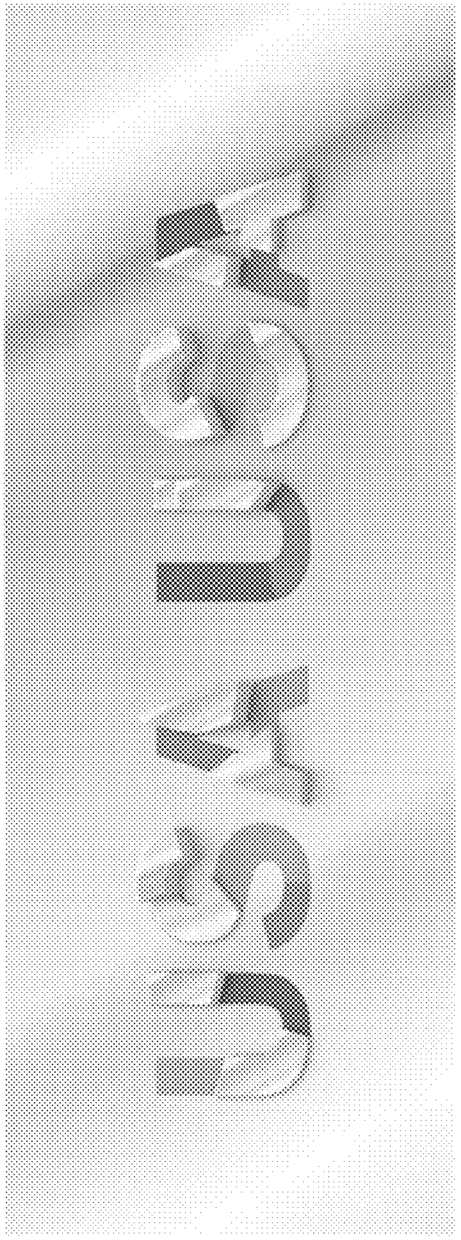
FIG. 72 illustrates an example of a mockup of lamination plate microprinting characters in which each character is comprised of a unique arrangement of different tactile and matte effects.

For example, FIG. 72 illustrates an example of a mockup of lamination plate microprinting characters in which each character is comprised of a unique arrangement of different tactile and matte effects. This artwork is still recognizable as readable microtext, allowing it to fulfill its conventional role against low-resolution simulation methods. However, counterfeiters seeking to simulate tactile and matte effects with two different processes are also presented with a difficult microscopic registration challenge or the microprinting will be illegible.

The mockup in FIG. 72 shows a plate feature microprinting design that incorporates the three discrete tactile heights and three matte levels in different locations within individual characters, each of which remains readable as text despite the internal partitioning. FIG. 72 is a conceptual extension of the intaglio microprinting strategies, in which each individual microtext character was subdivided into multiple color and depth elements that can force counterfeiters to demonstrate high registration in addition to high resolution. The internal composition of each character is dynamic, making step-and-repeat counterfeiting of the 3D tactile and matte effects impossible even though the 2D character shapes are static. Manufacturability of the design in FIG. 72 is assumed for purposes of illustration, but not all platemaking or substrate manufacturing technologies can accommodate this level of detail. The exact size of the microprinted characters also remains intentionally undefined. Designers might consider including a mix of large and small text that could be inspected both with and without magnification, including text larger than conventional microprinting.

FIG. 72 presents counterfeiters with several problems. First, multiple tactile and matte effects must first be reverse engineered and then simulated, instead of just one of each. This complicates not only the physical/hardcopy counterfeiting steps but also the difficulty of imaging and analyzing surface contours in clear plastic. The already-challenging prepress task of copying a colorless, inkless lamination plate feature is made even harder as the 3D complexity of the genuine plate design increases. Second, if a counterfeiter attempts to simulate the tactile and matte effects using two different technologies, output of the two steps would risk microscopic misregistration. If tactile and matte areas were out of register, legibility of the microtext in FIG. 72 could be affected. Third, use of a counterfeiting process that cannot replicate tiny microprinting details would be risky, since the plate feature design is based on microprinting that cannot be simulated using low-resolution methods. That a counterfeiter would face these problems simultaneously makes simulation of the entire plate microprinting design more complicated than the individual elements alone.

Split of Fountain Analogy

The concept in FIG. 72 has two limitations. First, it contains only three discrete levels of tactile and matte effects, which constrains potential graphical complexity. Second, since the artwork customization occurs at a size even smaller than individual microtext characters and would produce no large macro trend visible to the naked eye across the full width of a card, the design in FIG. 72 is inspectable only with magnification. Both limitations can be addressed by introducing macro-scale continuous tactility and matte transitions that are analogous to split fountains, a printed feature common in security documents of all types and familiar to many document users.

In printed artwork, a split fountain is a continuous transition between colors, created by partially blending two inks together on press, which can be inspected both with and without magnification depending on the design of the associated artwork. Although anchored by only two spot ink colors, the color transition between them shows a theoretically infinite number of blended hues. In the colorless, inkless environment of plate features, conceptual adaptations of split fountain visual effects could include a continuous transition from high to low tactility, from bold to subtle matte or other combinations encompassing continuums of values instead of the discrete height or matte levels introduced in FIGS. 70 to 72. The purpose is to create a microprinting plate design that (1) approximates an infinite number of discrete levels of tactility or matte to make reverse engineering difficult and protect the microprinting from simulation and (2) shows a macro effect observable without magnification that reminds users of a split fountain transition. This is relevant because a key problem with microprinting is the need to inspect it with magnification, which limits its utility.

Figure 73:
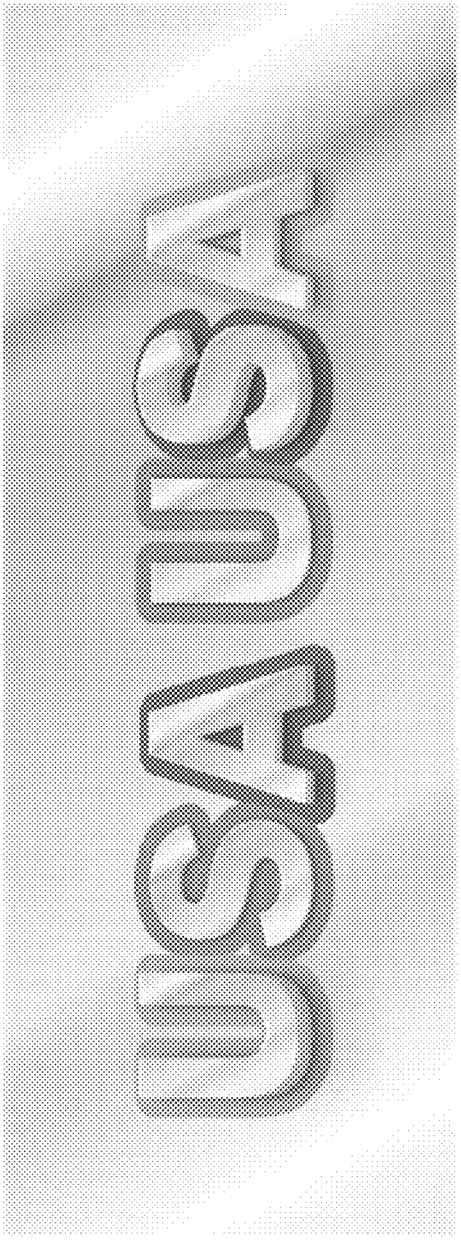
FIG. 73 illustrates an example of a mockup of lamination plate microprinting in which the placement of tactile and matte characteristics within the 2D artwork is the same for each character, with a tactile interior and matte outline.

FIG. 73 illustrates an example of a mockup of lamination plate microprinting in which the placement of tactile and matte characteristics within the 2D artwork is the same for each character, with a tactile interior and matte outline. Differences between one character and the next are due solely to tactile height and/or matte roughness. This microtext design is just a precursor to FIGS. 73 and 74, which demonstrate how tactile and matte gradients can facilitate inspection of lamination plate microtext without magnification.

Figure 74:
FIG. 74 illustrates an example of a mockup showing the extension of the artwork in FIG. 72 to a larger pattern extending across a full plastic card substrate.

FIG. 74 illustrates an example of a mockup showing the extension of the artwork in FIG. 72 to a larger pattern extending across a full plastic card substrate. The 2D design of the microtext, including tactile and matte location, is identical throughout. Within each character, however, the tactile height is varied vertically, and the matte roughness is varied horizontally, where gradual gradients within each create macro visual/tactile effects that can be inspected both with and without magnification.

Figure 75:
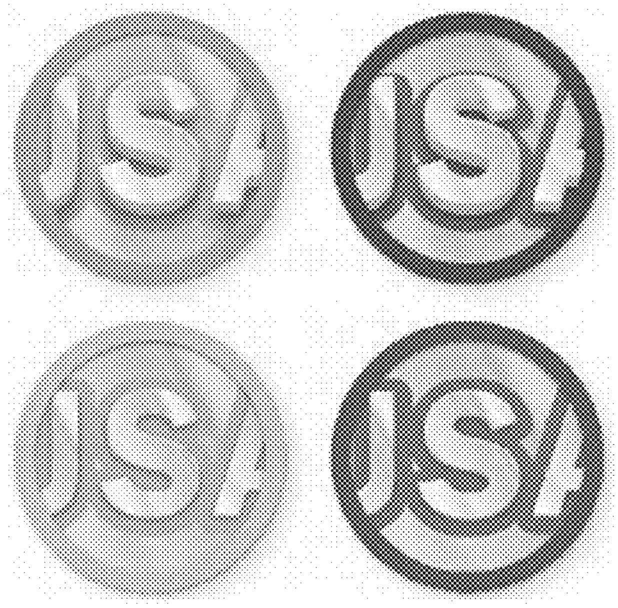
FIG. 75 illustrates another example of a key to the four corners of the card graphic shown in FIG. 73, illustrating continuous variation of tactile height and matte intensity independently of one another.

FIG. 75 illustrates another example of a key to the four corners of card graphic shown in FIG. 73, illustrating continuous variation of tactile height and matte intensity independently of one another. The top two images show the upper left and upper right corners of the card, with high tactile, and the bottom images show the lower left and lower right corners with low tactile. Similarly, matte is subtle on the left and bold on the right. The pattern looks different in each corner, though the 2D art is identical.

The mockup in FIGS. 73 to 75 shows one possible way to address these goals. While the artwork in FIG. 72 resists reverse engineering and step-and-repeat counterfeiting because the interior composition of each character is unique, in FIGS. 73 to 75 the locations of the tactile and matte components within every 2D character are the same throughout the pattern and it is only the tactile height and matte roughness that vary. This allows both variables to be gradually transitioned across the full width of the card body shown in FIG. 74, creating two macro patterns reminiscent of grayscale split fountains that can be seen or touched without magnification. First, the matte interior of each character is bold at the upper left, more subtle towards the center and gradually bold again at the lower right. Second, the tactile outlines are taller at the top of the document and gradually shorten until the texture nearly vanishes at the bottom. The complete microprinting pattern would show the effects of both transitions simultaneously at a macro level, allowing inspection of the feature by touch and with tilt but without magnification, though inspection with magnification would provide additional value.

As in FIGS. 70 to 72, the absolute size of the text in FIGS. 73 to 75 is undefined. Issuers may consider the limits of their own manufacturing capabilities, and the advantages and disadvantages of using larger or smaller text (or both) in plate artwork. Additionally, the strategies in FIGS. 70 to 75 could all be integrated together into a single plate feature design in which the font and microprinting pattern are also optimized in 2D or extended beyond microprinting to other types of security artwork compatible with lamination plate features (guilloche patterns and security halftones, for example).

All lamination plate features in contemporary plastic security documents contribute resistance to counterfeiting because they are difficult to capture with conventional scanning and photographic technology, but opportunities for improved design remain. This disclosure has presented some novel strategies for microprinting plate features intended to inhibit counterfeiter reverse engineering, prevent step-and-repeat counterfeiting processes, and produce microprinting patterns that can be inspected both with and without magnification. A key idea is that tactile and matte effects are not simply present or absent, but that tactile height and matte intensity might be optimizable as additional design variables to create lamination plate features with increased complexity, given the necessary plate and substrate manufacturing capabilities. Further, parallels with grayscale images and split fountain transitions were drawn, to the conclusion that even inkless, colorless microprinting plate features can be designed to remind document users of familiar printed security features.

Printing Apparatus and Process

The following describes some examples of printing apparatus and process for performing microprinting. In addition, the following presents examples of offset printing apparatuses that can be adapted for offset microprinting.

Microprinting Apparatus

Microprinting is known in the art. Examples include U.S. Patent Application Publication Nos. 2015/0009271 (using a thermal printer) and 2009/0021000 (without specifying a type of printer) and U.S. Pat. No. 7,270,918 (using an electrographic printer) and U.S. Pat. No. 11,186,113 (using, e.g., a flexographic printing process, a lithographic printing process, or a replicating process), the entire disclosures of which are incorporated herein by reference.

Figure 76:
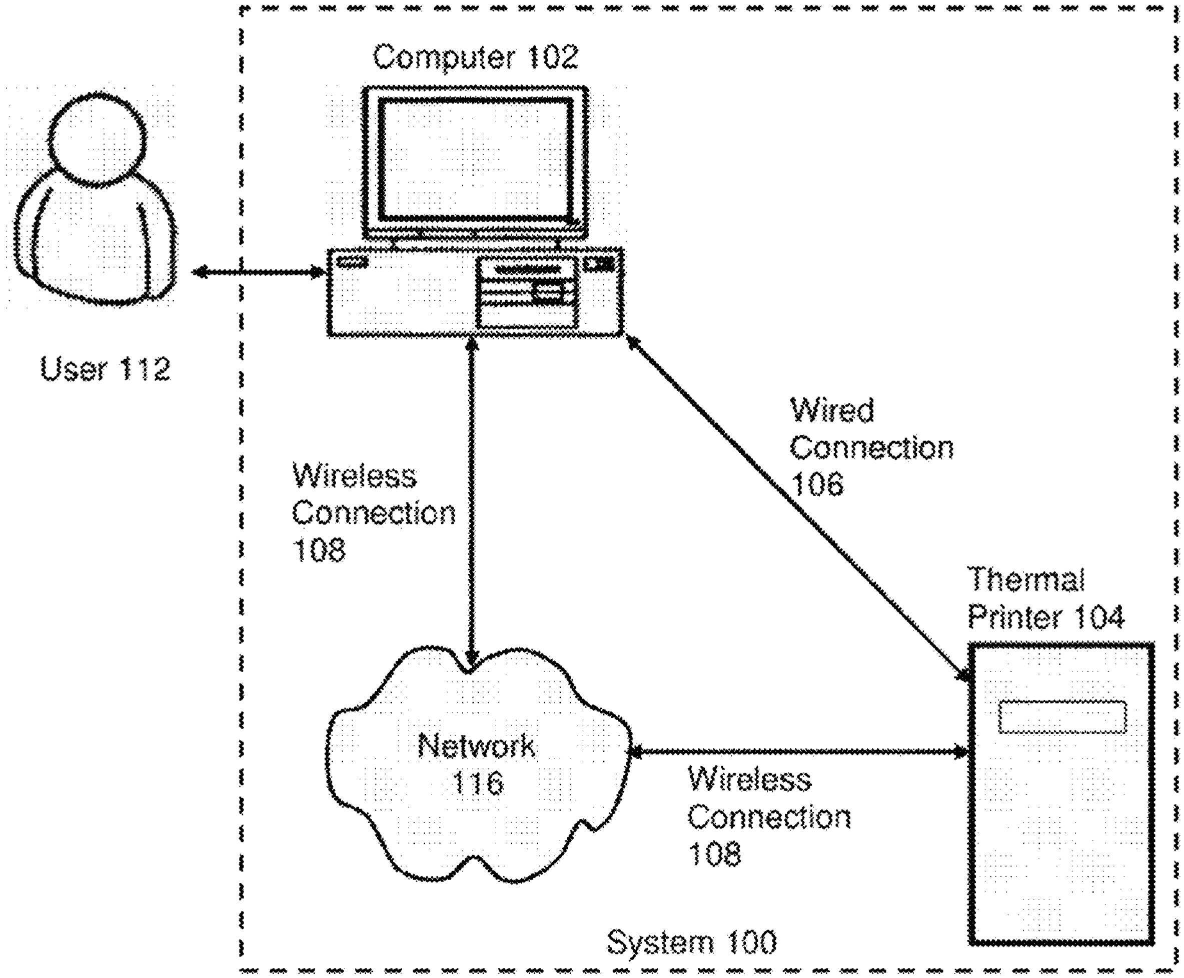
FIG. 76 illustrates an example of a system architecture diagram of a printer that is structured, configured, and/or programmed to print security features including microprinting on a substrate.

FIG. 76 illustrates an example of a system architecture diagram of a printer that is structured, configured, and/or programmed to print security features including microprinting on a substrate. The system 100 includes a printer 104 that can have various communication links to a computer 102 in the embodiment shown. Communication connections between the computer 102 and the thermal printer 104, may include a wired connection 106 and a wireless connection 108 via a network 116. A user 112 may use the computer 102 to instruct the printer 104 to print a particular pre-stored security feature (e.g., a particular microprinting loaded in the memory of the printer) on the substrate, and to merge the particular security feature with variable data.

Figure 77:
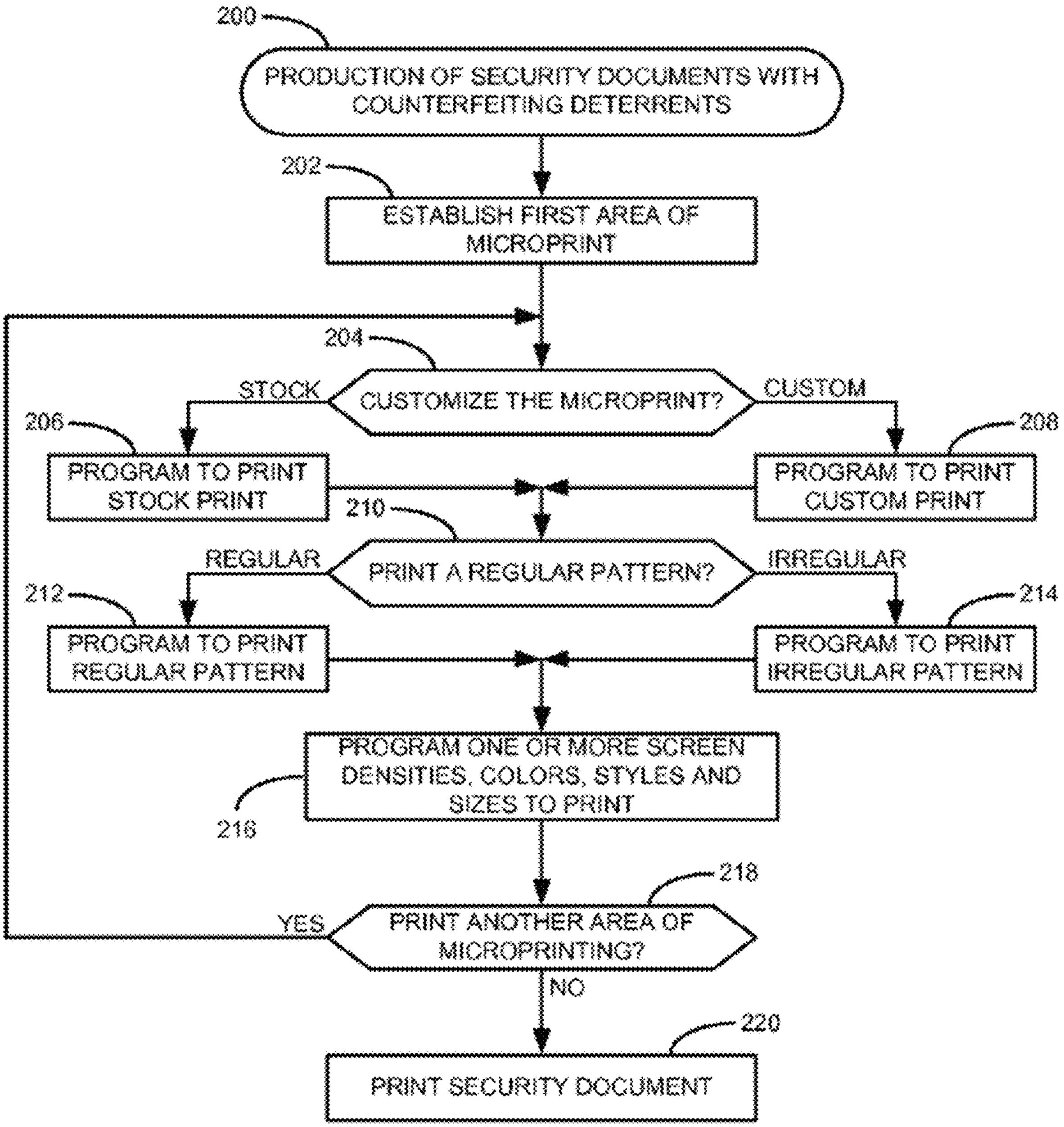
FIG. 77 is a flow diagram illustrating an example of a process for production of a security document with anti-counterfeiting features including microprinting that may be implemented to produce the example document.

FIG. 77 is a flow diagram illustrating an example of a process for production of a security document with anti-counterfeiting features including microprinting that may be implemented to produce the example document. The process or method 200 may be used to produce a security document with counterfeiting deterrents, such as those presented in this disclosure. In an example implementation, the operations depicted in the flow diagram may be implemented using machine readable instructions that are executed by any processing or computing systems now known or developed later. The machine-readable instructions may be embodied in software stored on a tangible medium such as a CD-ROM, a floppy disk, a hard drive, a digital versatile disk ("DVD"), or a memory associated with a processor and/or embodied in firmware or dedicated hardware in a well-known manner. Further, although the example programs or processes are described with reference to the flow diagram illustrated in FIG. 77, persons of ordinary skill in the art will readily appreciate that many other methods of implementing the example document production process 200 may alternatively be used. For example, the order of execution of the steps may be changed, and/or some of the steps described may be changed, eliminated, or combined.

The example process 200 begins by setting up or establishing a first area of microprint to be printed in step 202, which may not be readily discernible with the naked eye, but which may be legible under magnification. When setting up an area of microprint to be printed, the specific type of print is selected. For example, the print to be microprinted may be a custom print or a stock print (step 204). If the microprint is a stock print, the example process 200 is programmed to print the stock print in step 206. If the microprint is customized, any word, language, shape, symbol, etc. is programmed into the example process 200 to customize the print (step 208).

The example process 200 may also be programmed to print a regular and/or an irregular pattern in step 210. If a regular pattern is programmed, the example process 200 prints the regular program in step 212. However, if an irregular pattern is programmed, the example process 200 prints an irregular pattern in step 214. An irregular pattern may include any number and/or variety of deviations, convergences, divergences, deformations, offsets, or other departures from a regular, consistent pattern. An irregular pattern may be used to produce a three-dimensional appearing cue word or symbol, which may be visible to the naked eye.

The example process 200 may also include selection of one or more screen densities, ink colors, font style and sizes of the microprint (step 216). Further, the example process 200 may include one or more additional areas of microprint (step 218). If the example process 200 is programmed for printing an additional area of microprint, control is returned to step 204 and the parameters of the second area of microprinting are determined. The example process 200 may continue until a plurality of areas of microprinting is established. If an additional area of microprinting is not to be printed, the example process 200 continues to print the security document (i.e., variable data) in step 220.

Security documents printed using the example process 200 include counterfeiting deterrents such as, for example, the areas of microprint. If a security document printed from the example process 200 were copied or otherwise reproduced via a photocopier or other digital imaging or optical reading device, the area(s) of microprint would not be substantially reproduced. For example, the area(s) of microprint would appear as jagged, solid and/or broken line(s) or not appear at all. Thus, a person handling or otherwise inspecting a copy of the security document formed from the example process 200 would be able to readily observe that both the area(s) of microprint are blurred or missing and, thus, that the document must be a copy, an unauthorized version, a forgery, a counterfeit, or otherwise unofficial document.

Offset Printing Apparatus

Offset printing equipment is known in the art. Examples include U.S. Pat. Nos. 7,770,517, 6,823,792, and 5,590,598, the entire disclosures of which are incorporated herein by reference. The offset printing apparatuses can be adapted for offset microprinting, for instance, using the process shown in FIG. 77 and described above.

Figure 78:
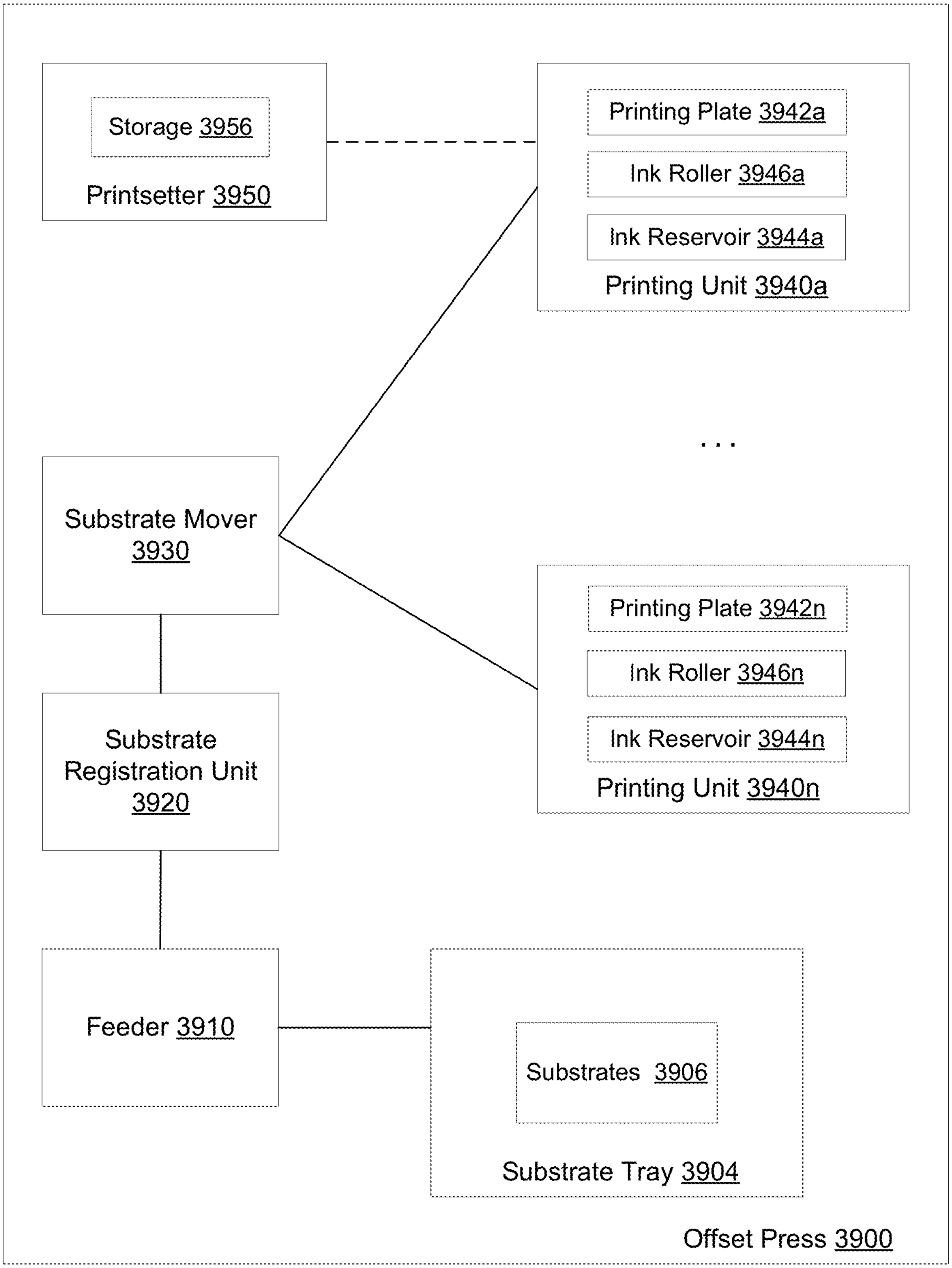
FIG. 78 illustrates an example of an offset printing system.

FIG. 78 illustrates an example of an offset printing system. The system includes an offset press 3900 which includes a substrate tray 3904 for substrates 3906, a feeder 3910, a substrate registration unit 3920, a substrate mover 3930, and a plurality of printing units 3940 (3940*a* to 3940*n*). The feeder 3910 is configured to feed the substrates 3906 into the offset press 3900 one by one. The substrate registration unit 3920 is configured to orient each substrate 3906 so that each substrate is positioned within a threshold before the substrate mover 3930 pulls the substrate into a printing unit 3940. The substrate mover 3930 may include grippers. Each printing unit 3940*a-n* includes a plate 3942*a-n*, an ink reservoir 3944*a-n*, and an ink roller 3946*a-n* configured to apply symbol or information to each substrate 3906. The system 3900 may further include a printsetter 3950 having non-transitory computer readable instructions stored on a tangible computer read storage medium 3956. Details on the structures and functions of the offset press 3900 and its elements can be found, for instance, in U.S. Pat. Nos. 7,770,517, 6,823,792, and 5,590,598.

U.S. Patent Application Publication No. 2008/0236411 discloses an example of offset printing with a security feature on a printed product. A printing unit of a printing material processing machine is a sheetfed offset printing press that includes a form cylinder and an impression cylinder. The form cylinder has a printing form for applying printed information to the printing material and the impression cylinder has a microstructured surface, preferably a cover, contacting the printing material. A surface of the impression cylinder contacting the printing material is provided with micro-embossed structures for applying embossed information to the printing material. The printing material is printed and embossed simultaneously. The security feature and/or change in gloss can be implemented on the printed product through the use of the embossed, preferably micro-embossed, information. The cover has a microstructured, area having elevations with a height and spacings in the micrometer range. For example, the elevations can be between about 10 and about 100 micrometers high (e.g., about 20 micrometers high) and spaced apart from one another by between about 10 and about 500 micrometers (e.g., about 200 micrometers). US 2008/0236411 is incorporated herein by reference in its entirety.

Computer System

Figure 79:
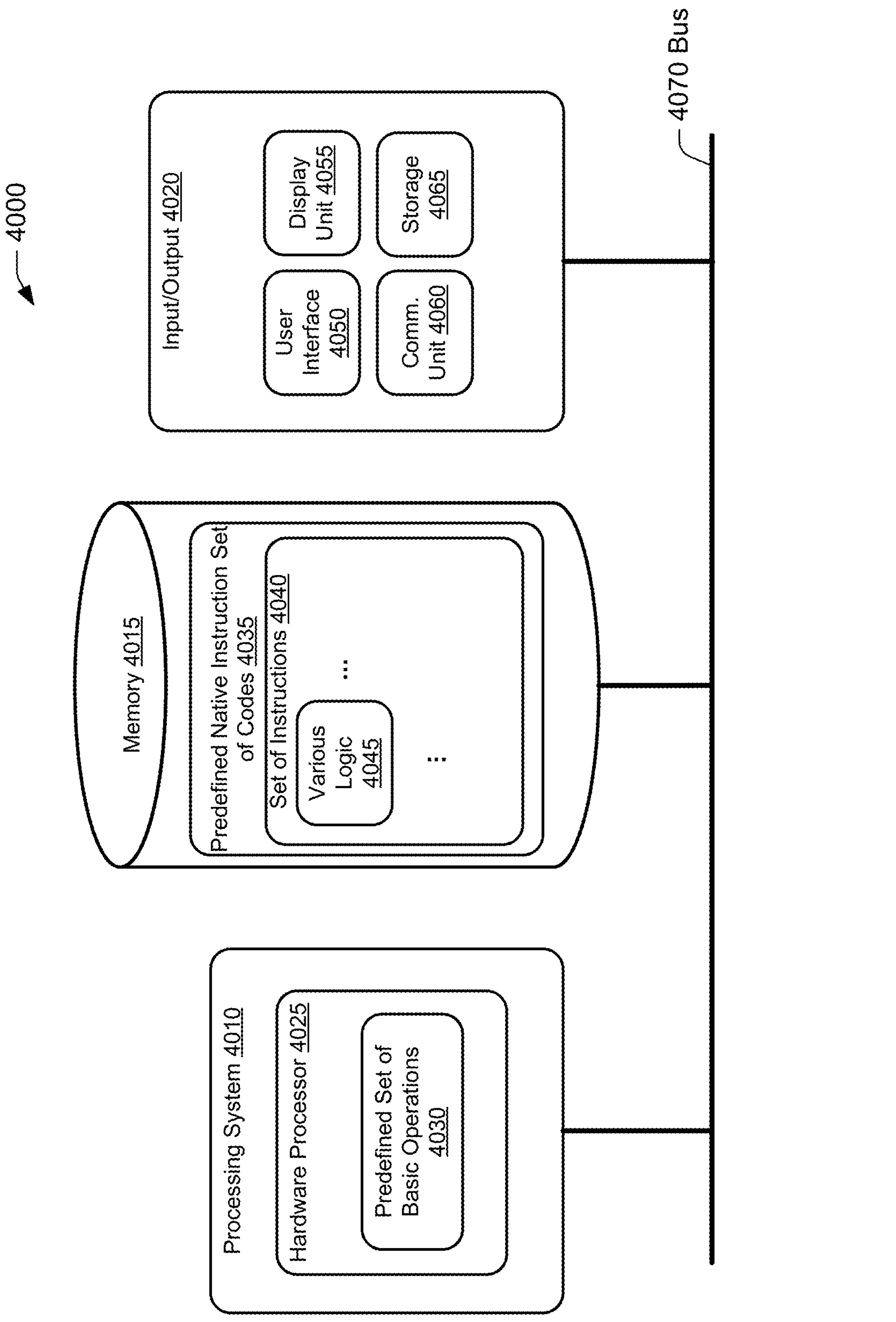
FIG. 79 illustrates an example of a computing system, or apparatus, including logic according to an embodiment.

FIG. 79 illustrates an example of a computing system 4000, or apparatus, including logic according to an embodiment. The computer system 4000 includes a processing system 4010 having a hardware processor 4025 configured to perform a predefined set of basic operations 4030 by loading corresponding ones of a predefined native instruction set of codes 4035 as stored in the memory 4015.

Here, the term computer system includes a processing system such as processing system 4010 and a memory such as memory 4015 accessible to the processing system.

The processing system includes at least one hardware processor, and in other examples includes multiple processors and/or multiple processor cores. In one embodiment, a computer system is a standalone device. The processing system in yet another example includes processors from different devices working together. In embodiments, a computer system includes multiple processing systems that communicate cooperatively over a computer network.

The following discussion explains how the logic, that implements the foregoing operations, transforms the hardware processor of computer system 4000 into a specially programmed electronic circuit.

A hardware processor is a complex electronic circuit designed to respond to certain electronic inputs in a predefined manner. The inputs to a hardware processor are stored as electrical charges. The hardware processor interprets the electrical charge of a given memory circuit as having one of two binary values, namely, zero or one.

A given hardware processor has electrical circuitry designed to perform certain predefined operations in response to certain ordered sets of binary values. The electrical circuitry is built of electronic circuits arranged or configured to respond to one set of ordered binary values one way and to another set of ordinary values another way, all in accordance with the hardware design of the particular hardware processor. A given set of ordered binary values to which the hardware processor is designed to respond, in a predefined manner, is an instruction.

The collection of instructions to which a given hardware processor is designed to respond, in a predetermined manner, is the native instruction set of the processor, also referred to as a native instruction set of codes. The native instruction set for one hardware processor may be different from the native instruction set for another hardware processor, depending on their manufacture. To control a given hardware processor, it is necessary to select an instruction or a sequence of instructions from the predefined native instruction set of that hardware processor.

A sequence of codes that a hardware processor is to execute, in the implementation of a given task, is referred to herein as logic. Logic is made up, therefore, not of software but of a sequence of codes or instructions, selected from the predefined native instruction set of codes of the hardware processor, and stored in the memory.

Returning to FIG. 79, the memory 4015 is accessible to the processing system 4010 via the bus 4070. The processing system controls also the input/output unit 4020 via the bus 4070. The input/output unit 4020 includes a user interface controller 4050, a display unit controller 4055, a communications unit controller 4060, and storage controller 4065.

The memory 4015 includes the predefined native instruction set of codes 4035, which constitute a set of instructions 4040 selectable for execution by the hardware processor 4025. In an embodiment, the set of instructions 4040 include logic 4045 representing the printsetter 3950 as illustrated in FIG. 39. The instructions in this paragraph do not imply any order of operation or use but are used only for discrimination of one sequence of instructions from another. Such logic 4045 is set forth above in greater detail with respect to the method steps for the various embodiments of offset printing.

The various logic 4045 is stored in the memory 4015 and comprises instructions 4040 selected from the predefined native instruction set of codes 4035 of the hardware processor 4025, adapted to operate with the processing system 4010 to implement the process or processes of the corresponding logic 4045.

The inventive concepts taught by way of the examples discussed above are amenable to modification, rearrangement, and embodiment in several ways. For example, this invention may be applicable in other environments involving other markings different from those in the examples as presented above. Different colors from those described above may be used. The number of printing plates used to form the markings can vary (increase or decrease) from the above examples. The configuration of each of the printing plates can be modified to achieve similar or different functional results or effects. Accordingly, although the present disclosure has been described with reference to specific embodiments and examples, persons skilled in the art will recognize that changes may be made in form and detail without departing from the spirit and scope of the disclosure.

An interpretation under 35 U.S.C. § 112 (f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation.

The indication of any elements or steps as "optional" does not indicate that all other or any other elements or steps are mandatory. The claims define the invention and form part of the specification. Limitations from the written description are not to be read into the claims.

What is claimed is:

1. A substrate having a front side and a back side and being printed with front side markings on the front side and back side markings on the back side, the front side markings and the back side markings having dimensions in a micrometer range;

the front side when viewed with reflected light comprising a first plurality of partial language characters;

the back side when viewed with reflected light comprising a second plurality of partial language characters;

the first plurality of partial language characters and the second plurality of partial language characters being configured, when viewed with transmitted light, to show a plurality of whole language characters having dimensions in the micrometer range, as a transmitted light security feature;

the front side having no other partial language characters to combine with the first plurality of partial language characters to show whole language characters when viewed with reflect light; and the back side having no other partial language characters to combine with the second plurality of partial language characters to show whole language characters when viewed with reflect light.

2. The substrate of claim 1, wherein the language characters are alpha-numeric characters.

3. The substrate of claim 1, wherein the whole language characters and spacings between the whole language characters have dimensions in a range of about 10 to 500 micrometers.

4. The substrate of claim 1, wherein the first plurality of partial language characters and the second plurality of partial language characters are configured, when viewed with transmitted light, to show the plurality of whole language characters having the first plurality of partial language characters in a first color and the second plurality of partial language characters in a second color different from the first color, as the transmitted light security feature.

5. The substrate of claim 4, wherein the first plurality of partial language characters include first sub-portions and second sub-portions of the first plurality of partial language characters and the second plurality of partial language characters include third sub-portions and fourth sub-portions of the second plurality of partial language characters;

the first sub-portions being printed with a first saturation of the first color;

the second sub-portions being printed with a second saturation of the first color;

the third sub-portions being printed with a third saturation of the second color; and the fourth sub-portions being printed with a fourth saturation of the second color.

6. The substrate of claim 5, wherein the first saturation is same as the third saturation;

wherein the second saturation as same as the fourth saturation; and wherein the first saturation is different from the second saturation.

7. The substrate of claim 1, wherein the first plurality of partial language characters and the second plurality of partial language characters are configured, when viewed with transmitted light, to show the plurality of whole language characters having the first plurality of partial language characters in a first saturation of color and the second plurality of partial language characters in a second saturation of color different from the first saturation of color, as the transmitted light security feature.

8. A system for printing markings on a substrate, the system comprising:

a printsetter including non-transitory computer readable instructions stored on a tangible computer read storage medium, the non-transitory computer readable instructions causing a microprocessor connected to the printsetter to:

receive a front side image having a first information section and a first security section;

generate a first plate having a first microprinting formed in the first plate based on the first security section of the front side image;

receive a back side image having a second information section and a second security section; and generate a second plate having a second microprinting formed in the second plate based on the second security section of the back side image;

the front side image including front side markings which correspond to the first microprinting and have dimensions in a micrometer range;

the back side image including back side markings which correspond to the second microprinting and have dimensions in the micrometer range;

the front side markings including a first plurality of partial language characters;

the back side markings including a second plurality of partial language characters;

the first plurality of partial language characters and the second plurality of partial language characters being configured to offset print an image which, when viewed with transmitted light, shows a plurality of whole language characters having dimensions in the micrometer range;

the front side having no other partial language characters to combine with the first plurality of partial language characters to show whole language characters when viewed with reflect light; and the back side having no other partial language characters to combine with the second plurality of partial language characters to show whole language characters when viewed with reflect light.

9. The system of claim 8, further comprising an offset press which includes:

a substrate tray configured to hold multiple substrates;

a feeder configured to feed substrate into the offset press one by one;

a substrate mover;

a first printing unit including the first plate, a first ink reservoir having the first microprinting, and a first ink roller configured to apply the first microprinting to each substrate;

a second printing unit including the second plate, a second ink reservoir having the second microprinting, and a second ink roller configured to apply the second microprinting to each substrate; and a substrate registration unit configured to orient each substrate to position each substrate within a threshold before the substrate mover pulls the substrate into the first or second printing unit.

10. The system of claim 9, wherein the first security section of the front side image of the substrate shows with reflected light, the first microprinting in a first color;

wherein the second security section of the back side image of the substrate shows with reflected light, the second microprinting in a second color; and wherein the first microprinting and the second microprinting form a transmitted light microprinting which combines the first microprinting in the first color and the second microprinting in the second color to show the partial language characters combined as the whole language characters.

11. The system of claim 9, wherein the first security section of the front side image of the substrate shows with reflected light, the first microprinting in a first saturation of color;

wherein the second security section of the back side image of the substrate shows with reflected light, the second microprinting in a second saturation of color; and wherein the first microprinting and the second microprinting form a transmitted light microprinting which combines the first microprinting in the first saturation of color and the second microprinting in the second saturation of color to show the partial language characters combined as the whole language characters.

12. The system of claim 9, wherein the non-transitory computer readable instructions further cause the microprocessor connected to the printsetter to:

generate a third plate having a first information printing formed in the third plate based on the first information section of the front side image; and generate a fourth plate having a second information printing formed in the fourth plate based on the second information section of the back side image;

the front side image including additional front side markings which correspond to the first information printing and have dimensions at least one order of magnitude larger than the micrometer range; and the back side image including additional back side markings which correspond to the second information printing and have dimensions at least one order of magnitude larger than the micrometer range.

13. The system of claim 12, further comprising:

a third printing unit including the third plate, a third ink reservoir having the first information printing, and a third ink roller configured to apply the first information printing to each substrate; and a fourth printing unit including the fourth plate, a fourth ink reservoir having the second information printing, and a fourth ink roller configured to apply the second information printing to each substrate.

14. The system of claim 12, wherein the first information section of the front side image of the substrate shows with reflected light, the first information printing;

wherein the second security section of the back side image the substrate shows with reflected light, the second information printing; and wherein the first information printing and the second information printing form a transmitted light information printing which combines the first information printing and the second information printing.

15. The system of claim 9, wherein the first microprinting formed in the first plate has a first engraving depth; and wherein the second microprinting formed in the second plate has a second engraving depth different from the first engraving depth.

16. The system of claim 9, wherein the first plate of the first printing unit has a first engraving depth for printing first sub-portions of the first plurality of partial language characters corresponding to the first microprinting and has a second engraving depth for printing second sub-portions of the first plurality of partial language characters corresponding to the first microprinting; and wherein the second plate of the second printing unit has a third engraving depth for printing third sub-portions of the second plurality of partial language characters corresponding to the second microprinting and has a fourth engraving depth for printing fourth sub-portions of the second plurality of partial language characters corresponding to the second microprinting;

the first engraving depth being different from the third engraving depth; and the second engraving depth being different from the fourth engraving depth.

17. The system of claim 16, wherein the first engraving depth is same as the second engraving depth; and wherein the third engraving depth is same as the fourth engraving depth.

18. The system of claim 8, wherein the whole language characters and spacings between the whole language characters have dimensions in a range of about 10 to 500 micrometers.

19. A substrate having a front side and a back side and being printed with front side markings on a first security section of the front side, back side markings on a second security section of the back side, first information on a first information section of the front side, and second information on a second information section of the back side, the front side markings and the back side markings having dimensions in a micrometer range;

the front side when viewed with reflected light comprising a first plurality of partial language characters;

the back side when viewed with reflected light comprising a second plurality of partial language characters;

the first plurality of partial language characters and the second plurality of partial language characters being configured, when viewed with transmitted light, to show a plurality of whole language characters having dimensions in the micrometer range, as a transmitted light security feature;

the front side having no other partial language characters to combine with the first plurality of partial language characters to show whole language characters when viewed with reflect light;

the back side having no other partial language characters to combine with the second plurality of partial language characters to show whole language characters when viewed with reflect light; and the first information and the second information having dimensions at least one order of magnitude larger than the micrometer range.

20. The substrate of claim 19, wherein the first plurality of partial language characters and the second plurality of partial language characters are configured, when viewed with transmitted light, to show the plurality of whole language characters having the first plurality of partial language characters in a first color and the second plurality of partial language characters in a second color different from the first color, as the transmitted light security feature.

21. The substrate of claim 19, wherein the first plurality of partial language characters and the second plurality of partial language characters are configured, when viewed with transmitted light, to show the plurality of whole language characters having the first plurality of partial language characters in a first saturation of color and the second plurality of partial language characters in a second saturation of color different from the first saturation of color, as the transmitted light security feature.

* * * * *